US008014602B2

(12) United States Patent
Ohara

(10) Patent No.: US 8,014,602 B2
(45) Date of Patent: *Sep. 6, 2011

(54) BACKLIGHT IMAGE DETERMINING APPARATUS, BACKLIGHT IMAGE DETERMINING METHOD, BACKLIGHT IMAGE CORRECTION APPARATUS, AND BACKLIGHT IMAGE CORRECTION METHOD

(75) Inventor: Taira Ohara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 878 days.

This patent is subject to a terminal disclaimer.

(21) Appl. No.: 11/731,844

(22) Filed: Mar. 29, 2007

(65) Prior Publication Data
US 2007/0237392 A1 Oct. 11, 2007

(30) Foreign Application Priority Data

Mar. 29, 2006 (JP) ................... 2006-091366
May 2, 2006 (JP) ................... 2006-128440

(51) Int. Cl.
G06K 9/00 (2006.01)
G06K 9/40 (2006.01)
G06K 9/34 (2006.01)
(52) U.S. Cl. .................. 382/171; 382/254; 382/274
(58) Field of Classification Search .......... 382/162, 382/164, 165, 168, 171, 172, 254, 286, 274, 382/275, 291; 358/1.9, 3.26, 518–523, 525, 358/530; 348/77–78, 94, 135, 576–577; 345/589–604
See application file for complete search history.

(56) References Cited

U.S. PATENT DOCUMENTS
4,799,106 A 1/1989 Moore et al.
(Continued)

FOREIGN PATENT DOCUMENTS
JP 06-152962 A 5/1994
(Continued)

OTHER PUBLICATIONS
U.S. Appl. No. 11/809,907 dated Jun. 1, 2007.
(Continued)

Primary Examiner — Amir Alavi
(74) Attorney, Agent, or Firm — Nutter McClennen & Fish LLP; John J. Penny, Jr.; Christina M. Sperry

(57) ABSTRACT

A backlight image determining apparatus includes: (A) a histogram data generation section that, based on data of pixels constituting an image to be determined, generates data of histograms for respective colors, the histograms representing a distribution of the number of pixels in respect to density values of the respective colors of those pixels; (B) an attribute information obtaining section that obtains, for each color, attribute information relating to a first small region and a second small region by partitioning regions given by the histograms for the respective colors into at least three small regions according to the magnitude of the density values, based on the data of the histograms for the respective colors generated by the histogram data generation section, selecting for each color at least one small region from the at least three small regions as the first small region, and selecting, from the at least three small regions, for each color at least one small region whose density values are larger than those of the first small region and which is not adjacent to the first small region, as the second small region; and (C) a determination section that determines whether the image to be determined is a backlight image, based on the attribute information relating to the first small region for each color and the attribute information relating to the second small region for each color, which is obtained with the attribute information obtaining section.

20 Claims, 26 Drawing Sheets

U.S. PATENT DOCUMENTS

| | | | |
|---|---|---|---|
| 5,323,241 A | 6/1994 | Yonezawa | |
| 5,461,457 A | 10/1995 | Nakamura | |
| 5,887,080 A | 3/1999 | Tsubusaki et al. | |
| 6,111,981 A | 8/2000 | Tsubusaki et al. | |
| 7,406,193 B2 | 9/2004 | Watanabe | |
| 6,807,316 B2 * | 10/2004 | Enomoto | 382/264 |
| 7,013,025 B2 | 3/2006 | Hiramatsu | |
| 7,113,639 B2 | 9/2006 | Fukawa et al. | |
| 7,142,712 B2 | 11/2006 | Maruoka | |
| 7,155,053 B2 | 12/2006 | Nakajima et al. | |
| 7,251,056 B2 | 7/2007 | Matsushima | |
| 7,298,896 B2 * | 11/2007 | Yamaguchi et al. | 382/172 |
| 7,466,868 B2 * | 12/2008 | Wilensky | 382/254 |
| 7,570,836 B2 | 8/2009 | Imai | |
| 7,664,319 B2 | 2/2010 | Toyoda et al. | |
| 2003/0179398 A1 | 9/2003 | Takano et al. | |
| 2005/0084174 A1 | 4/2005 | Imai | |
| 2005/0141002 A1 * | 6/2005 | Takano et al. | 358/1.9 |
| 2005/0259282 A1 * | 11/2005 | Takano et al. | 358/1.9 |
| 2006/0056547 A1 * | 3/2006 | Buchali et al. | 375/341 |
| 2007/0086640 A1 | 4/2007 | Luo et al. | |
| 2007/0133036 A1 | 6/2007 | Matsunoshita et al. | |
| 2007/0237392 A1 * | 10/2007 | Ohara | 382/171 |
| 2008/0002216 A1 | 1/2008 | Matsushima | |
| 2008/0030814 A1 * | 2/2008 | Ohara et al. | 358/522 |

FOREIGN PATENT DOCUMENTS

| | | |
|---|---|---|
| JP | 06-268866 A | 9/1994 |
| JP | 10-079885 | 3/1998 |
| JP | 10-126619 A | 5/1998 |
| JP | 2000-102033 | 4/2000 |
| JP | 2000-134467 | 5/2000 |
| JP | 2001-045303 A | 2/2001 |
| JP | 2002-101303 A | 4/2002 |
| JP | 2002101313 A | 4/2002 |
| JP | 2002158893 A | 5/2002 |
| JP | 2002-232728 A | 8/2002 |
| JP | 2002-368982 | 12/2002 |
| JP | 2003-069825 A | 3/2003 |
| JP | 2003-283731 A | 10/2003 |
| JP | 2004-056391 A | 2/2004 |
| JP | 2004-056416 | 2/2004 |
| JP | 2004-282416 | 10/2004 |
| JP | 2005-049955 A | 2/2005 |
| JP | 2007-325136 A | 12/2007 |
| JP | 2007325133 A | 12/2007 |
| JP | 2007325134 A | 12/2007 |

OTHER PUBLICATIONS

Notice of Allowance dated Nov. 30, 2010 relating to U.S. Appl. No. 11/809,907.

Notice of Allowance dated Nov. 30, 2010 relating to U.S. Appl. No. 11/809,908.

* cited by examiner

| | | | |
|---|---|---|---|
| HISTOGRAM ADJUSTMENT | RED (R) | SHADOW INPUT VALUE | $\alpha 11$ |
| | | HIGHLIGHT INPUT VALUE | $\alpha 12$ |
| | | SHADOW OUTPUT VALUE | $\alpha 13$ |
| | | HIGHLIGHT OUTPUT VALUE | $\alpha 14$ |
| | | GAMMA VALUE | $\alpha 15$ |
| | GREEN (G) | SHADOW INPUT VALUE | $\alpha 21$ |
| | | HIGHLIGHT INPUT VALUE | $\alpha 22$ |
| | | SHADOW OUTPUT VALUE | $\alpha 23$ |
| | | HIGHLIGHT OUTPUT VALUE | $\alpha 24$ |
| | | GAMMA VALUE | $\alpha 25$ |
| | BLUE (B) | SHADOW INPUT VALUE | $\alpha 31$ |
| | | HIGHLIGHT INPUT VALUE | $\alpha 32$ |
| | | SHADOW OUTPUT VALUE | $\alpha 33$ |
| | | HIGHLIGHT OUTPUT VALUE | $\alpha 34$ |
| | | GAMMA VALUE | $\alpha 35$ |
| | TONE CURVE | TONE CURVE LOWER END PORTION SHAPE | $\alpha 41$ |
| | | TONE CURVE UPPER END PORTION SHAPE | $\alpha 42$ |
| | GRAYSCALE BALANCE ADJUSTMENT VALUE | | $\alpha 51$ |

FIG. 10A

| DENSITY ENHANCEMENT | RED (R) | P1 | INPUT COORDINATES | β11 |
| | | | OUTPUT COORDINATES | β12 |
| | | P2 | INPUT COORDINATES | β13 |
| | | | OUTPUT COORDINATES | β14 |
| | | ⋮ | ⋮ | ⋮ |
| | GREEN (G) | P1 | INPUT COORDINATES | β21 |
| | | | OUTPUT COORDINATES | β22 |
| | | P2 | INPUT COORDINATES | β23 |
| | | | OUTPUT COORDINATES | β24 |
| | | ⋮ | ⋮ | ⋮ |
| | BLUE (B) | P1 | INPUT COORDINATES | β31 |
| | | | OUTPUT COORDINATES | β32 |
| | | P2 | INPUT COORDINATES | β33 |
| | | | OUTPUT COORDINATES | β34 |
| | | ⋮ | ⋮ | ⋮ |

FIG. 10B

| IMAGE ADJUSTMENT | BRIGHTNESS | | $\gamma 1$ |
|---|---|---|---|
| | CONTRAST | | $\gamma 2$ |
| | SATURATION | | $\gamma 3$ |
| | COLOR BALANCE | CYAN-RED | $\gamma 4$ |
| | | MAGENTA-GREEN | $\gamma 5$ |
| | | YELLOW-BLUE | $\gamma 6$ |

FIG. 10C

BACKLIGHT IMAGE DETERMINING APPARATUS, BACKLIGHT IMAGE DETERMINING METHOD, BACKLIGHT IMAGE CORRECTION APPARATUS, AND BACKLIGHT IMAGE CORRECTION METHOD

CROSS-REFERENCE TO RELATED APPLICATIONS

The present application claims priority upon Japanese Patent Application No. 2006-091366 filed on Mar. 29, 2006, and Japanese Patent Application No. 2006-128440 filed on May 2, 2006, which are herein incorporated by reference.

FIELD OF THE INVENTION

The present invention relates to backlight image determining apparatuses, backlight image determining methods, backlight image enhancement apparatuses and backlight image enhancement methods.

DESCRIPTION OF THE RELATED ART

Various image reading devices such as image scanners generally are connected to a so-called computer device such as a personal computer through a wired or a wireless connection and the like, and transmit an image that was read from an original document to the computer device as image data. The computer device receives the image data that have been transmitted from the image reading device and stores those data on a data memory device such as various memories or a hard disk drive. At this time, on the computer device the image data that have been sent from the image reading device are subjected to various adjustment processing.

Examples of adjustment processing that may be performed at this time include histogram adjustment for adjusting the contrast of the image and density correction for partially altering the expression of darkness and lightness in the image. These adjustments may by executed automatically, or executed by a user or the like, by various programs, such as a driver program of the image reading device or application program and the like that are installed on the computer device. Other than that, there is also an adjustment for enhancing a backlight image, for example. As such backlight enhancement methods, various methods have been proposed (see for example JP-A-10-79885, JP-A-2004-56416 and JP-A-2000-134467).

(1) However, in the methods for determining a backlight image that were disclosed in the context of these proposed methods, there were cases, in which the image to be determined was determined as a backlight image, even though it is not a backlight image. Therefore, it occurred that an image was determined to be a backlight image and a backlight enhancement was carried out, even though the image to be determined is not a backlight image. Thus, there was the risk that the original image quality and the like of the image to be determined was compromised.

(2) Furthermore, in the enhancement method that is proposed here, it is determined first whether the image to be determined is a backlight question, and if it is determined that this image is a backlight image, then this image is subjected to a backlight enhancement process. If it cannot be suitably determined whether the image to be determined is a backlight image, then there was the risk that a backlight enhancement process is performed on an image that is not a backlight image. In particular among the enhancement methods that were proposed previously, there were also methods, with which it cannot be suitably judged whether the image to be determined is a backlight image.

SUMMARY OF THE INVENTION (1) The invention has been conceived in view of the above circumstances, and it is an advantage of this invention that it can be accurately determined whether an image to be determined is a backlight image.

A main aspect of an invention attaining this advantage is (D) a backlight image determining apparatus including:

(A) a histogram data generation section that, based on data of pixels constituting an image to be determined, generates data of histograms for respective colors, the histograms representing a distribution of the number of pixels in respect to density values of the respective colors of those pixels;

(B) an attribute information obtaining section that obtains, for each color, attribute information relating to a first small region and a second small region by partitioning regions given by the histograms for the respective colors into at least three small regions according to the magnitude of the density values, based on the data of the histograms for the respective colors generated by the histogram data generation section, selecting for each color at least one small region from the at least three small regions as the first small region, and selecting, from the at least three small regions, for each color at least one small region whose density values are larger than those of the first small region and which is not adjacent to the first small region, as the second small region; and (C) a determination section that determines whether the image to be determined is a backlight image, based on the attribute information relating to the first small region for each color and the attribute information relating to the second small region for each color, which is obtained with the attribute information obtaining section.

Other features of the present invention will become clear by reading the description of the present specification with reference to the accompanying drawings.

(2) Furthermore, the invention has been conceived in view of the above circumstances, and it is an advantage of this invention that it ensures that a backlight enhancement process is carried out suitably on a backlight image without determining whether an image to be determined is a backlight image.

A main aspect of the invention attaining this advantage is (E) a backlight image enhancement apparatus including:

(A) a histogram data generation section that, based on data of pixels constituting an image, generates data of histograms for respective colors, the histograms representing a distribution of the number of pixels in respect to density values for the respective colors of those pixels;

(B) an attribute information obtaining section that obtains, for each color, attribute information for a relevant small region by partitioning, based on the histogram data for the respective colors generated with the histogram data generation section, the regions given by the histograms for the respective colors into at least two small regions according to the magnitude of the density values and selecting at least one small region from the at least two small regions;

(C) an enhancement information generation section that generates enhancement information for performing a backlight enhancement process on the image based on the attribute information for each color obtained with the attribute information obtaining section; and (D) a backlight enhancement processing section that performs a backlight enhancement process on the image, based on the enhancement information generated with the enhancement information generation section.

Other features of the present invention will become clear by reading the description of the present specification with reference to the accompanying drawings.

BRIEF DESCRIPTION OF THE DRAWINGS

FIG. 10A is an explanatory diagram of data that is set by the histogram adjustment.

FIG. 10B is an explanatory diagram of data that is set by the density enhancement.

FIG. 10C is an explanatory diagram of data that is set by the image adjustment.

DETAILED DESCRIPTION OF THE INVENTION

Figure 1:
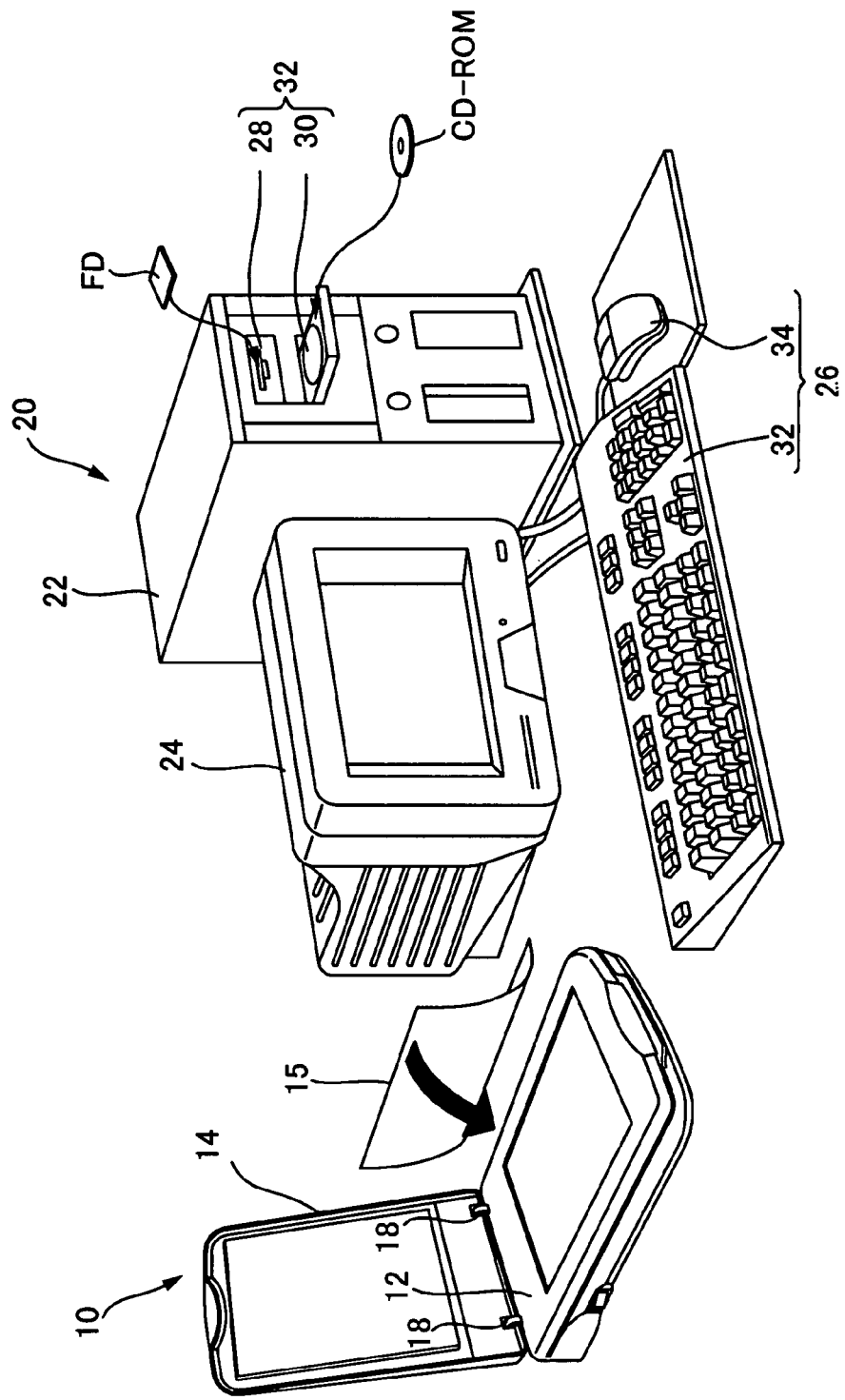
FIG. 1 is an explanatory diagram showing an embodiment of an image reading system.

At least the following matters will be made clear by the explanation in the present specification and the description of the accompanying drawings.

There is provided (D) a backlight image determining apparatus including:

(A) a histogram data generation section that, based on data of pixels constituting an image to be determined, generates data of histograms for respective colors, the histograms representing a distribution of the number of pixels in respect to density values of the respective colors of those pixels;

(B) an attribute information obtaining section that obtains, for each color, attribute information relating to a first small region and a second small region by partitioning regions given by the histograms for the respective colors into at least three small regions according to the magnitude of the density values, based on the data of the histograms for the respective colors generated by the histogram data generation section, selecting for each color at least one small region from the at least three small regions as the first small region, and selecting, from the at least three small regions, for each color at least one small region whose density values are larger than those of the first small region and which is not adjacent to the first small region, as the second small region; and (C) a determination section that determines whether the image to be determined is a backlight image, based on the attribute information relating to the first small region for each color and the attribute information relating to the second small region for each color, which is obtained with the attribute information obtaining section.

With this backlight image determining apparatus, regions given by histograms of respective colors are partitioned into at least three small regions according to the magnitude of their density values, based on histogram data for the respective colors that is generated based on data of pixels constituting the image to be determined, at least one small region is selected for each color as a first small region from the at least three small regions, at least one small region whose density values are larger than those of the first small region and that is not adjacent to the first small region is selected as a second small region, attribute information relating to the first small region and the second small region is obtained for each color and it is determined whether the image to be determined is a backlight image based on this attribute information, so that it can be more accurately determined whether the image to be determined is a backlight image.

In this backlight image determining apparatus, histogram data of the colors red, green and blue may be generated by the histogram data generation section as the histogram data of the respective colors. If histogram data of the colors red, green and blue is generated as the histogram data of the respective colors, then it is possible to accurately determine whether the image to be determined is a backlight question, when the data of the density values of the colors red, green and blue is included as the data of the pixels constituting the image to be determined.

In this backlight image determining apparatus, the at least three small regions may comprise at least two small regions that have the same area. If the at least three small regions comprise at least two small regions that have the same area, then it is possible to more accurately determine whether the image to be determined is a backlight image.

In this backlight image determining apparatus, the at least three small regions may comprise at least two small regions that have the same pixel number. If the at least three small regions may comprise at least two small regions that have the same pixel number, then it is possible to accurately determine whether the image to be determined is a backlight image.

In this backlight image determining apparatus, the at least three small regions may comprise at least two small regions that have at least one of the same pixel number and the same area, and the first small region may be the small region with the smallest density values among the at least two small regions. If the first small region is the small region with the smallest density values among the at least two small regions having at least one of the same pixel number and the same area, then it is possible to more accurately determine whether the image to be determined is a backlight image.

In this backlight image determining apparatus, the at least three small regions may comprise at least two small regions that have at least one of the same pixel number and the same area, and the second small region may be the small region with the largest density values among the at least two small regions. If the second small region is the small region with the largest density values among the at least two small regions having at least one of the same pixel number and the same area, then it is possible to more accurately determine whether the image to be determined is a backlight image.

In this backlight image determining apparatus, the attribute information obtaining section may obtain a maximum value of the density values of the first small region or the second small region as the attribute information of the first small region or the second small region. If a maximum value of the density values of the first small region or the second small region is obtained as the attribute information of the first small region or the second small region, then it is possible to more accurately determine whether the image to be determined is a backlight image.

In this backlight image determining apparatus, the determination section may determine whether the image to be determined is a backlight image based on a result of a comparison between the attribute information relating to the first small region for each color and the attribute information relating to the second small region for each color. By determining with the determination section whether the image to be determined is a backlight image based on the result of a comparison between the attribute information relating to the first small region for each color and the attribute information relating to the second small region for each color, it is possible to determine in a more simple manner whether the image to be determined is a backlight image.

In this backlight image determining apparatus, the determination section may determine whether the image to be determined is a backlight image by comparing a value that is obtained based on a value obtained for each color as the attribute information relating to the first small region for each color and a value that is obtained based on a value obtained for each color as the attribute information relating to the second small region for each color. By comparing a value that is obtained based on a value obtained for each color as the attribute information relating to the first small region for each color and a value that is obtained based on a value obtained for each color as the attribute information relating to the second small region for each color, it is possible to determine in a more simple manner whether the image to be determined is a backlight image.

In this backlight image determining apparatus, the determination section may determine whether the image to be determined is a backlight image based on a difference between a value that is obtained based on a value obtained for each color as the attribute information relating to the first small region for each color and a value that is obtained based on a value obtained for each color as the attribute information relating to the second small region for each color. By determining with the determination section whether the image to be determined is a backlight image, based on a difference between a value that is obtained based on a value obtained for each color as the attribute information relating to the first small region for each color and a value that is obtained based on a value obtained for each color as the attribute information relating to the second small region for each color, it is possible to determine in a more simple manner whether the image to be determined is a backlight image.

In this backlight image determining apparatus, the determination section may determine whether the image to be determined is a backlight image by comparing the difference with a predetermined threshold value. By determining with the determination section whether the image to be determined is a backlight image by comparing the difference with a predetermined threshold value, it is possible to determine in a more simple manner whether the image to be determined is a backlight image.

Furthermore provided is a backlight image determining apparatus including:

(A) a histogram data generation section that, based on data of pixels constituting an image to be determined, generates data of histograms for respective colors, the histograms representing a distribution of the number of pixels in respect to density values of the respective colors of those pixels;

(B) an attribute information obtaining section that obtains, for each color, attribute information relating to a first small region and a second small region by partitioning regions given by the histograms for the respective colors into at least three small regions according to the magnitude of the density values, based on the data of the histograms for the respective colors generated by the histogram data generation section, selecting for each color at least one small region from the at least three small regions as the first small region, and selecting, from the at least three small regions, for each color at least one small region whose density values are larger than those of the first small region and which is not adjacent to the first small region, as a second small region; and (C) a determination section that determines whether the image to be determined is a backlight image, based on the attribute information relating to the first small region for each color and the attribute information relating to the second small region for each color, which is obtained with the attribute information obtaining section, wherein:

(E) histogram data of the colors red, green and blue are generated by the histogram data generation section as the histogram data of the respective colors, (F) wherein the at least three small regions comprise at least two small regions that have at least one of the same pixel number and the same area, (G) the first small region is the small region that has the smallest density values among the at least two small regions, and the second small region is the small region that has the largest density values among the at least two small regions, (H) the attribute information obtaining section obtains a maximum value of the density values of the first small region or the second small region as the attribute information of the first small region or the second small region, (I) the determination section determines whether the image to be determined is a backlight image based on a result of a comparison between the attribute information relating to the first small region for each color and the attribute information relating to the second small region for each color, and (J) the determination section determines whether the image to be determined is a backlight image by determining the difference between a value obtained for each color as the attribute information relating to the first small region for each color and a value that is obtained based on a value obtained for each color as the attribute information relating to the second small region for each color and comparing this difference with a predetermined threshold value.

Also provided is (D) a backlight image determining apparatus including:

(A) a histogram data generation section that, based on data of pixels constituting an image to be determined, generates data of histograms representing a distribution of the number of pixels in respect to density values of those pixels;

(B) an attribute information obtaining section that obtains attribute information relating to a first small region and a second small region by partitioning regions given by the histograms into at least three small regions according to the magnitude of the density values, based on the data of the histograms generated by the histogram data generation section, selects at least one small region from the at least three small regions as a first small region, selects, from the at least three small regions, at least one small region whose density values are larger than those of the first small region and which is not adjacent to the first small region, as a second small region; and (C) a determination section that determines whether the image to be determined is a backlight image, based on the attribute information relating to the first small region and the attribute information relating to the second small region, which is obtained with the attribute information obtaining section.

Also provided is (F) a backlight image determining method including:

(A) a step of generating, based on data of pixels constituting an image to be determined, data of histograms for respective colors, the histograms representing a distribution of the number of pixels in respect to density values of the respective colors of those pixels;

(B) a step of partitioning regions given by the histograms for the respective colors into at least three small regions according to the magnitude of the density values, based on the data of the histograms for the respective colors generated by the histogram data generation section;

(C) a step of selecting for each color at least one small region from the at least three small regions as a first small region, and selecting, from the at least three small regions, for each color at least one small region whose density values are larger than those of the first small region and which is not adjacent to the first small region, as a second small region;

(D) a step of obtaining, for each color, attribute information relating to the first small region and the second small region; and (E) a step of determining whether an image to be determined is a backlight image, based on the attribute information relating to the first small region obtained for each color and the attribute information relating to the second small region obtained for each color.

Also provided is (G) a backlight image determining program (A) executed on a backlight image determining apparatus, the program executing:

(B) a step of generating, based on data of pixels constituting an image to be determined, data of histograms for respective colors, the histograms representing a distribution of the number of pixels in respect to density values of the respective colors of those pixels;

(C) a step of partitioning regions given by the histograms for the respective colors into at least three small regions according to the magnitude of the density values, based on the generated data of the histograms for the respective colors;

(D) a step of selecting for each color at least one small region from the at least three small regions as a first small region, and selecting, from the at least three small regions, for each color at least one small region whose density values are larger than those of the first small region and which is not adjacent to the first small region, as a second small region;

(E) a step of obtaining, for each color, attribute information relating to the first small region and the second small region; and (F) a step of determining whether an image to be determined is a backlight image, based on the obtained attribute information relating to the first small region for each color and the attribute information relating to the second small region for each color.

Also provided is (E) a backlight image enhancement apparatus including:

(A) a histogram data generation section that, based on data of pixels constituting an image to be determined, generates data of histograms for respective colors, the histograms representing a distribution of the number of pixels in respect to density values for the respective colors of those pixels;

(B) an attribute information obtaining section that obtains for each color attribute information for the first small region and the second small region by partitioning, based on the histogram data for the respective colors generated with the histogram data generation section, the regions given by the histograms for the respective colors into at least three small regions according to the magnitude of the density values, selects at least one small region from the at least three small regions, selects for each color, from the at least three small regions, at least one small region whose density values are larger than those of the first small regions and that is not adjacent to the first small region as the second small region;

(C) a determination section that determines whether the image to be determined is a backlight image, based on the attribute information relating to the first small region for each color and the attribute information relating to the second small region for each color, which is obtained with the attribute information obtaining section; and (D) a backlight enhancement processing section that performs a backlight enhancement process on the image, if the determination section determines that the image to be determined is a backlight image.

Also provided is (F) a method for backlight image enhancement, including:

(A) a step of generating, based on data of pixels constituting an image to be determined, data of histograms for respective colors, the histograms representing a distribution of the number of pixels in respect to density values of the respective colors of those pixels;

(B) a step of partitioning regions given by the histograms for the respective colors into at least three small regions according to the magnitude of the density values, based on the generated data of the histograms for each color;

(C) a step of selecting for each color at least one small region from the at least three small regions as a first small region, and selecting for each color from the at least three small regions at least one small region whose density values are larger than those of the first small region and that is not adjacent to the first small region as a second region;

(D) a step of obtaining for each color attribute information relating to the first small region and the second small region; and (E) a step of determining whether the image to be determined is a backlight image, based on the obtained attribute information relating to the first small region for each color and the attribute information relating to the second small region for each color, and (F) a step of performing a backlight enhancement process on the image, if the image to be determined is determined to be a backlight image.

Also provided is (E) an image reading device including:

(A) an image reading section that reads in an image from an original document;

(B) a histogram data generation section that, based on data of pixels constituting an image read in with the image reading section, generates data of histograms for respective colors, the histograms representing a distribution of the number of pixels in respect to density values of the respective colors of those pixels;

(C) an attribute information obtaining section that obtains for each color attribute information relating to the first small region and the second small region by partitioning regions given by the histograms for the respective colors into at least three small regions according to the magnitude of the density values, based on the data of the histograms for the respective colors generated by the histogram data generation section, selecting for each color at least one small region from the at least three small regions as a first small region, and selecting, from the at least three small regions, for each color at least one small region whose density values are larger than those of the first small region and which is not adjacent to the first small region, as a second small region; and (D) a determination section that determines whether the image to be determined is a backlight image, based on the attribute information relating to the first small region for each color and the attribute information relating to the second small region for each color, which is obtained with the attribute information obtaining section.

Also provided is (G) an image reading method including:

(A) a step of reading in an image from an original document;

(B) a step of generating, based on data of pixels constituting an image read in, data of histograms for respective colors, the histograms representing a distribution of the number of pixels in respect to density values of the respective colors of those pixels;

(C) a step of partitioning regions given by the histograms for the respective colors into at least three small regions according to the magnitude of the density values, based on the data of the generated histograms for the respective colors;

(D) a step of selecting for each color at least one small region from the at least three small regions as a first small region, and selecting, from the at least three small regions, for each color at least one small region whose density values are larger than those of the first small region and which is not adjacent to the first small region, as a second small region;

(E) a step of obtaining for each color attribute information relating to the first small region and the second small region; and (F) a step of determining whether the image to be determined is a backlight image, based on the obtained attribute information relating to the first small region for each color and the attribute information relating to the second small region for each color.

Also provided is (F) a printing apparatus including:

(A) a printing section that prints an image on a medium;

(B) a histogram data generation section that, prior to printing the image with the printing section and based on data of pixels constituting the image, generates data of histograms for respective colors, the histograms representing a distribution of the number of pixels in respect to density values of the respective colors of those pixels;

(C) an attribute information obtaining section that obtains for each color attribute information relating to the first small region and the second small region by partitioning regions given by the histograms for the respective colors into at least three small regions according to the magnitude of the density values, based on the data of the histograms for the various colors generated by the histogram data generation section, selecting for each color at least one small region from the at least three small regions as a first small region, and selecting, from the at least three small regions, for each color at least one small region whose density values are larger than those of the first small region and which is not adjacent to the first small region, as a second small region;

(D) a determination section that determines whether the image to be determined is a backlight image, based on the attribute information relating to the first small region for each color and the attribute information relating to the second small region for each color, which is obtained with the attribute information obtaining section; and (E) a backlight enhancement section that performs a backlight enhancement process on the image, if the image has been determined to be a backlight image by the determination section.

Also provided is (E) a backlight image enhancement apparatus including:

(A) a histogram data generation section that, based on data of pixels constituting an image, generates data of histograms for respective colors, the histograms representing a distribution of the number of pixels in respect to density values for the respective colors of those pixels;

(B) an attribute information obtaining section that obtains, for each color, attribute information for a relevant small region by partitioning, based on the histogram data for the respective colors generated with the histogram data generation section, the regions given by the histograms for the respective colors into at least two small regions according to the magnitude of the density values, and selecting at least one small region from the at least two small regions;

(C) an enhancement information generation section that generates enhancement information for performing a backlight enhancement process on the image based on the attribute information for each color obtained with the attribute information obtaining section; and (D) a backlight enhancement processing section that performs a backlight enhancement process on the image, based on the enhancement information generated with the enhancement information generation section.

In this backlight image enhancement apparatus, the regions given by the histograms for respective colors are partitioned into at least two small regions according to the magnitude of their density values, based on data of the histograms for the various colors generated based on the data of the pixels constituting an image, and attribute information relating to at least one small region selected from these two or more small regions is obtained for each color, enhancement information for performing a backlight enhancement process is generated based on the obtained attribute information for each color, and a backlight enhancement process is performed on the image based on this enhancement information, so that a suitable backlight enhancement process can be performed on the image.

In this backlight image enhancement apparatus, histogram data of the colors red, green and blue may be generated by the histogram data generation section as the histogram data of the respective colors. If histogram data of the respective colors red, green and blue is generated as the histogram data of the respective colors, then it is possible to perform a more suitable backlight enhancement process on the image, when the data of the density values of the respective colors red, green and blue is included as the data of the pixels constituting the image.

In this backlight image enhancement apparatus, the at least two small regions may comprise at least two small regions that have the same area. If the at least two small regions comprise at least two small regions with the same area, then a more suitable backlight enhancement process can be performed on the image.

In this backlight image enhancement apparatus, the at least two small regions may comprise at least two small regions that have the same pixel number. If the at least two small regions comprise at least two small regions with the same pixel number, then a more suitable backlight enhancement process can be performed on the image.

In this backlight image enhancement apparatus, the at least two small regions may comprise at least two small regions that have the at least one of the same pixel number and the same area, and the attribute information obtaining section may obtain the attribute information respectively from the at least two small regions having at least one of the same pixel number and the same area. If the at least two small regions comprise at least two small regions that have at least one of the same pixel number and the same area, and the attribute information obtaining section obtains the attribute information respectively from the at least two small regions having at least one of the same pixel number and the same area, then a more suitable backlight enhancement process can be performed on the image.

In this backlight image enhancement apparatus, the attribute information obtaining section may obtain for each color an average value of the density values for the at least one small region as the attribute information. If the attribute information obtaining section obtains for each color an average value of the density values for the at least one small region as the attribute information, then a more suitable backlight enhancement process can be performed on the image.

In this backlight image enhancement apparatus, the enhancement information generation section may obtain information relating to the luminance of the at least one small region based on an average value of the density values of each color obtained with the attribute information obtaining section, and generate the enhancement information based on information relating to this luminance. If the enhancement information generation section obtains information relating to the luminance of the at least one small region from an average value of the density values of each color, and generates the enhancement information based on information relating to this luminance, then a more suitable backlight enhancement process can be performed on the image.

In this backlight image enhancement apparatus, the enhancement information generation section may obtain an average value of the luminance of the individual pixels for the at least one small region as the information relating to the luminance. If the enhancement information generation section obtains an average value of the luminance of the individual pixels for the at least one small region as the information relating to the luminance, then a more suitable backlight enhancement process can be performed on the image.

In this backlight image enhancement apparatus, the enhancement information generation section may generate the enhancement information based on a value obtained by adding at least one of the average values of the luminance obtained respectively for the at least one small region to the average value of the overall luminance of the image. If the enhancement information generation section generates the enhancement information based on a value obtained by adding at least one of the average values of the luminance obtained respectively for the at least one small region to the average value of the overall luminance of the image, then a more suitable backlight enhancement process can be performed on the image.

In this backlight image enhancement apparatus, the backlight enhancement processing section may convert the density values of the respective pixels constituting the image when performing the backlight enhancement process based on the enhancement information. If the backlight enhancement processing section converts the density values of the respective pixels constituting the image when performing the backlight enhancement process based on the enhancement information, then the backlight enhancement process can be carried out in a more simple manner.

In this backlight image enhancement apparatus, the enhancement information generation section may generate, as the enhancement information, information relating to a correspondence relationship between the density values prior to conversion with the backlight enhancement processing section and the density values after conversion with the backlight enhancement processing section. If such information is generated as the enhancement information, then the backlight enhancement process can be carried out in a more simple manner.

Also provided is (E) a backlight image enhancement apparatus including:

(A) a histogram data generation section that, based on data of pixels constituting an image, generates data of histograms for respective colors, the histograms representing a distribution of the number of pixels in respect to density values for the respective colors of those pixels;

(B) an attribute information obtaining section that obtains for each color attribute information for that small region by partitioning, based on the histogram data for the various colors generated with the histogram data generation section, the regions given by the histograms for the respective colors into at least two small regions according to the magnitude of the density values and selecting at least one small region from the at least two small regions;

(C) an enhancement information generation section that generates enhancement information for performing a backlight enhancement process on the image based on the attribute information for each color obtained with the attribute information obtaining section; and (D) a backlight enhancement processing section that performs a backlight enhancement process on the image, based on the enhancement information generated with the enhancement information generation section; wherein:

(F) histogram data of the respective colors red, green and blue is generated by the histogram data generation section as the histogram data of the respective colors;

(G) the at least two small regions comprise at least two small regions that have at least one of the same pixel number and the same area, and the attribute information obtaining section obtains the attribute information respectively from the at least two small regions having at least one of the same pixel number and the same area;

(H) the attribute information obtaining section obtains for each color an average value of the density values for the at least one small region as the attribute information;

(I) the enhancement information generation section obtains an average value of the luminance of the at least one small region from an average value of the density values of each color obtained with the attribute information obtaining section;

(J) the enhancement information generation section generates enhancement information based on the value obtained by adding the average value of the luminance value of the entire image to at least one of the average values of the luminance obtained for the at least one small region.

(K) the backlight enhancement processing section converts the density values of the respective pixels constituting the image when performing the backlight enhancement process based on the enhancement information;

(L) the enhancement information generation section generates, as the enhancement information, information relating to a correspondence relationship between the density values prior to conversion with the backlight enhancement processing section and the density values after conversion with the backlight enhancement processing section.

Also provided is (E) a backlight image enhancement apparatus including:

(A) a histogram data generation section that, based on data of pixels constituting an image, generates data of histograms representing a distribution of the number of pixels in respect to density values of those pixels;

(B) an attribute information obtaining section that obtains attribute information for that small region by partitioning, based on the histogram data generated with the histogram data generation section, the regions given by the histograms into at least two small regions according to the magnitude of their density values and selecting at least one small region from the at least two small regions;

(C) an enhancement information generation section that generates enhancement information for performing a backlight enhancement process on the image based on the attribute information obtained with the attribute information obtaining section; and (D) a backlight enhancement processing section that performs a backlight enhancement process on the image, based on the enhancement information generated with the enhancement information generation section.

Also provided is (F) a backlight image enhancement method including:

(A) a step of generating, based on data of pixels constituting an image, data of histograms for respective colors, the histograms representing a distribution of the number of pixels in respect to density values of the respective colors of those pixels;

(B) a step of partitioning regions given by the histograms for the various colors into at least two small regions according to the magnitude of the density values, based on the data of the histograms for each color generated with the histogram data generation section;

(C) a step of obtaining, for each color, attribute information for that small region by selecting at least one small region from the at least two small regions;

(D) a step of generating enhancement information for performing a backlight enhancement process on the image based on the obtained attribute information for each color; and (E) a step of performing a backlight enhancement process on the image, based on the generated enhancement information.

Also provided is (A) a backlight image enhancement program executed on a backlight image enhancement apparatus, (G) the backlight image enhancement program executing:

(B) a step of generating, based on data of pixels constituting an image, data of histograms for respective colors, the histograms representing a distribution of the number of pixels in respect to density values of the respective colors of those pixels;

(C) a step of partitioning regions given by the histograms for the respective colors into at least two small regions according to the magnitude of the density values, based on the data of the histograms for each color generated with the histogram data generation section;

(D) a step of obtaining for each color attribute information for that small region by selecting at least one small region from the at least two small regions;

(E) a step of generating enhancement information for performing a backlight enhancement process on the image based on the obtained attribute information for each color; and (F) a step of performing a backlight enhancement process on the image, based on the generated enhancement information.

Also provided is (F) an image reading device including:

(A) an image reading section that reads in an image from an original document;

(B) a histogram data generation section that, based on data of pixels constituting the image read in with the image reading section, generates data of histograms for respective colors, the histograms representing a distribution of a number of pixels in respect to density values for the respective colors of those pixels;

(C) an attribute information obtaining section that obtains for each color attribute information for that small region by partitioning, based on the histogram data for the respective colors generated with the histogram data generation section, the regions given by the histograms for the respective colors into at least two small regions according to the magnitude of the density values and selecting at least one small region from the at least two small regions;

(D) an enhancement information generation section that generates enhancement information for performing a backlight enhancement process on the image based on the attribute information for each color obtained with the attribute information obtaining section; and (E) a backlight enhancement processing section that performs a backlight enhancement process on the image, based on the enhancement information generated with the enhancement information generation section.

Also provided is (G) an image reading method including:

(A) a step of reading in an image from an original document;

(B) a step of generating, based on data of pixels constituting the image that has been read in, data of histograms for respective colors, the histograms representing a distribution of a number of pixels in respect to density values for the respective colors of those pixels;

(C) a step of partitioning, based on the histogram data for the respective colors generated with the histogram data generation section, the regions given by the histograms for the respective colors into at least two small regions according to the magnitude of the density values;

(D) a step of obtaining for each color attribute information for that small region by selecting at least one small region from the at least two small regions;

(E) a step of generating enhancement information for performing a backlight enhancement process on the image based on the obtained attribute information for each color; and (F) a step of performing a backlight enhancement process on the image, based on the generated enhancement information.

Also provided is (F) a printing apparatus including:

(A) a printing section that prints an image on a medium;

(B) a histogram data generation section that, prior to printing the image with the printing section and based on data of pixels constituting the image, generates data of histograms for respective colors, the histograms representing a distribution of a number of pixels in respect to density values for the respective colors of those pixels;

(C) an attribute information obtaining section that obtains for each color attribute information for that small region by partitioning, based on the histogram data for the respective colors generated with the histogram data generation section, the regions given by the histograms for the respective colors into at least two small regions according to the magnitude of the density values and selecting at least one small region from the at least two small regions;

(D) an enhancement information generation section that generates enhancement information for performing a backlight enhancement process on the image based on the attribute information for each color obtained with the attribute information obtaining section; and (E) a backlight enhancement processing section that performs a backlight enhancement process on the image, based on the enhancement information generated with the enhancement information generation section.

Overview of the Image Reading System

Figure 2:
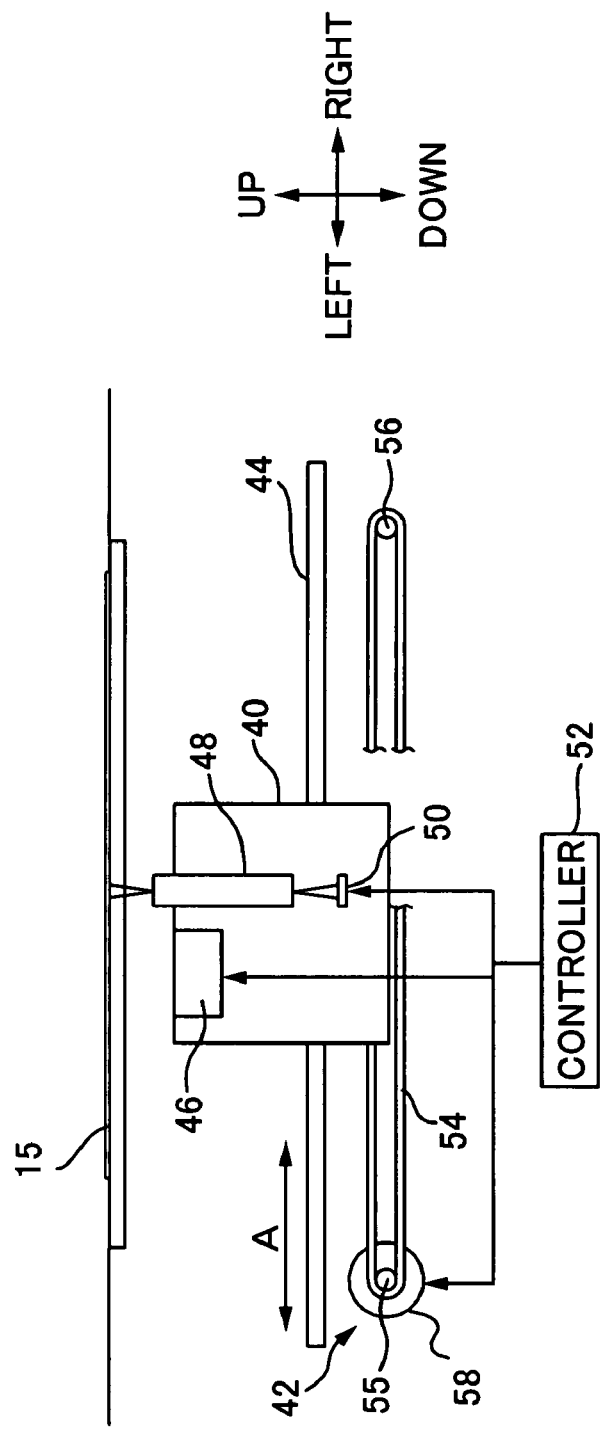
FIG. 2 is an explanatory diagram showing an example of the internal configuration of an image reading device.
Figure 3:
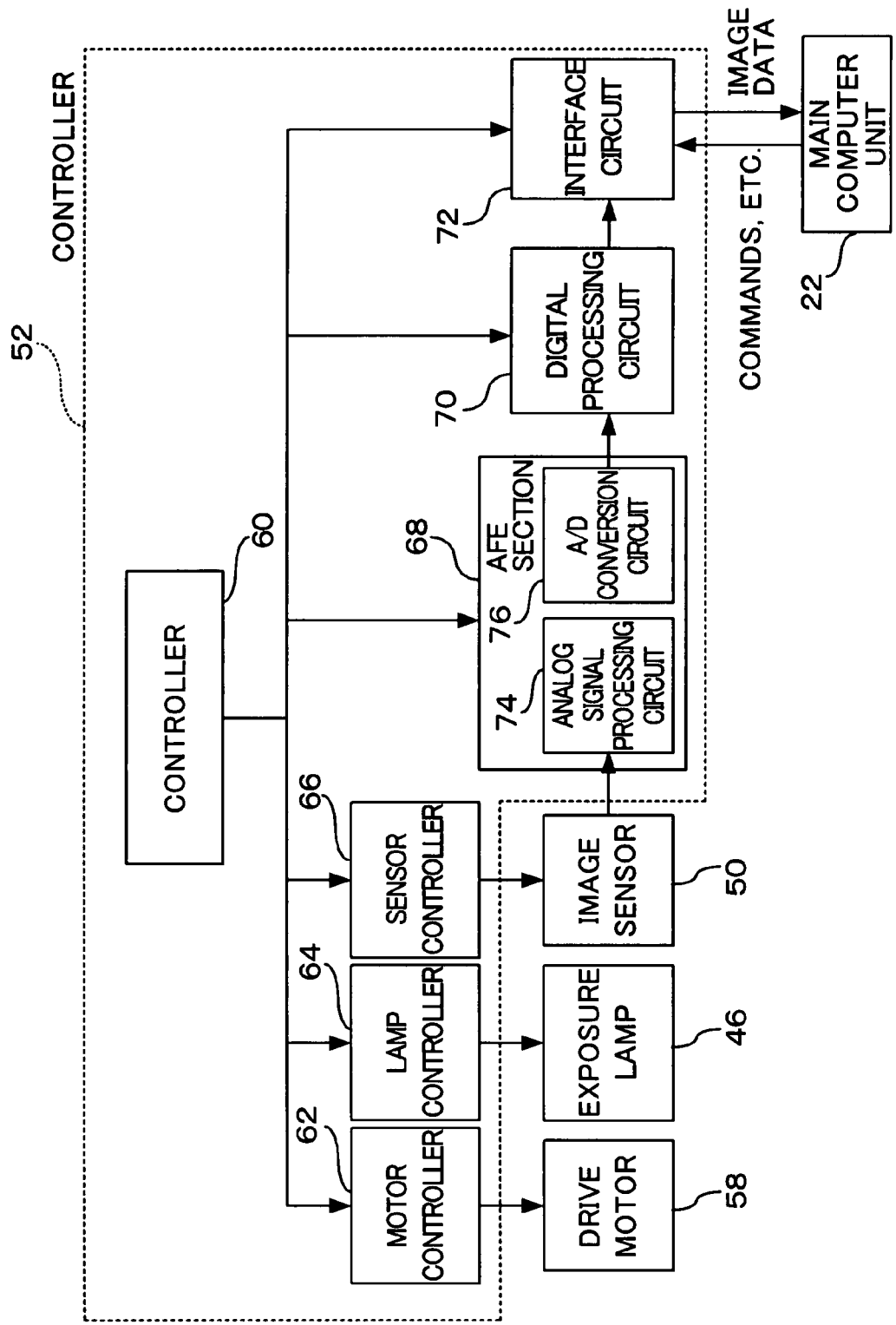
FIG. 3 is an explanatory diagram showing an example of the system configuration of the image reading device.
Figure 4:
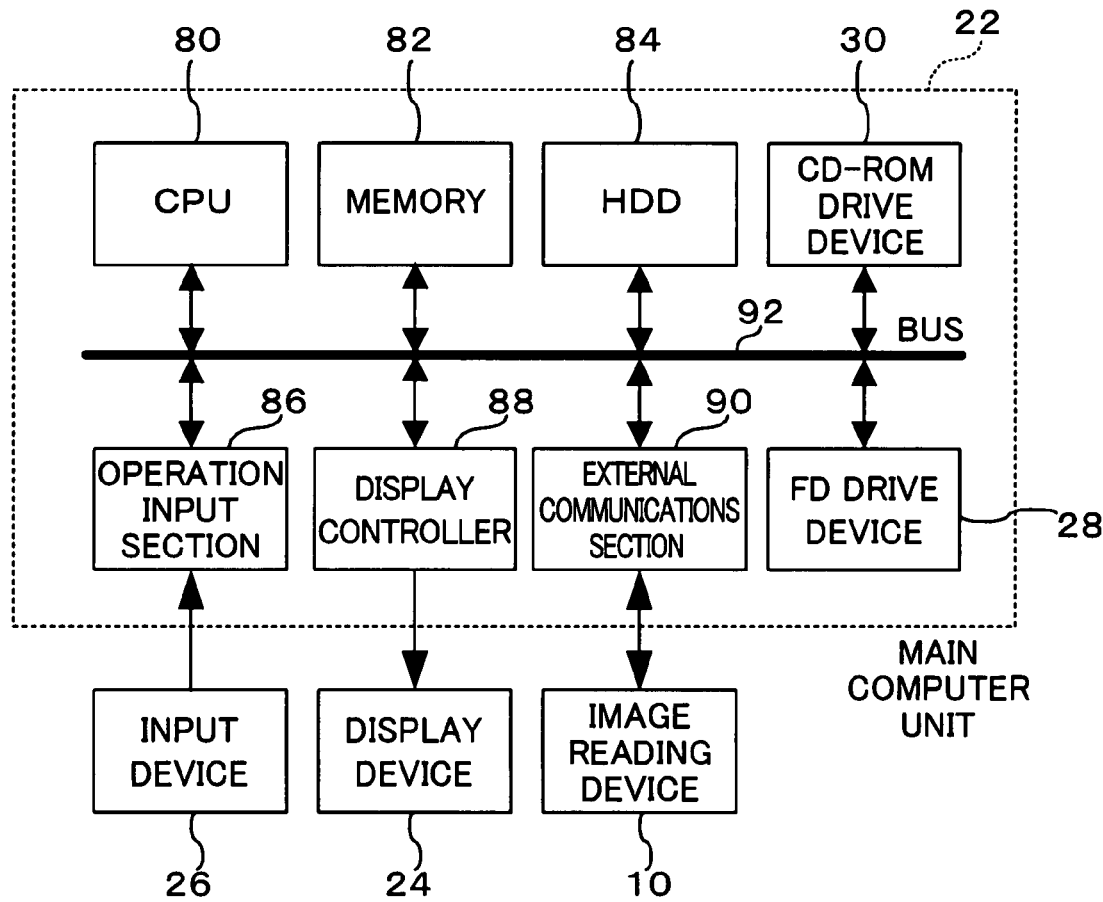
FIG. 4 is an explanatory diagram showing an example of the system configuration of a computer.

A case where a backlight image determining apparatus according to this invention is applied to the image reading system is taken as an example and described below. FIGS. 1 through 4 are diagrams for describing an embodiment of the image reading system applied with the backlight image determining apparatus. FIG. 1 describes an embodiment of the image reading system. FIG. 2 is a diagram describing an example of the internal structure of an image reading device. FIG. 3 is a diagram describing an example of the system configuration of the image reading device. FIG. 4 is a diagram describing the system configuration of a computer device.

As shown in FIG. 1, an image reading system 2 has an image reading device 10 and a computer device 20 that is communicably connected to the image reading device 10 through a wired or a wireless connection. The image reading device 10, as shown in FIG. 1, is a device generally referred to as a scanner, and is provided with an original document platen 12 and an original document platen cover 14 that opens and closes the upper surface portion of the original document platen 12. An original document 15 whose image is to be read is set on the original document platen 12. The original document plate cover 14 is provided at the rear end portion of the original document platen 12 in such a manner that it can open and close about hinge sections 18.

On the other hand, as shown in FIG. 1, the computer device 20 is for example provided with a main computer unit 22, a display device 24, and an input device 26. The main computer unit 22 is constituted by any of various types of computers such as a personal computer. Here, a reading device 32 such as a FD drive device 28 or a CD-ROM drive device 30 is provided in the main computer unit 22. It is also possible for the main computer unit 22 to be provided with a MO (Magnet Optical) disk drive device or a DVD drive device as well. The display device 24 is constituted by any one of various display devices, including CRT displays, plasma displays, and liquid crystal displays. The input device 26 is constituted by a keyboard 34 and a mouse 36, for example. It should be noted that here the display device 24 corresponds to the "image display section." The input device 26, such as the keyboard 34 and the mouse 36, corresponds to the "operation input section."

Image Reading Device

As shown in FIG. 2, within the original document platen 12 of the image reading device 10 are provided a carriage 40, a drive mechanism 42 that moves the carriage 40 parallel to direction of the arrow A in the drawing while keeping it a predetermined distance from the original document platen 12, and a guide 44 for supporting the carriage 40 while guiding its movement.

The carriage 40 is provided with an exposure lamp 46 that serves as a light source for irradiating light onto the original document 15 through the original document platen 12, a lens 48 on which the reflection light that has been reflected by the original document 15 is incident, and an image sensor 50 that is incorporated into the carriage 40 and that receives the reflection light through the lens 48. The image sensor 50 is constituted by, for example, a linear CCD sensor in which photoelectric conversion elements such as photodiodes for converting light signals into electrical signals are disposed in rows. The data of the image that is read by the image sensor 50 are output to a controller 52.

The drive mechanism 42 is provided with a timing belt 54 that is connected to the carriage 40, a pair of pulleys 55 and 56 between which the timing belt 54 is engaged, and a drive motor 58 for rotatively driving the one pulley 55. The driving of the drive motor 58 is controlled by control signals from the controller 52.

As shown in FIG. 3, the controller 52 is provided with a controller 60, a motor controller 62, a lamp controller 64, a sensor controller 66, an AFE (Analog Front End) section 68, a digital processing circuit 70, and an interface circuit 72. The AFE (Analog Front End) section 68 is provided with an analog signal processing circuit 74 and an A/D conversion circuit 76.

The controller 60 controls the motor controller 62 and the lamp controller 64, the sensor controller 66, the AFE (Analog Front End) section 68, the digital processing circuit 70, and the interface circuit 72, based on commands from the main computer unit 22, for example. The motor controller 62 controls the driving of the drive motor 58 for moving the carriage 40 based on commands from the controller 60. The lamp controller 64 controls the emission of light by the exposure lamp 46. The sensor controller 66 performs control of the image sensor 50.

The analog signal processing circuit 74 of the AFE (Analog Front End) section 68 performs signal processing on the analog signals of the image that has been read by the image sensor 50. The A/D conversion circuit 76 of the AFE (Analog Front End) section 68 A/D converts the signal of the image that has been signal processed by the analog signal processing circuit 74 into a digital signal.

The digital processing circuit 70 executes digital signal processing on the digital signals that are sent from the A/D conversion circuit 76 of the AFE (Analog Front End) section 68. Here, specifically, various types of image processing is executed, including enhancements such as shading enhancement. The digital signals on which digital signal processing has been executed are output to the outside, that is, here the main computer unit 22 that is connected to the image reading device 10, by the interface circuit 72 as data (image data) of the image that has been read from the original document 15. In addition to this, the interface circuit 72 receives commands from the main computer unit 22 to the image reading device 10, for example.

Main Computer Unit

As shown in FIG. 4, the main computer unit 22 is provided with a CPU 80, a memory 82, a HDD (hard disk drive device) 84, an operation input section 86, a display controller 88, an external communications section 90, and a bus 92. In addition to these, the main computer unit 22 is also provided with the CD-ROM drive device 30 and the FD drive device 28 described earlier. The CPU 80, the memory 82, the HDD (hard disk drive device) 84, the CD-ROM drive device 30, the FD drive device 28, the operation input section 86, the display controller 88, and the external communications section 90 are communicably connected to one another via the bus 92.

The CPU 80 carries out the overall control of the main computer unit 22. The memory 82 is for holding the programs that are executed by the CPU 80 and various types of data such as the working data that are used by those programs. The HDD (hard disk drive device) 84 stores not only the Operating System (OS) that is run on the CPU 80 but also various programs, such as various types of application programs and drivers, and various types of data such as image data. The operation input section 86 is connected to the input device 26, such as the keyboard 34 or the mouse 36, and through these input devices 26 it obtains information that has been input by the user. The display controller 88 controls the images that are displayed on the screen of the display device 24, for example, based on commands from the CPU 80. The external communications section 90 is for performing communication between the various peripheral devices, such as the image reading device 10, connected to outside of the main computer unit 22.

The CPU 80 reads programs from the HDD (hard disk drive device) 84 and runs those programs under the Operating System (OS). The programs that are executed here are not only various application programs but also the various drivers for controlling the image reading device 10, the operation input section 86, and the display controller 88, for example.

The driver for controlling the image reading device 10 is generally called the scanner driver. The scanner driver is a program that is installed on the main computer unit 22 through various types of communications lines, such as the Internet, or by way of various types of storage media such as CD-ROM and floppy disk (FD). By installing the scanner driver on the main computer unit 22, the main computer unit 22 functions as a control device for controlling the image reading device 10.

Scanner Driver

Figure 5:
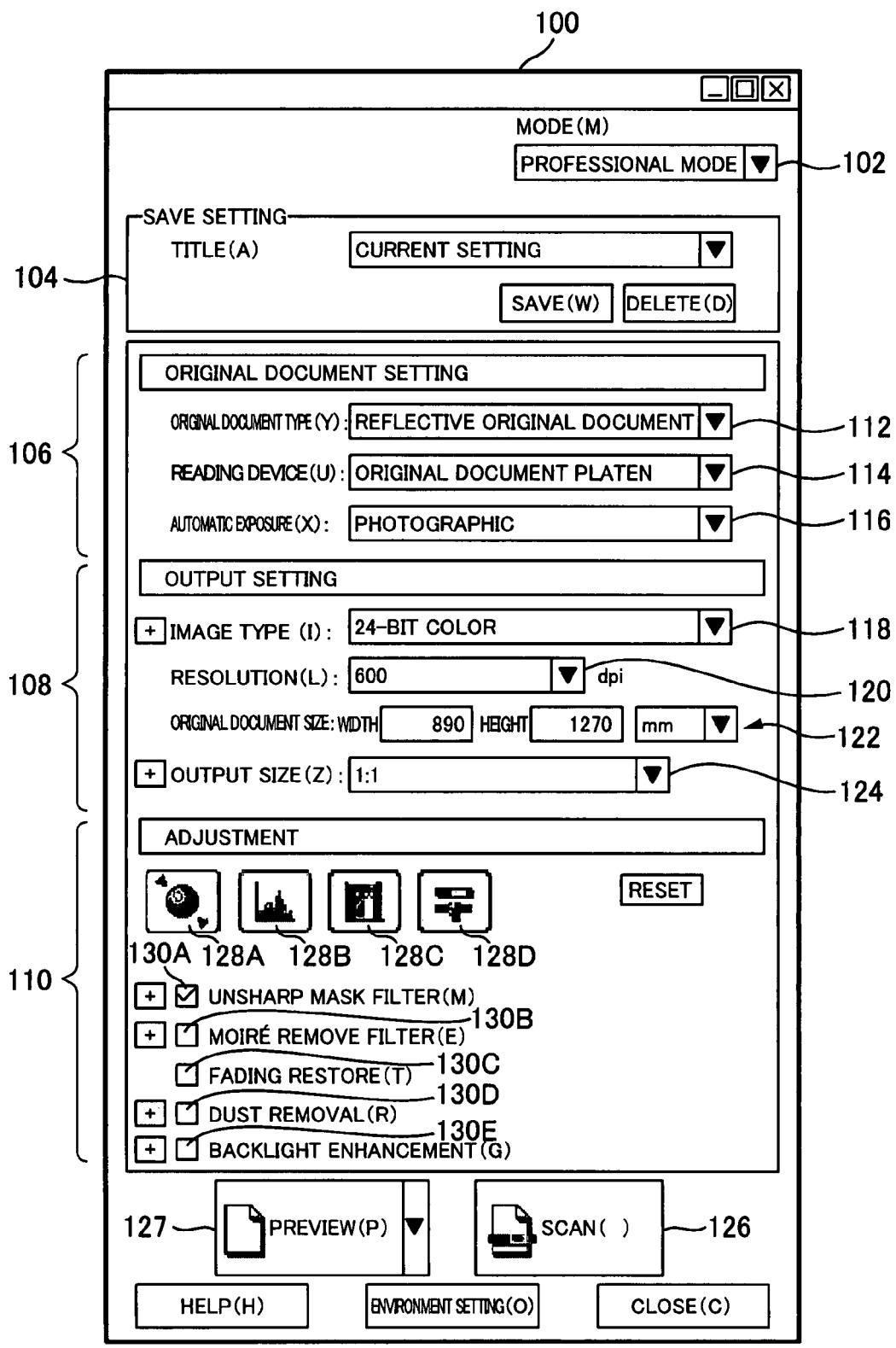
FIG. 5 is an explanatory diagram showing an example of a main dialog box of a scanner driver.

An example of the user interface of the scanner driver is described next. FIG. 5 shows a main dialog box 100 of this user interface. This user interface is displayed on the display screen of the display device 24 by the CPU 80 of the main computer unit 22 through the display controller 88. While viewing the dialog box 100 of the user interface that is displayed on the display screen of the display device 24, the user can alter the various settings of the scanner driver using the input device 26, such as the keyboard 34 or the mouse 36.

The main dialog box 100 includes a "mode selection field" 102, a "save setting field" 104, an "original document setting field" 106, an "output setting field" 108, and an "adjustment field" 110. In the "mode selection field" 102 it is possible for the user to select one mode from among a plurality of mode types. Here, the "professional mode" has been selected. Also in the "save setting field" 104, the user can save or delete the current settings by clicking a "save button" or a "delete button."

In the "original document setting field" 106, the user can alter the settings for an "original document type" 112, a "reading device" 114, and an "automatic exposure" 116. In the "original document type" 112, it is possible to select the type of the original document that has been set. For example, it is possible to select a "reflective original document" or a "film", for example. In the "reading device" 114, it is possible to select an "original document platen", for example. In the "automatic exposure" 116, it is possible to change the exposure settings to those suited for the original document type to be read. For example, it is possible to select "for photographs" or "for paper documents", for example.

In the "output setting field" 108, the user can carry out various settings relating to the image output. Specifically, in the "output setting field" 108, it is possible to adjust the settings for an "image type" 118 of the output image, a "resolution" 120 when reading, an "original document size" 122 when reading, and an "output size" 124. In the "image type" 118, it is possible to make a selection for the number of colors of the read image from among the three options of color, grayscale, and monochrome. In the "resolution" 120, it is possible to adjust the setting of the resolution of the image that is read. In the "original document size" 122, it is possible to adjust the setting of the size of the image to be read.

The scanner driver controls the external image reading device 10 based on information that has been set by the user through the dialog box 100 when the user clicks the "scan button" 126 in the lower section of the dialog box 100, and reads the image from original document that has been set in the image reading device 10. The data of the image that has been read are sent to the main computer unit. When the user clicks a "preview button" 127 located in the lower section of the dialog box 100, the scanner driver displays a preview window for displaying the image that has been read by the image reading device 10 on the display screen of the display device 24.

Additionally, the scanner driver has the function of adjusting the image that has been read by the image reading device 10. Adjustment of the image that has been read is carried out through the "adjustment field" 110 of the main dialog box 100. The "adjustment field" 110 is provided with four buttons and five check boxes for adjusting the image that has been read by the image reading device 10. The four buttons 128A, 128B, 128C, and 128D are the automatic exposure button 128A, the histogram adjustment button 128B, the density enhancement button 128C, and the image adjustment button 128D respectively. Also five check boxes 130A, 130B, 130C, 130D, and 130E are the check box 130A for an unsharp mask filter, the check box 130B for a moiré remove filter, the check box 130C for fading restore, the check box 130D for dust removal, and the checkbox 130E for backlight enhancement respectively.

The automatic exposure button 128A is the button that is clicked when the user would like the exposure to be adjusted automatically. The histogram adjustment button 128B is the button that is clicked when the user would like to adjust the contrast of the image. A histogram adjustment dialog box is called up when the histogram adjustment button 128B has been clicked. The density enhancement button 128C is the button that is clicked when the user would like to enhance the balance of the image darkness. A dialog box for density enhancement is called up when the density enhancement button 128C has been clicked. The image adjustment button 128D is the button that is clicked when the user wants to adjust the brightness, contrast, saturation, and color balance of the image. A dialog box for image adjustment is called up when the image adjustment button 128D is clicked.

On the other hand, the check box 130A for the unsharp mask filter is the check box for specifying whether or not to use the unsharp mask filter, and is checked when the user wants to sharpen up the image. The check box 130B for the moiré remove filter is the check box for specifying whether or not to use a filter for removing moiré (checkered shading), which occurs when scanning the printed material, and is checked by the user when the moiré is noticeable. The check box 130C for fading restore is checked when the colors of a faded photograph are to be restored. The check box 130D for dust removal is checked when the user wants to reduce dust on the film during film scanning. Further, the checkbox 130E for backlight enhancement is checked when the user wants to perform backlight enhancement to the read image. This backlight enhancement is described in detail later.

Image Adjustment

Figure 6:
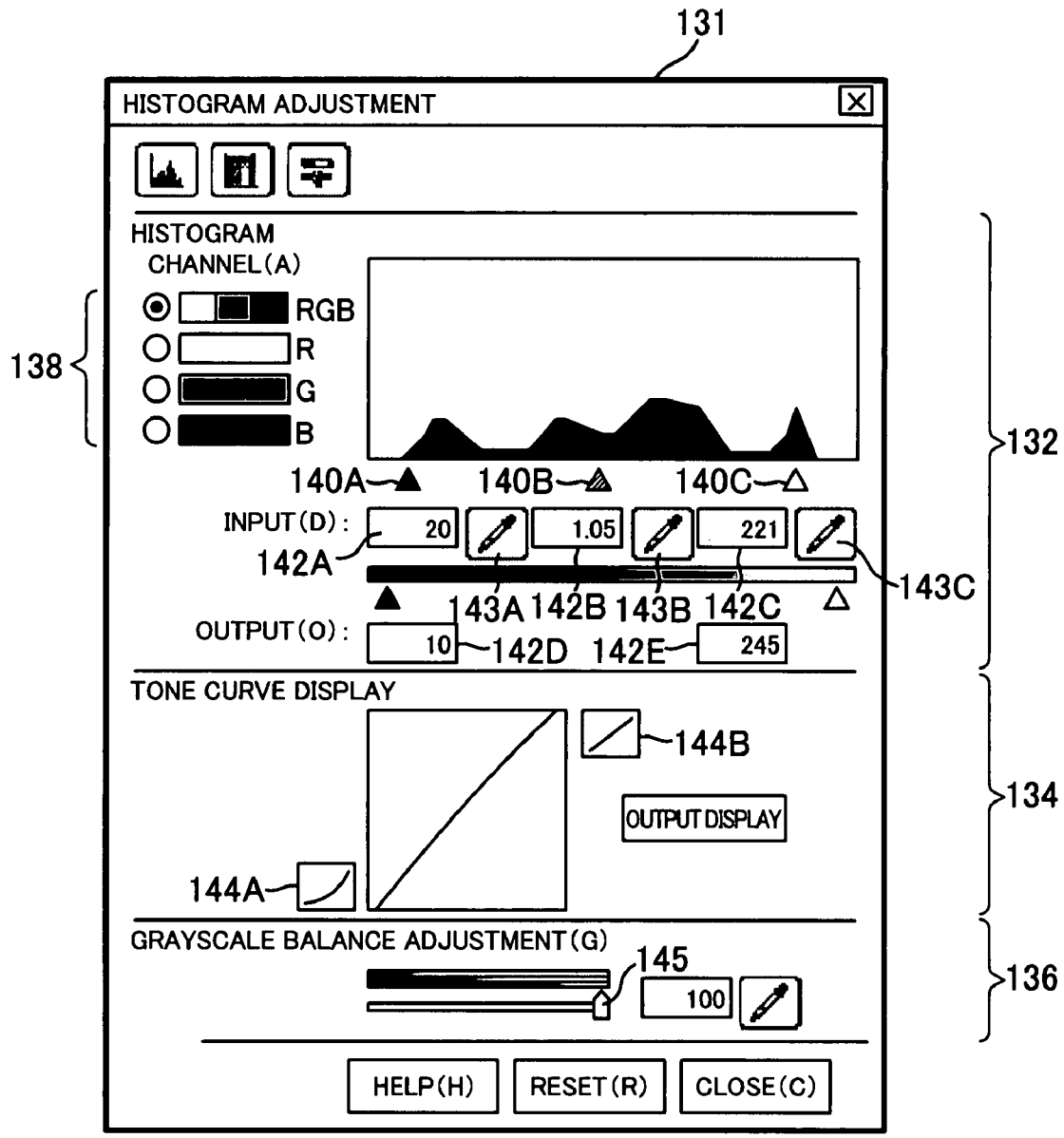
FIG. 6 is an explanatory diagram showing an example of a dialog box for a histogram adjustment.
Figure 7:
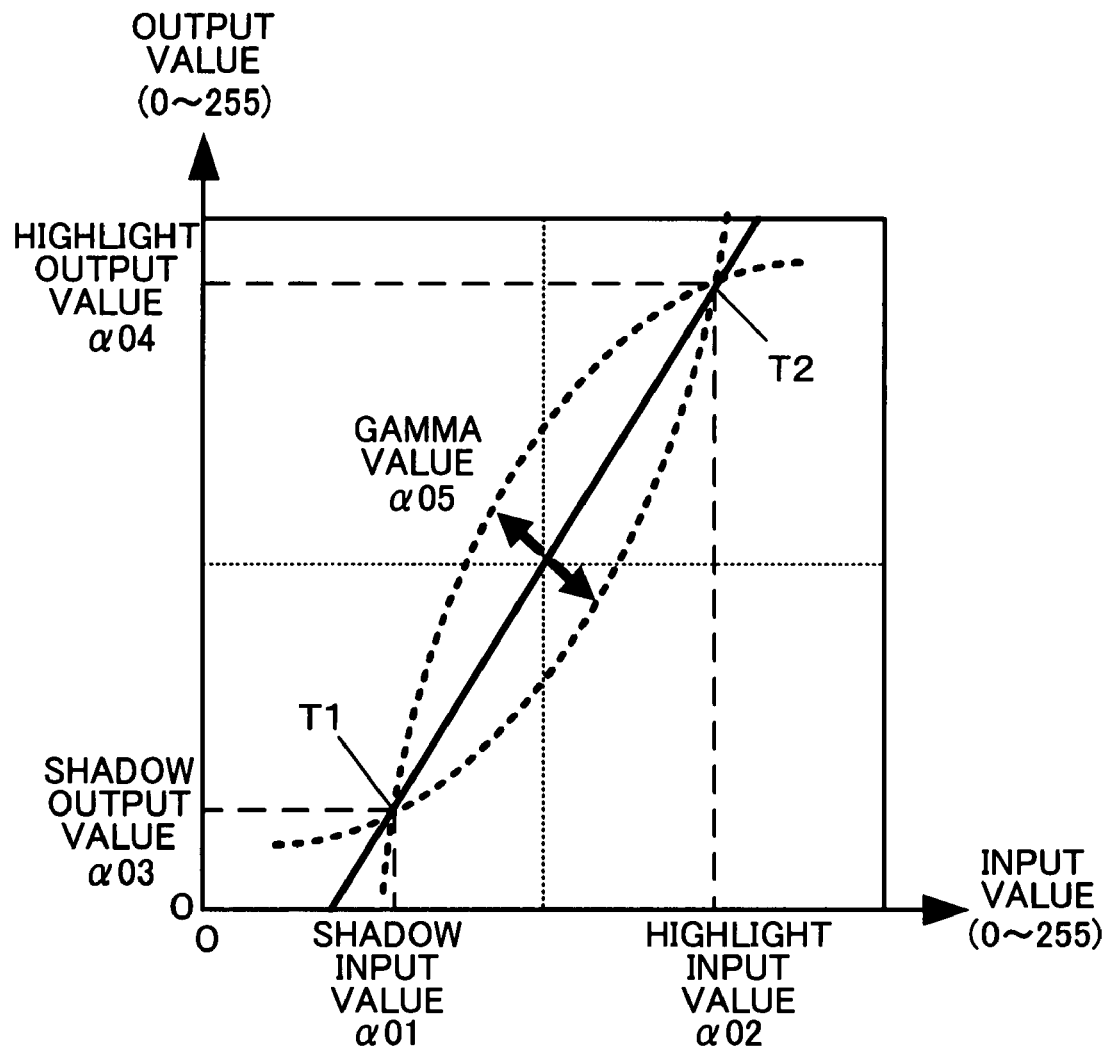
FIG. 7 is an explanatory diagram of a tone curve adjustment method.
Figure 8:
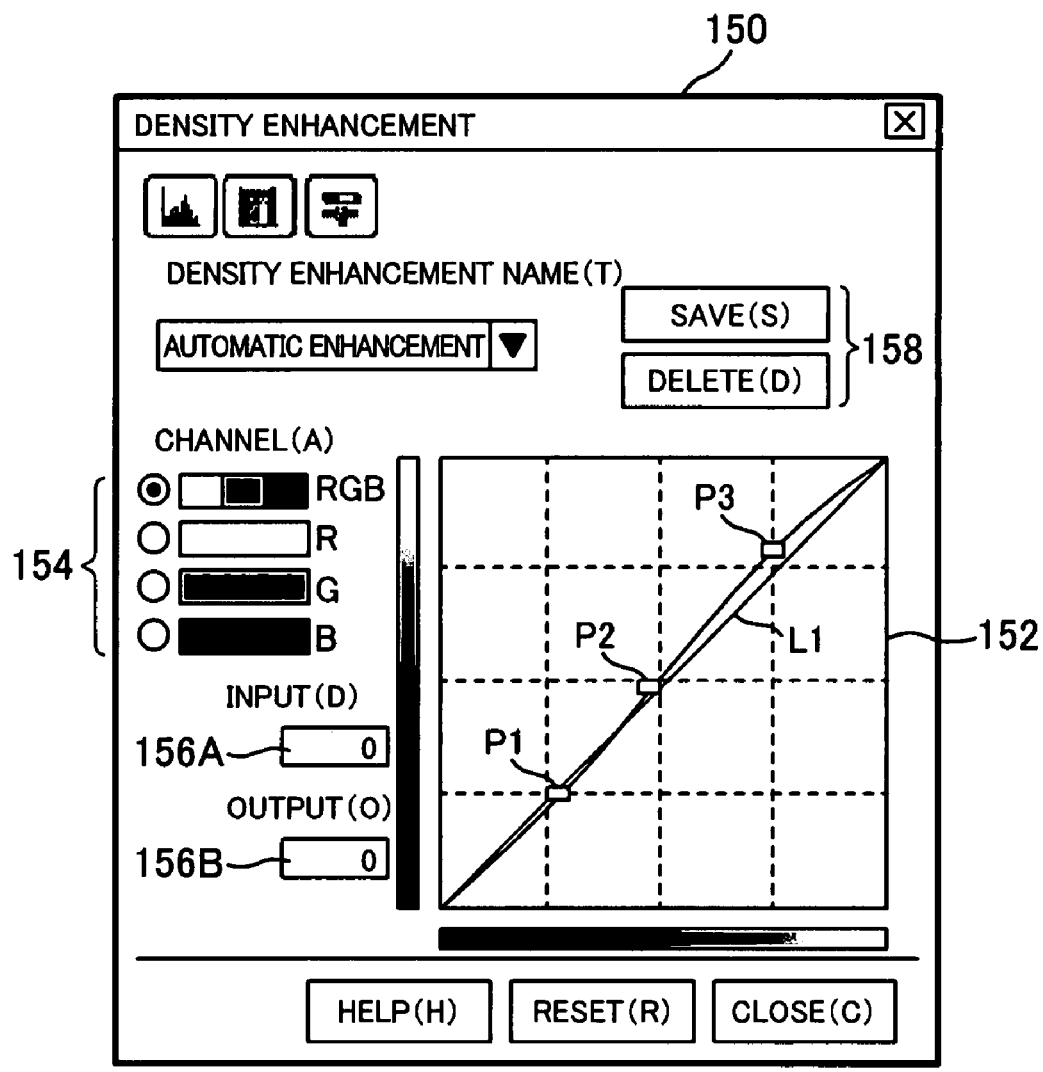
FIG. 8 is an explanatory diagram showing an example of a main dialog box for density enhancement.
Figure 9:
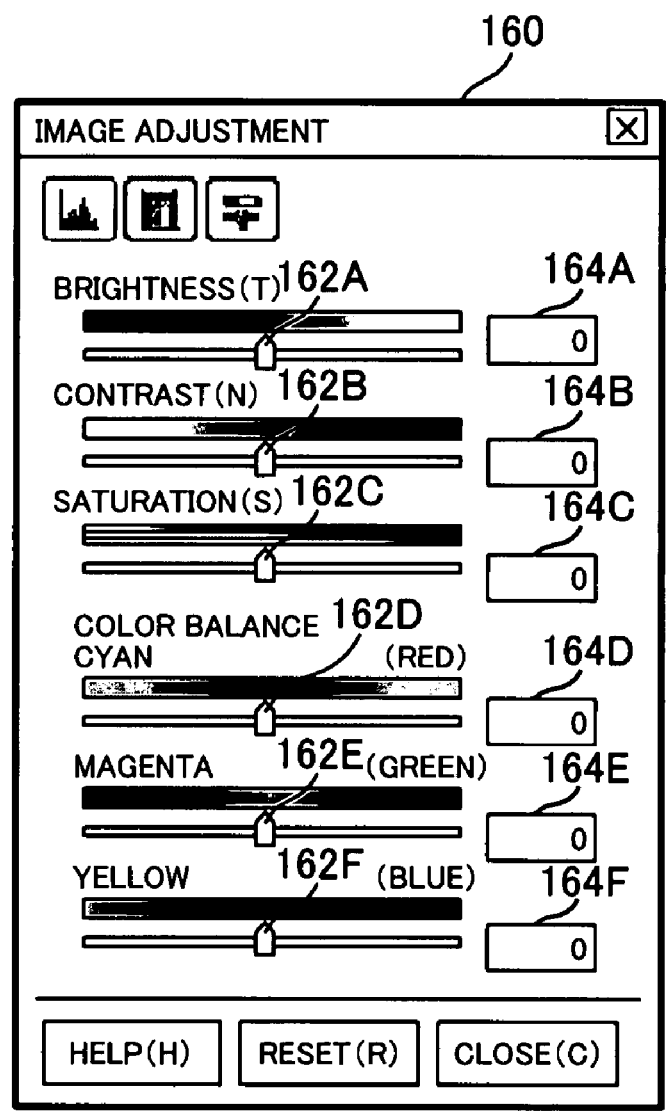
FIG. 9 is an explanatory diagram showing an example of a dialog box for an image adjustment.

Next, a histogram adjustment, a density enhancement, and an image adjustment for adjusting the image are described. FIGS. 6 through 9 are for describing the histogram adjustment, the density enhancement, and the image adjustment, respectively. FIG. 6 shows the dialog box for the histogram adjustment. FIG. 7 describes an overview of a specific adjustment through the histogram adjustment. FIG. 8 shows the dialog box for the density enhancement. FIG. 9 shows the dialog box for the image adjustment.

Histogram Adjustment

In the "histogram adjustment", the contrast of an image, for example, is adjusted so as to improve the appearance of the image that has been read. As shown in FIG. 6, a dialog box 131 for histogram adjustment is provided with a histogram display field 132 in which a histogram of the image to be edited is displayed, a tone curve display field 134 in which the tone curve that expresses the outcome of adjustment by the histogram is displayed, and a grayscale balance adjustment field 136 for adjusting the grayscale balance in order to exclude color fogging. Here, the "histogram" displays the distribution of the brightness and the color of the overall image, and expresses the data distribution of the image from black to white (pixel number) on a graph.

The histogram display field 132 is provided with a channel field 138 for selecting the type (channel (color)) of the histogram to be displayed. In the channel field 138, it is possible to select from among the four options of all RGB (red, green, blue) colors, R (red) only, G (green) only, and B (blue) only. When the user wants to adjust all the RGB (red, green, blue) colors, and selects the uppermost switch in the channel field 138, a histogram of all RGB (red, green, blue) colors is displayed on the right side. When the user wants to adjust R (red) only, and selects the second switch from the top of the channel field 138, a histogram of R (red) only is displayed on the right side. When the user wants to adjust G (green) only, and selects the third switch from the top of the channel field 138, a histogram of G (green) only is displayed on the right side. When the user wants to adjust B (blue) only, and selects the fourth switch from the top of the channel field 138, a histogram of B (blue) only is displayed on the right side.

When adjusting the histogram that has been displayed, three sliders 140A, 140B, 140C that are provided below the histogram displayed are used for this adjustment. The three sliders 140A, 140B, 140C are the slider 140A for adjusting shadow, the slider 140B for adjusting gamma, and the slider 140C for adjusting highlight respectively. The slider 140A for adjusting the shadow is displayed by a solid black triangle. The slider 140B for adjusting gamma is displayed by a solid gray triangle. The slider 140C for adjusting highlighting is displayed by an empty triangle. When an adjustment is performed by using these three sliders 140A, 140B, and 140C, the three sliders 140A, 140B, 140C are respectively moved in the left and right direction independently. Specifically, the slider 140A for adjusting shadow is moved to a position slightly to the right side from the left end of the histogram peak. The slider 140C for adjusting highlighting is moved to a position slightly to the left side from the right end of the histogram peak. The slider 140B for adjusting gamma is moved to the left and right between the slider 140A for adjusting shadow and the slider 140C for adjusting highlighting so as to adjust the contrast of the intermediate section to an appropriate contrast. By doing this, the balance of the overall contrast of the image to be edited becomes good, and the appearance of the image can be improved.

The histogram display field 132 is also provided with numerical value input fields 142A, 142B, and 142C for independently and directly specifying with numerical values the positions of the three sliders 140A, 140B, and 140C, respectively. A shadow input value is input to the numerical value input field 142A. A gamma value is input to the numerical value input field 142B. A highlight input value is input to the numerical value input field 142C. Thus, the shadow input value, the highlight input value, and the gamma value can be easily specified by directly inputting the numerical values to each of the numerical value input fields 142A, 142B, and 142C.

To the right of these three numerical value input fields 142A, 142B, and 142C are provided pipette buttons 143A, 143B, and 143C respectively. These pipette buttons 143A, 143B, and 143C are buttons for directly specifying a point on the image to be edited that is displayed on the preview screen, which is displayed separately from the dialog box for histogram adjustment. Numerical values corresponding to a point (pixel) that has been designated on the image to be edited on the preview screen are directly input to the three numerical value input fields 142A, 142B, and 142C using these pipette buttons 143A, 143B, and 143C.

Further, below these two numerical value input fields 142A and 142C to which the shadow input value and the highlight input value are input, are provided two numerical value input fields 142D and 142E respectively. A shadow output value that corresponds to the shadow input value is input to the numerical value input field 142D on the left side. A highlight output value that corresponds to the highlight input value is input to the numerical value input field 142E on the right side.

There are four kinds of adjustment possibilities using these sliders 140A, 140B, and 140C and the numerical value input fields 142A, 142B, 142C, 142D, and 142E, and these are all RGB (red, green, blue) colors, R (red) only, G (green) only, and B (blue) respectively.

FIG. 7 describes this histogram adjustment in detail. In the histogram adjustment, the tone curve that expresses the correlation between the input data and the output data, such as shown in FIG. 7, is defined based on the shadow input value $\alpha 01$, the shadow output value $\alpha 03$, the highlight input value $\alpha 02$, the highlight output value $\alpha 04$, and the gamma value $\alpha 05$, which are set through the sliders 140A, 140B, and 140C or the numerical value input fields 142A, 142B, 142C, 142D, and 142E. In other words, the tone curve that is defined here is formed passing through a point T1 (also called a shadow point) defined by the shadow input value $\alpha 01$ and the shadow output value $\alpha 03$ that have been set and a point T2 (also called a highlight point) defined by the highlight input value $\alpha 02$ and the highlight output value $\alpha 04$ that have been set. Further, the tone curve is formed bulging toward either of one side of a straight line that connects these point T1 and point T2, in accordance with the gamma value $\alpha 05$ that has been set. Thus, the tone curve that expresses the correlation between the input data and the output data is defined based on the shadow input value $\alpha 01$, the shadow output value $\alpha 03$, the highlight input value $\alpha 02$, the highlight output value $\alpha 04$, and the gamma value $\alpha 05$ that have been set in this way. It should be noted that the tone curve is defined for each color of R (red), G (green), and B (blue) respectively.

The tone curve that has been defined in this way is displayed in the tone curve display field 134 as shown in FIG. 6. In the tone curve display field 134, the tone curve that corresponds to the outcome of the adjustment performed through the histogram display field 132 is displayed. The tone curve can be more finely tuned in the tone curve display field 134 by adjusting the gradation outside the point T1 (shadow point) or the point T2 (highlight point). Specifically, the user clicks on end portion curve shape change buttons 144A and 144B, which are provided at the lower left side and the upper right side of the tone curve respectively, and selects the desired end portion curve shape from the pull-down menu that is displayed. Here, for example, the user can select the end portion curve shape from the three options which are "boost," "normal," and "soft." Here, "boost" is selected when the user wants to remove unevenness by making a portion of a white background stark white or by making a portion of a black background pitch black. Also "normal" is selected when the highlight portion and the shadow portion are to be expressed as they are. "Soft" is selected when reverting a stark white portion to the original white background or when reverting a pitch black portion to the original black background.

A slider 145 for adjusting the grayscale balance is provided in the grayscale balance adjustment field 136. By moving the slider 145 to the left and right, it is possible to adjust the grayscale balance and remove color fogging.

Density Enhancement

"Density enhancement" is the adjustment that is used when partially changing the expression of lightness and darkness in the image. Specifically, with "density enhancement," the tone curve is adjusted so as to improve the appearance of the image that has been read. In other words, by adjusting the density curve (tone curve) which changes to a shadow (darkest), a mid-tone (intermediate tone), and a highlight (lightest), it is possible to produce a balanced brightness and contrast in the image overall. To this end, as shown in FIG. 8, a dialog box 150 for density enhancement is provided with a tone curve display section 152 and a channel field 154 for selecting the type (channel (color)) of the tone curve that is displayed on the tone curve display section 152.

In the channel field 154, it is possible to make a selection from among the four options of all RGB (red, green, blue) colors, R (red) only, G (green) only, and B (blue) only. When the user wants to adjust all RGB (red, green, blue) colors, and selects the uppermost switch of the channel field 154, the tone curves of all the RGB (red, green, blue) colors are displayed to the right side. When the user wants to adjust R (red) only, and selects the second switch from the top of the channel field 154, the tone curve of R (red) only is displayed to the right side. When the user wants to adjust G (green) only, and selects the third switch from the top of the channel field 154, the tone curve of G (green) only is displayed to the right side. When the user wants to adjust B (blue) only, and selects the fourth switch from the top of the channel field 154, the tone curve of B (blue) only is displayed to the right side.

The tone curve whose horizontal axis is the input value and vertical axis is the output value is displayed in the tone curve display section 152. If settings have been made such that the output value does not change from the input value, the tone curve becomes a straight light as shown by line L1 in the drawing.

If the tone curve is to be adjusted, then any point is set on the tone curve that is displayed in the tone curve display section 152 and the tone curve is adjusted by shifting this point in the up, down, left, and right directions. In this embodiment, three points P1, P2, and P3 are arbitrarily set on the tone curve that is displayed in the tone curve display section 152, and these three points P1, P2, and P3 are shifted by moving them in the up, down, left, and right directions from the reference line L1 respectively. By doing this, the user forms a desired tone curve on the tone curve display section 152. It should be noted that coordinates of each of the three points P1, P2, and P3 also can be set through two numerical value input fields 156A and 156B which are provided to the left side of the tone curve display section 152 respectively. Here, by entering the input value to the upper numerical value input field 156A and entering the output value to the lower numerical value input field 156B, it is possible to set the coordinates for each of the points P1, P2, and P3 respectively.

Four types of tone curve adjustment are possible, those being all RGB (red, green, blue) colors, R (red) only, G (green) only, and B (blue) only. The tone curve settings can be saved through a density enhancement setting save field 158 that is provided in an upper portion of the density enhancement dialog box 150.

Image Adjustment

"Image adjustment" encompasses four types of adjustment, such as (1) a brightness adjustment, (2) a contrast adjustment, (3) a saturation adjustment, and (4) a color balance adjustment, as shown in an image adjustment dialog box 160 of FIG. 9. Further, "(4) the color balance adjustment" encompasses three types of adjustments, such as an adjustment between cyan (C) and red (R), an adjustment between magenta (M) and green (G), and an adjustment between yellow (Y) and blue (B).

(1) Brightness Adjustment

"(1) The brightness adjustment" is performed when the image is too bright or too dark. "(1) The brightness adjustment" can be performed by moving a slider 162A left and right or by directly inputting the numerical value into a numerical value input field 164A that is provided to the right side of the slider 162A.

(2) Contrast Adjustment

"(2) The contrast adjustment" is performed to enhance the contrast, or conversely, to reduce the difference between light and dark. "(2) The contrast adjustment" can be performed by moving a slider 162B left and right or by directly inputting the numerical value into a numerical value input field 164B that is provided to the right side of the slider 162B.

(3) Saturation Adjustment

"(3) The saturation adjustment" is performed when amore vivid color tone is desired. "(3) The saturation adjustment" can be performed by moving a slider 162C left and right or by directly inputting the numerical value into a numerical value input field 164C that is provided to the right side of the slider 162C.

(4) Color Balance Adjustment

"(4) The color balance adjustment" is performed when the image has a red or blue tone, for example. "(4) The color balance adjustment" can be performed by moving each of sliders 162D, 162E, and 162F left and right or by directly inputting the numerical value into numerical value input fields 164D, 164E, and 164F, which are provided to the right side of each of the sliders 162D, 162E, and 162F, respectively. By doing this, it is possible to adjust the image to an appropriate color tone. Specifically, by moving the slider 162D for adjustment between "cyan (C) and red (R)" to the left or right, it is possible to adjust the strength of cyan (C) and red (R). By moving the slider 162E for adjustment between "magenta (M) and green (G)" to the left or right, it is possible to adjust the strength of magenta (M) and green (G). By moving the slider 162F for adjustment between "yellow (Y) and blue (B)" to the left or right, it is possible to adjust the strength of yellow (Y) and blue (B).

Here, "(1) the brightness adjustment" and "(4) the color balance adjustment" each is processing in which conversion for shifting the overall darkness is performed for all three colors R (red), G (green), and B (blue), or for each individual color. "(2) The contrast adjustment" is a processing in which conversion for strengthening or weakening the change in darkness is performed for all three colors R (red), G (green), and B (blue).

On the other hand, "(3) the saturation adjustment" is a processing that employs the following conversion formulas (1) through (3) to convert the data of each of the colors R (red), G (green), and B (blue) respectively. Here, the input data of each of the colors R (red), G (green), and B (blue) are indicated by "R", "G", and "B" respectively. The output data of each of the colors R (red), G (green), and B (blue) are indicated by "R'", "G'", and "B'" respectively.

$$R' = S11 \times R + S12 \times G + S13 \times B \qquad (1)$$

$$G' = S21 \times R + S22 \times G + S23 \times B \qquad (2)$$

$$B' = S31 \times R + S32 \times G + S33 \times B \qquad (3)$$

Here, S11, S12, S13, S21, S22, S23, S31, S32, and S33 are coefficients that are set according to the value of the saturation that has been set. If the saturation is to be increased, then S1, S22, and S33 are set to values that are greater than 1, and on the other hand, S12, S13, S21, S23, S31, and S32 are set to negative values. In this manner, "(3) the saturation enhancement" is carried out.

Setting Data

FIGS. 10A through 10C are for describing the data that are set through the histogram adjustment, the density enhancement, and the image adjustment, respectively. FIG. 10A describes the data that are set through the histogram adjustment. FIG. 10B describes the data that are set through the density enhancement. FIG. 10C describes the data that are set through the image adjustment.

As shown in FIG. 10A, in the case of the histogram adjustment, the shadow input values α11, α21, α31, the shadow output values α13, α23, α33, the highlight input values α12, α22, α32, the highlight output values α14, α24, α34, and the gamma values α15, α25, α35 of each of the colors R (red), G (green), and B (blue) are set as data. In addition to this, here, data α41 and α42 of the "lower end portion shape" and the "upper end portion shape" are set as data for the end portion shape of the tone curve, and an adjustment value α51 for the grayscale balance adjustment is set as data. The scanner driver stores these data α11, α21, α31, α13, α12, α22, α32, α23, α33, α14, α24, α34, α15, α25, α35, α41, α42, and α51 as setting data. It should be noted that in addition to these setting data α11, α21, α31, α13, α23, α33, α12, α22, α32, α14, α24, α34, α15, α25, α35, α41, α42, and α51 being set by the user through the histogram adjustment dialog box 131 illustrated in FIG. 6, for example, it is also possible for those setting data to be set automatically through a computation, for example, by the scanner driver. The scanner driver executes image adjustment on the input image based on the stored setting data α11, α21, α31, α13, α23, α33, α12, α22, α32, α14, α24, α34, α15, α25, α35, α41, α42, and α51.

In the case of the density enhancement, as shown in FIG. 10B, the input coordinates β11, β13, β21, β23, β31, β33, . . . and output coordinates β12, β14, β22, β24, β32, β34, . . . , for a plurality of points P1, P2, P3, . . . that have been set on the tone curves of the colors R (red), G (green), and B (blue), respectively, are set as data. The scanner driver stores the input coordinates β11, β13, β21, β23, β31, β33, . . . and the output coordinates β12, β14, β22, β24, β32, β34, . . . for a plurality of the points P1, P2, P3, . . . as setting data. It should be noted that in addition to the setting data β11, β13, β21, β23, β31, β33, . . . β12, β14, β22, β24, β32, β34, . . . being set by the user through the density enhancement dialog box 150 described in FIG. 8, for example, it is also possible for those setting data to be set automatically through a computation, for example, by the scanner driver. The scanner driver executes the density enhancement based on the stored setting data β11, β13, β21, β23, β31, β33, . . . and β12, β14, β22, β24, β32, β34, . . . .

In the case of image adjustment, as shown in FIG. 10C, a setting value γ1 for "(1) the brightness adjustment," a setting value γ2 for "(2) the contrast adjustment," a setting value γ3 for "(3) the saturation adjustment," and setting values γ4, γ5, γ6 for "(4) the color balance adjustment" are set. There are three settings for the "(4) color balance adjustment," which are the setting value γ4 between cyan (C) and red (R), the setting value γ5 between magenta (M) and green (G), and the setting value γ6 between yellow (Y) and blue (B). The scanner driver stores the setting values γ1, γ2, γ3, γ4, γ5, and γ6 as setting data. It should be noted that in addition to the setting data γ1, γ2, γ3, γ4, γ5, and γ6 being set by the user through the image adjustment dialog box 160 shown in FIG. 9, it is also possible for the setting data to be set automatically through a computation by the scanner driver, for example. The scanner driver executes image adjustment based on the stored setting data γ1, γ2, γ3, γ4, γ5, and γ6.

Adjustment Procedure

Figure 11:
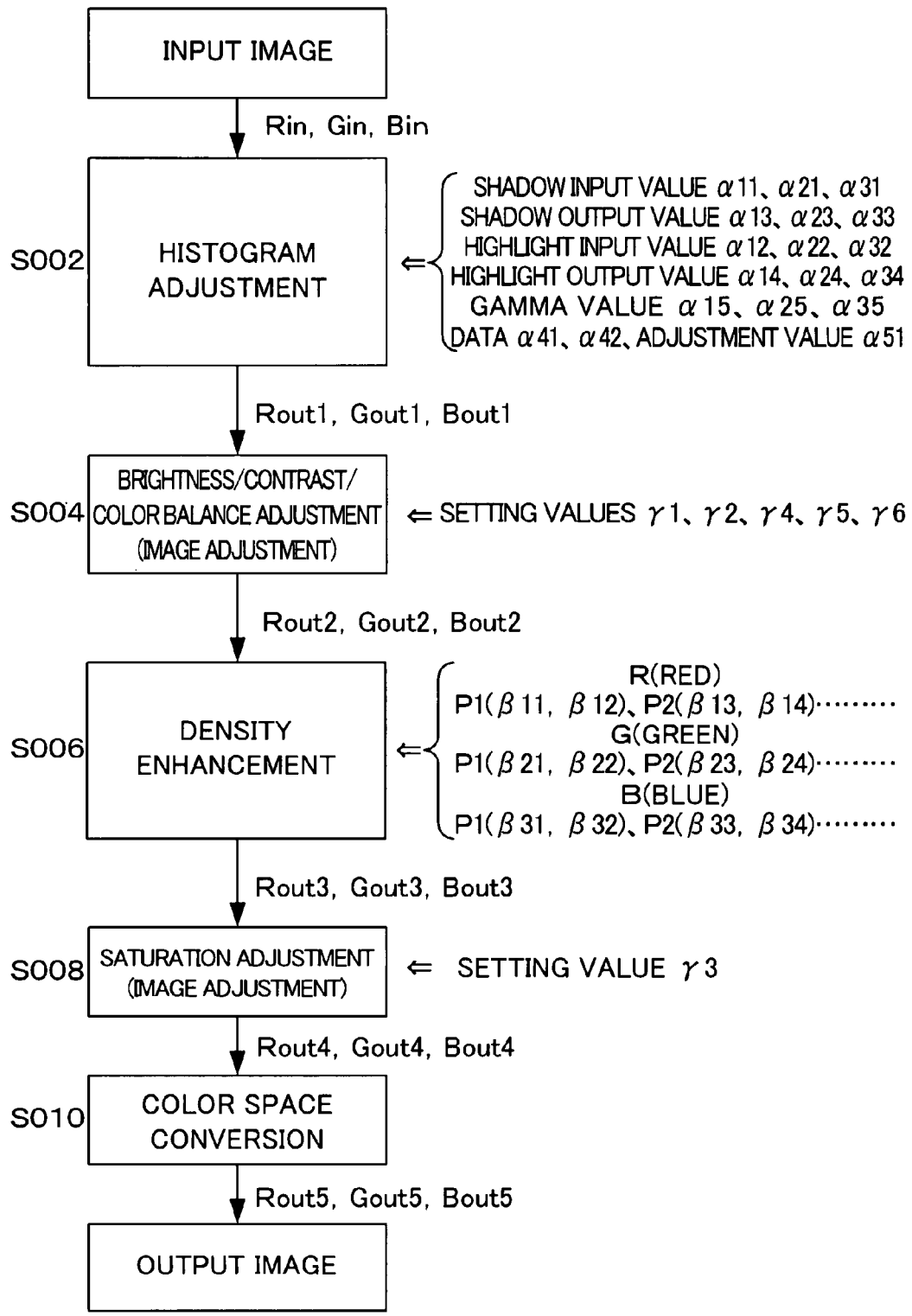
FIG. 11 is an explanatory diagram of an example of an image adjustment procedure.

An example of the procedure for adjusting the input image, that is, here the image that is read by the image reading device 10, based on the data that has been set through the histogram adjustment, the density enhancement, and the image adjustment is described. FIG. 11 shows an example of this procedure.

The scanner driver executes the histogram adjustment on the input image, that is, here the image that is read by the image reading device 10 (S002). In this histogram adjustment, the scanner driver converts and outputs the data Rin, Gin, and Bin of each of the pixels of the input image for each of the colors R (red), G (green), and B (blue) respectively, based on the tone curve defined for each of the colors R (red), G (green), and B (blue) respectively. Here, the scanner driver refers to the shadow input values α11, α21, α31, the shadow output values α13, α23, α33, the highlight input values α12, α22, α32, the highlight output values α14, α24, α34, the gamma values α15, α25, α35, or the data α41 and α42 on the end portion shape of the tone curve or the adjustment value α51 for the grayscale balance adjustment and the like, for each of the colors R (red), G (green), and B (blue), which have been set either automatically or by the user through the histogram adjustment dialog box 131 described in FIG. 6, and based on these data, executes the histogram adjustment. Thus, the scanner driver converts the data Rin, Gin, and Bin (input data) of each of the pixels of the input image into output data Rout1, Gout1, and Bout1 and outputs these.

After the histogram adjustment has been performed in this way, the scanner driver advances the procedure to step S004, and executes the image adjustment on the data of the image that have been subjected to the histogram adjustment (S004). Here, the scanner driver carries out image adjustment by executing (1) the brightness adjustment, (2) the contrast adjustment, and (3) the color balance adjustment. That is to say, the scanner driver executes adjustment based on the setting value γ1 for "(1) the brightness adjustment," the setting value γ2 for "(2) the contrast adjustment," and the setting values γ4, γ5, γ6 for "(4) the color balance adjustment." Thus, the scanner driver converts the output data Rout1, Gout1, and Bout1 obtained by the histogram adjustment into output data Rout2, Gout2, and Bout2 and outputs them.

Then, after the image adjustment (excluding (3) saturation adjustment) has been performed in this way, next, the scanner driver advances the procedure to step S006 and executes the density enhancement on the data of the image subjected to the image adjustment (S006). In the density enhancement, the scanner driver converts and outputs the data of each of the pixels of the input image for each of the colors R (red), G (green), and B (blue) based on the tone curve that has been adjusted for each color of R (red), G (green), and B (blue) respectively. That is, here the scanner driver refers to the setting data for the input coordinates β11, β13, β21, β23, β31, β33, ... and the output coordinates β12, β14, β22, β24, β32, β34, ... of a plurality of points P1, P2, P3, ... that have been set on the tone curve for each of the colors R (red), G (green), and B (blue), and executes the density enhancement based on the tone curve formed based on these setting data. Thus, the scanner driver converts the output data Rout2, Gout2, and Bout2 obtained by the image adjustment (excluding (3) saturation adjustment) into output data Rout3, Gout3, and Bout3 and outputs them.

After the density enhancement has been performed in this way, next, the scanner driver advances the procedure to step S008 and executes "(3) the saturation adjustment" as the image adjustment on the data of the image subjected to the density enhancement (S008). Here, the scanner driver executes adjustment based on the setting value γ3 for "(3) the saturation adjustment." Thus, the scanner driver converts the output data Rout3, Gout3, and Bout3 obtained by the density enhancement into output data Rout4, Gout4, and Bout4 and outputs them.

After "(3) the saturation adjustment" has been performed as the image adjustment in this way, next, the scanner driver executes a color conversion processing on the data of the image subjected to "(3) the saturation adjustment)" (S010). The color conversion processing is processing for converting to data suitable for handling on various output devices (here, the display device as well as various types of printers, for example). Specifically, it is carried out through the following conversion formulas (4) to (6), for example.

$$R' = A11 \times R + A12 \times G + A13 \times B \quad (4)$$

$$G' = A21 \times R + A22 \times G + A23 \times B \quad (5)$$

$$B' = A31 \times R + A32 \times G + A33 \times B \quad (6)$$

Here, "R," "G," and "B" denote the input data for each of the colors red (R), green (G), and blue (B) before conversion, respectively. Likewise, "R'," "G'," and "B'" denote the output data for each of the colors red (R), green (G), and blue (B) after conversion, respectively. Also, A11, A12, A13, A21, A22, A23, A31, A32, and A33 are coefficients that are suitably set in correspondence with the characteristics of the various output devices (the display device 24 and the printer, for example).

In this way, the scanner driver executes the color conversion processing in accordance with the characteristics of various types of output devices, on the data of the image subjected to "(3) the saturation adjustment." Thus, the scanner driver converts the output data Rout4, Gout4, and Bout4 obtained by the image adjustment (excluding (3) saturation adjustment) into output data Rout5, Gout5, and Bout5 and outputs them.

Then, after executing the color conversion processing in this way, the scanner driver outputs the color-converted image as the output image.

It should be noted that the example described here is a case in which the color conversion processing is executed in the last step, however it is also possible for the color conversion processing to be performed as necessary.

Pre-Scan

Figure 12:
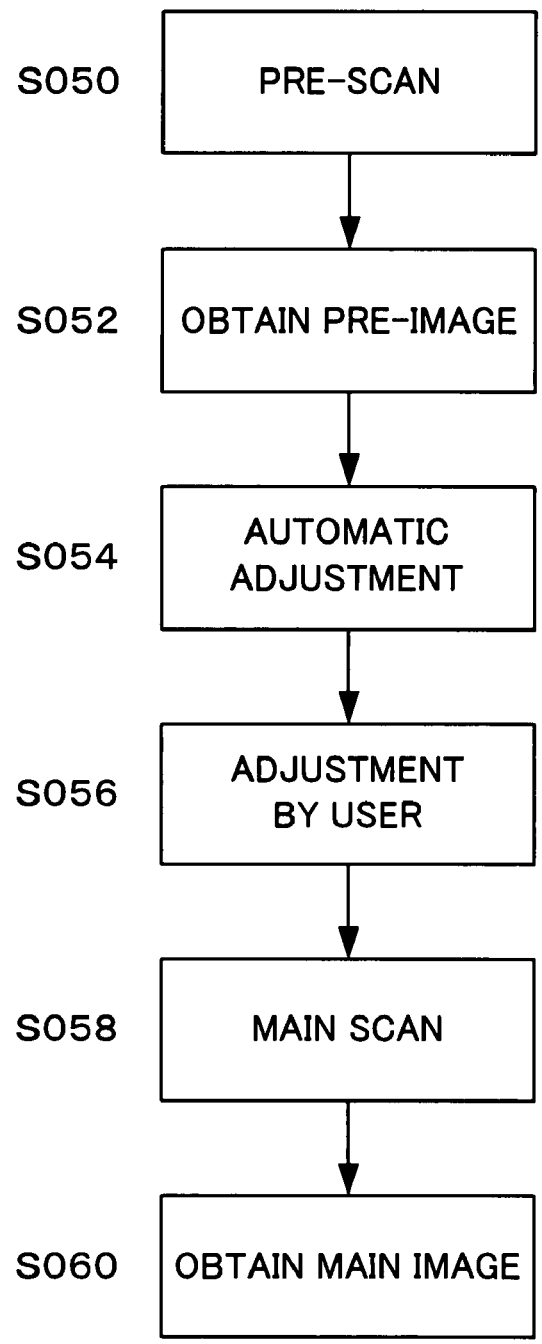
FIG. 12 is an explanatory diagram showing an example of an image reading procedure.

FIG. 12 illustrates an example of an image reading procedure by the image reading device 10. When the image reading device 10 reads an image, it may execute a pre-scan. If an image is to be read at high resolution, for example, a pre-scan refers to reading an image a single time, for example, at low resolution, before executing the operation of reading the image at high resolution (main scan), rather than executing the operation of reading the image at high resolution initially.

The pre-scan is executed first, as shown in the drawing (S050) The scanner driver obtains a pre-scan image (pre-image) through this pre-scan operation (S052). Next, the scanner driver executes automatic adjustment, for example, on the pre-scan image (pre-image) that has been obtained. Here, the scanner driver finds suitable adjustment values, for example, for the histogram adjustment, the density enhancement, or the image adjustment, for example, for the pre-scan image (pre-image) that has been obtained, and automatically enhances the pre-scan image (pre-image) (S054). Here, the automatically enhanced image is displayed on the display device 24 and the like, for example.

In this way, the user performs various adjustments (enhancements) while viewing the pre-scan image (pre-image) displayed on the display device 24 or the like (S056). Here, the user performs the various adjustments (enhancements) through the histogram adjustment dialog box 131 of FIG. 6, the density enhancement dialog box 150 of FIG. 8, and the image adjustment dialog box 160 of FIG. 9, for example.

After the various adjustments (enhancements) have been performed by the user in this way, the main scan is executed. With the main scan, an image is read at high resolution from the original document 15 by the image reading device 10 (S058). The scanner driver then executes the various adjustments (enhancements) such as the histogram adjustment, the density enhancement, and the image adjustment, on the high-resolution image that is obtained through the main scan, based on the data that has been set by the user and the like. Thus, the main image that has been subjected to the various adjustments (enhancements) is obtained (S060).

(1) Conventional Problems and Solutions (1) Conventional Problems

Even when, through the histogram adjustment, density adjustment and image adjustment as described above, the various types of adjustments (enhancements) were automatically performed on the image read in with the image reading device, it was very difficult to sufficiently adjust (enhance) a backlight image. For this reason, it was not possible to sufficiently improve backlight images. Moreover, it was very difficult for the user to perform an adjustment (enhancement) on a backlight image through a histogram adjustment, density adjustment or image adjustment.

Accordingly, it is necessary to provide a function for enhancing backlight images, in order to make it possible to sufficiently adjust (enhance) such backlight images as well. However, if such a function for enhancing backlight images is to be carried out, it is necessary to accurately determine whether the image to be determined is in fact a backlight image. This is because if the function for enhancing a backlight image is performed on an image that is not a backlight image, then the information originally present in the image may be altered considerably, and there is the risk that the overall image becomes unbalanced.

(1) Solution

Accordingly, in a first embodiment, the following determination is carried out in order to determine accurately whether an image read in with the image reading device 10 is a backlight image. This determining method is explained in more detail in the following first embodiment.

(2) Conventional Problems and Solutions (2) Conventional Problems

Even when, through the histogram adjustment, density adjustment and image adjustment as described above, the various types of adjustments (enhancements) were automatically performed on the image read in with the image reading device, it was very difficult to sufficiently adjust (enhance) a backlight image. For this reason, it was not possible to sufficiently improve backlight images. Moreover, it was very difficult for the user to perform an adjustment (enhancement) on a backlight image through a histogram adjustment, density adjustment or image adjustment. Accordingly, it is necessary to provide a function for enhancing backlight images, in order to make it possible to sufficiently adjust (enhance) backlight images as well.

However, if such a function for enhancing backlight images is to be carried out, it is determined whether the image to be determined is in fact a backlight image. In the methods for determining whether an image is a backlight image, which were carried out in the past, there were cases in which it was not possible to suitably determine whether the image to be determined is a backlight image. Therefore, there was the risk that backlight enhancement processing is performed on images that are not backlight images.

(2) Solution

Accordingly, in the second embodiment, a method is proposed, in which a backlight enhancement process is performed on the image to be determined, without determining whether that image is a backlight image or not. Here, the backlight enhancement process is carried out as follows. This backlight enhancement process is explained in more detail in the following second embodiment.

First Embodiment (1) Method for Determining a Backlight Image

In the first embodiment, if the "backlight enhancement checkbox 130E" in the main dialog box 100 of the user interface illustrated in FIG. 5 has been checked by the user, then the scanner driver determines first whether the image read in with the image reading device 10 is a backlight image or not. It should be noted that here, the image to be determined that is subjected to the determination by the scanner driver is an image that has been adjusted (enhanced) automatically or by the user through the above-described histogram adjustment, density adjustment and image adjustment. Then, if the scanner driver has determined that the image read in with the image reading device 10 is a backlight image, this image is subjected to backlight enhancement. In the following, first a method for determining with the scanner driver whether the image read in with the image reading device 10 is a backlight image or not is explained. It should be noted that the computer 20 on which the scanner driver is executed that determines whether the image is a backlight image corresponds to a "backlight image determining apparatus". Moreover, the computer 20 on which the scanner driver is executed that performs the backlight enhancement on images determined to be backlight images corresponds to a "backlight image enhancement apparatus".

Figure 13:
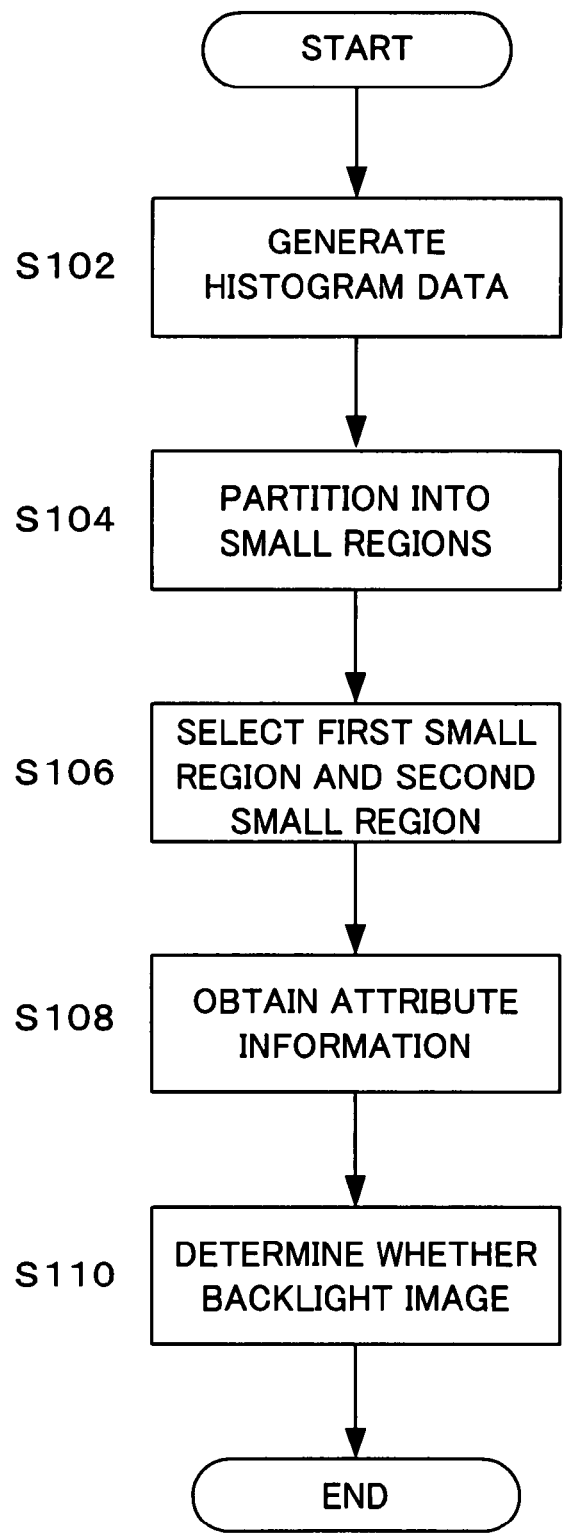
FIG. 13 is a flowchart illustrating a backlight image determining method.

FIG. 13 illustrates the backlight image determining method that is carried out here. Here, the scanner driver first generates histogram data, based on the data of the image read in with the image reading device 10 (S102). It should be noted that the scanner driver, accordingly, corresponds to a "histogram data generation section". The histogram that is generated here is a graph that represents the distribution of the number of pixels with respect to density values of the pixels constituting the image read in with the image reading device 10. The horizontal axis of the histogram marks the density values of the pixels and the vertical axis of the histogram marks the number of pixels. The histogram is made of rectangular bar graphs or the like, each representing the number of pixels of a given density value on the horizontal axis of the graph. The bar graphs formed in this manner are connected to each other in the horizontal direction, thus forming a graph overall having a region with a certain shape.

After the scanner driver has generated the data of the histogram in this manner, it then partitions the region given by the histogram into at least three small regions, according to the magnitude of the density values of the pixels, based on the data of the generated histogram (S104). The number of partitioned small regions can also be four, and can, of course, also be five or greater. Moreover, the areas of the partitioned small regions are set such that they are substantially equal to each other, but they can also be set such that they are not substantially equal to each other. Of course, it is also possible to set the areas of some of the three or more partitioned small regions, that is, of two or more of the small regions such that they are substantially equal to each other. Moreover, it is also possible to set the pixel numbers in the partitioned small regions such that they are substantially equal to each other, but they can also be set such that they are not substantially equal to each other. Of course, it is also possible to set the pixel numbers of some of the three or more partitioned small regions, that is, of two or more of the small regions such that they are substantially equal to each other.

After the scanner driver has partitioned the region given by the histogram into three or more small regions in this manner, it then selects from these partitioned three or more small regions a first small region and a second small region (S106). Here, the first small region is at least one small region that is selected from the partitioned three or more small regions. This first small region is selected in order to obtain the necessary information from the image read in with the image reading device 10 and determine whether it is a backlight image or not. The number of small regions selected as the first small region may be one, it may be two, and it may also be three or more.

As in the case of the first small region, also the second small region is at least one small region selected from the partitioned three or more small regions. However, here, a small region whose density values are larger than those of the first small region and that does not border on the first small region is selected as the second small region. This is also true when there are two or more first small regions. That is to say, when there are two or more first small regions, the second small region does not border on any of these two or more first small regions, and the density values of the second small region are larger than those of the two or more first small regions. This is also true when there are two or more second small regions. That is to say, these two or more second small regions do not border on the one or two or more first small regions, and the density values of each of the second small regions are larger than those of the one or two or more first small regions. The number of small regions selected as the second small region may be one, it may be two, and it may also be three or more.

Moreover, as in the case of the first small region, this second small region is selected in order to obtain the necessary information from the image read in with the image reading device 10 and determine whether it is a backlight image or not.

After the first and second small regions have been selected from the three or more small regions, the scanner driver then obtains individual attribute information for each of the first and second small regions (S108). Here, "attribute information" means a quality or characteristic of the first or second small regions. Examples of attribute information obtained by the scanner driver are an average value of the density values of the pixels in the first or the second small regions, a maximum value or a minimum value of the density values of the pixels in the first or second small regions, a density value corresponding to a border line between neighboring small regions, and the size of the area of the first or second small regions. The scanner driver may obtain one type of attribute information of these types of attribute information, but it may also obtain a plurality of types of attribute information. The scanner driver obtains the information necessary for determining whether the image read in with the image reading device 10 is a backlight image as the attribute information from the first and second small regions.

It should be noted that the scanner driver, accordingly, corresponds to an "attribute information obtaining section".

Then, the scanner driver determines whether the image read in with the image reading device 10 is a backlight image, based on the attribute information thus obtained from the first and second small regions, respectively (S110). It should be noted that the scanner driver, accordingly, corresponds to a "determining section". Here, the scanner driver, for example, may compare the attribute information obtained from the first small region with the attribute information obtained from the second small region, and based on the result of this comparison, may determine whether the image read in with the image reading device 10 is a backlight image. More specifically, the scanner driver determines the difference between the value obtained as the attribute information from the first small region and the value obtained as the attribute information from the second small region, and based on this difference, determines whether the image read in with the image reading device 10 is a backlight image by checking whether this difference exceeds a predetermined value, for example. Thus, the scanner driver terminates the process of determining whether the image read in with the image reading device 10 is a backlight image.

Then, after the scanner driver has determined whether the image read in with the image reading device 10 is a backlight image, if it has determined that the image is a backlight image, it may carry out a backlight enhancement on this image.

It should be noted that the scanner driver, accordingly, corresponds to a "backlight image determination program".

(1) Actual Determination of Backlight Image (1) Histogram Generation

Figure 14:
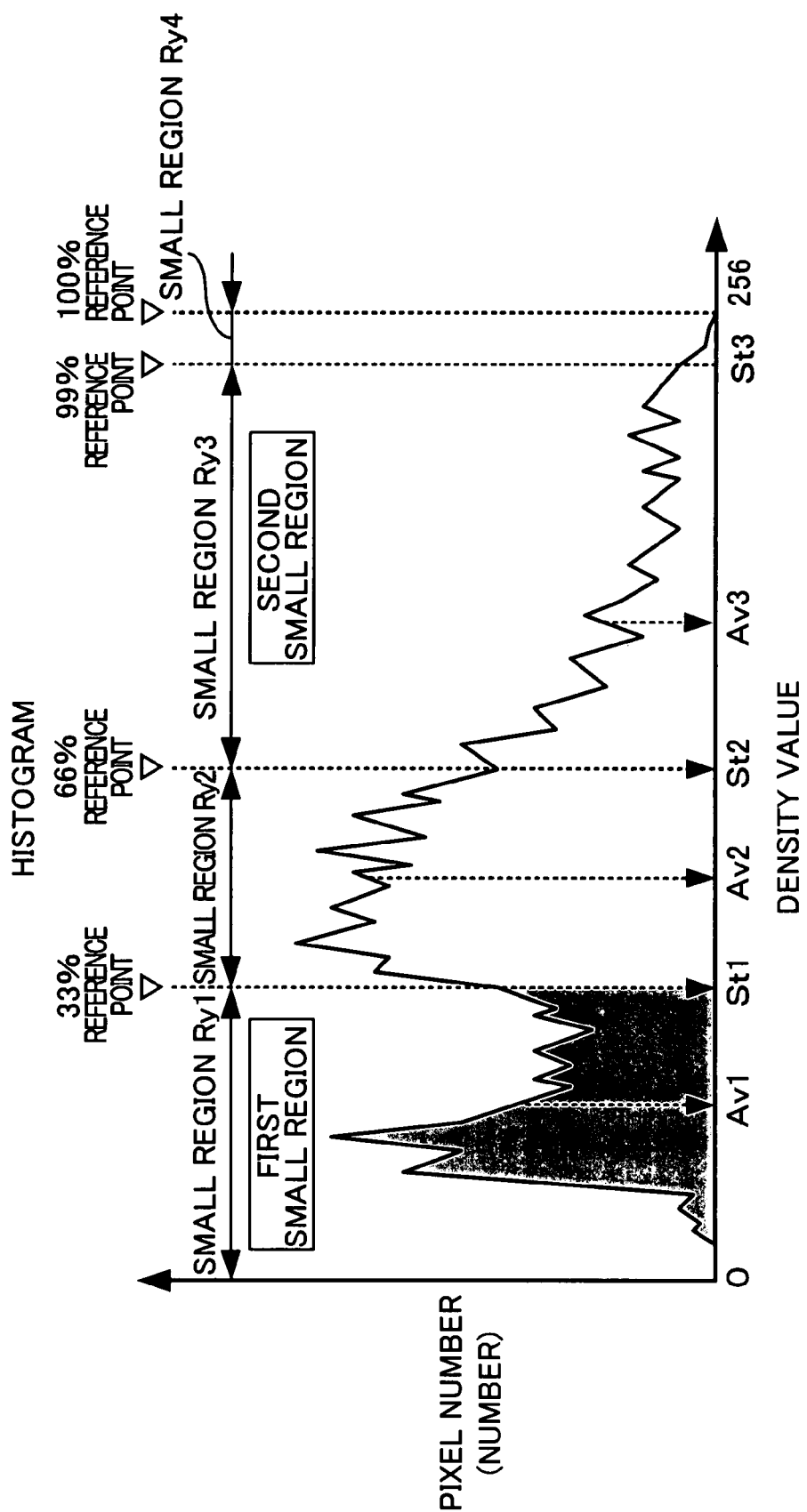
FIG. 14 is an explanatory diagram showing an example of a histogram.

FIG. 14 illustrates an example of a histogram generated by the scanner driver. In this histogram, the density values of the pixels are marked by the horizontal axis and the number of pixels are marked by the vertical axis. Moreover, in this histogram, rectangular bar graphs representing the number of pixels are formed for each of the density values on the horizontal axis of the graph, these bar graphs are connected with each other in the horizontal direction, and form a graph overall having a region of a certain shape. It is possible to ascertain the distribution of the pixels for each density value from this histogram.

In the first embodiment, the data of the pixels constituting the image read in with the image reading device 10 is given as data of density values of the three colors red (R), green (G) and blue (B). Therefore, in the first embodiment, the histogram is generated for each of these colors red (R), green (G) and blue (B). That is to say, three histograms, namely a histogram generated based on the density values of red (R) of the pixels constituting the image, a histogram generated based on the density values of green (G) of the pixels constituting the image, and a histogram generated based on the density values of blue (B) of the pixels constituting the image, are generated. Based on the data of the histograms for the three colors red (R), green (G) and blue (B) generated in this manner, the scanner driver determines whether or not the image is a backlight image.

(1) Partitioning into Small Regions

Next, the scanner driver carries out the process of partitioning the regions given by the histograms of the various colors into three or more small regions, based on the data of the histograms for the three colors red (R), green (G) and blue (B), generated in this manner. Here, the scanner driver partitions the regions given by the histograms of the various colors according to the magnitude of the density values. Thus, the three or more small regions are partitioned by border lines set in correspondence to density values along the direction of the vertical axis of the histograms of the various colors, and are arranged next to each other along the direction of the horizontal axis of the histograms of the various colors, as shown in FIG. 14.

In the first embodiment, the scanner driver partitions each of the regions given by the histograms for the three colors red (R), green (G) and blue (B) into four small regions Ry1, Ry2, Ry3 and Ry4, as shown in FIG. 14. Of these four partitioned small regions Ry1, Ry2, Ry3 and Ry4, the three small regions Ry1, Ry2 and Ry3 are set such that their area is substantially the same. That is to say, these three small regions Ry1, Ry2 and Ry3 represent substantially the same number of pixels.

Here, the area of each of these three small regions Ry1, Ry2 and Ry3 covers about 33% of the total number of pixels constituting the image. That it to say, the small region Ry1 is positioned on the side of the smallest density values, so that it is made of the pixels from 0 to 33%, in order from the pixels with small density values, of the pixels constituting the image to be determined. The small region Ry2 is positioned next the small region Ry1 on the side with the second smallest density values, so that it is made of the pixels from 34 to 66%, in order from the pixels following the pixels included in the small region Ry1, of the pixels constituting the image to be determined. The small region Ry3 is positioned next the small region Ry2 on the side with the third smallest density values, so that it is made of the pixels from 67 to 99%, in order from the pixels following the pixels included in the small region Ry2, of the pixels constituting the image to be determined.

On the other hand, the small region Ry4 is set such that the area (pixel number) that it takes up differs from that of the three small regions Ry1, Ry2 and Ry3. Here, the small region Ry4 is positioned next to the small region Ry3 on the side of the fourth smallest density values, and is positioned on the side of the largest density values, so that it is made of the remaining 1% of the pixels constituting the image to be determined.

(1) Selecting the Small Regions

After the regions given by the histograms for the three colors red (R), green (G) and blue (B) each have been partitioned into the four small regions Ry1, Ry2, Ry3 and Ry4, the scanner driver then carries out for each color a process of selecting a first small region and a second small region from these four partitioned small regions Ry1, Ry2, Ry3 and Ry4. Here, the first small region is at least one region that is selected from the four partitioned small regions Ry1, Ry2, Ry3 and Ry4, and is a region that fulfills the conditions that it is not adjacent to a second small region, and has density values that are smaller than those of the second small region. Moreover, the second small region is at least one region that is selected from the four partitioned small regions Ry1, Ry2, Ry3 and Ry4, and is a region that fulfills the condition that it is not adjacent to a first small region, and has density values that are larger than those of the first small region.

In the first embodiment, the scanner driver selects for each color, as a first small region, the small region Ry1 from the four small regions Ry1, Ry2, Ry3 and Ry4 (see FIG. 14). Moreover, in the first embodiment, the scanner driver selects for each color, as a second small region, the small region Ry3 from the four small regions Ry1, Ry2, Ry3 and Ry4 (see FIG. 14). The reason why the first small region and the second small region is selected like this is as follows. Of the four partitioned small regions Ry1, Ry2, Ry3 and Ry4 in the first embodiment, the three small regions Ry1, Ry2 and Ry3 are set such that their area (pixel number) is substantially the same, namely to 33% each of the total pixel number. That is to say, the three small regions Ry1, Ry2 and Ry3 are set such that they each take up substantially ⅓ of the region given by the histograms of the colors red (R), green (B) and blue (B). When the first and the second small regions are selected from these three small regions Ry1, Ry2 and Ry3, the only choice due to the condition that they do not border on each other is to select the small region Ry1 as the first small region and to select the small region Ry3 as the second small region.

It should be noted that if the regions given by the histograms for the colors red (R), green (G) and blue (B) are partitioned by a method other than the method described above, then it is also possible to select the first and the second small regions by another approach.

(1) Obtaining the Attribute Information

After the small region Ry1 has been selected for each color as the first small region and the small region Ry3 has been selected for each color as the second small region from the four small regions Ry1, Ry2, Ry3 and Ry4, the scanner driver then obtains for each color the attribute information from the small region Ry1 selected as the first small region and the small region Ry3 selected as the second small region. Here, "attribute information" means a quality or characteristic of the small region Ry1 selected as the first small region and the small region Ry3 selected as the second small region. More specifically, it may be an average value of the density values of the pixels in the small region Ry1 or the small region Ry3, a maximum value or a minimum value of the density values of the pixels in the small region Ry1 or the small region Ry3, a density value corresponding to a border line between neighboring small regions, namely between the small region Ry2 and the small region Ry4, the area of the small region Ry1 or the small region Ry3, or an average value of the density values of the pixels.

In the first embodiment, the maximum value St1 of the small region Ry1 and the maximum value St3 of the small region Ry3 is obtained for each color as the attribute information of the small region Ry1 selected as the first small region and the small region Ry3 selected as the second small region. It should be noted that the maximum value St1 of the small region Ry1 of each color is the density value corresponding to the border line to the adjacent small region Ry2. Similarly, also the maximum value St3 of the small region Ry3 of each color is the density value corresponding to the border line to the adjacent small region Ry4. The maximum value St1 of the small region Ry1 of each color is also referred to as the "33% reference point". Moreover, the maximum value St3 of the small region Ry3 of each color is also referred to as the "99% reference point". It should be noted that the maximum value St2 of the small region Ry2 of each color is also referred to as the "66% reference point".

Here, the reason why the maximum values St1 and St3 are obtained as the attribute information of the small region Ry1 and the small region Ry3 is as follows. With the maximum value St1 of the small region Ry1 and the maximum value St3 of the small value Ry3, it is possible to carry out a more accurate determination of whether an image is a backlight image than with other attribute information. That is to say, the maximum values St1 and St3 of the small region Ry1 and the small region Ry3 can become more important determination elements for determining whether an image is a backlight image than other attribute information of the small region Ry1 and the small region Ry3.

For example, if the average value Av1 of the density values of the pixels in the small region Ry1 and the average values Av3 of the density values of the pixels in the small region Ry3 are obtained as the attribute information of the small region Ry1 selected as the first small region and the small region Ry3 selected as the second small region, then the difference between these average values Av1 and Av3 may become much smaller than the difference between the maximum values St1 and St3 of the small regions Ry1 and Ry3. Accordingly, for the determination of whether the image read in with the image reading device 10 is a backlight image, it is preferable that the maximum value St1 of the small region Ry1 and the maximum value St3 of the small region Ry3 are obtained for each color as the attribute information of the small regions Ry1 and Ry3.

(1) Determination

After the regions given by the histograms for the three colors red (R), green (G) and blue (B) have been partitioned into the four small regions Ry1, Ry2, Ry3 and Ry4, and the maximum value St1 of the small region Ry1 and the maximum value St3 of the small region Ry3 have been obtained for each color as the attribute information of the small region Ry1 selected as the first small region and the small region Ry3 selected as the second small region, the scanner driver then carries out a process of determining whether the image read in with the image reading device 10 is a backlight image, based on the obtained maximum value St1 of the small region Ry1 and the maximum value St3 of the small region Ry3, for each color.

Here, in the first embodiment, the scanner driver first performs a calculation to determine, from the maximum value St1 of the small region Ry1 and the maximum value St3 of the small region Ry3 obtained for each of the histograms for the three colors red (R), green (G) and blue (B), a value corresponding to the case that these values are converted into luminance. For this calculation, an equation is used for converting the density values of each of the colors red (R), green (G) and blue (B) into the actual luminance values. An example of this arithmetic equation is given by the following Equation (7):

$$\text{Actual luminance value} = \tfrac{1}{5} \times R + \tfrac{3}{5} \times G + \tfrac{1}{5} \times B \qquad (7)$$

Here, "R" means the density value of the red (R) component of the pixel. "G" means the density value of the green (G) component of the pixel. "B" means the density value of the blue (B) component of the pixel. Furthermore, Equation (7) is given for the case that the ratio among the colors red (R), green (G) and blue (B) is "1:3:1", but other ratios than this are also possible.

Using this Equation (7), the scanner driver obtains the value St10 corresponding to the actual luminance value from the maximum value St1 of the small region Ry1 obtained from each of the histograms for the three colors red (R), green (G) and blue (B). This value St10 is the "33% reference point" corresponding to the actual luminance value. Moreover, using the Equation (7), the scanner driver obtains the value St30 corresponding to the actual luminance value from the maximum value St3 of the small region Ry3 obtained from each of the histograms for the three colors red (R), green (G) and blue (B). This value St30 is the "99% reference point" corresponding to the actual luminance value.

After this, the scanner driver determines the difference ΔSt between the actual luminance value St10 ("33% reference point") determined from the maximum value St1 of the small region Ry1 of each of the histograms of the colors RGB and the actual luminance value St30 ("99% reference point") determined from the maximum value St3 of the small region Ry3 of each of the histograms of the colors RGB. Here, the scanner driver performs the calculation of subtracting the actual luminance value St10 ("33% reference point") that was determined from the maximum value St1 of the small region Ry1 of the histograms for the red, green and blue colors from the actual luminance value St30 ("99% reference point") that was determined from the maximum value St3 of the small region Ry3 of the histograms for the red, green and blue colors.

Then, the scanner driver compares the difference ΔSt determined in this manner with a predetermined threshold value ΔStk, and if the determined difference ΔSt is equal to or greater than the predetermined threshold value ΔStk, then the judgment is made that the image read in with the image reading device 10 is a backlight image. On the other hand, when the scanner driver compares the difference ΔSt determined in this manner with a predetermined threshold value ΔStk and the determined difference ΔSt is smaller than the predetermined threshold value ΔStk, then it determines that the image read in with the image reading device 10 is not a backlight image. It should be noted that the predetermined threshold value ΔStk is a value that is set suitably for judging whether an image is a backlight image. This predetermined threshold value ΔStk may be set suitably based on the result of an analysis, such as a simulation that was carried out beforehand, or heuristically, for example.

Figure 15A:
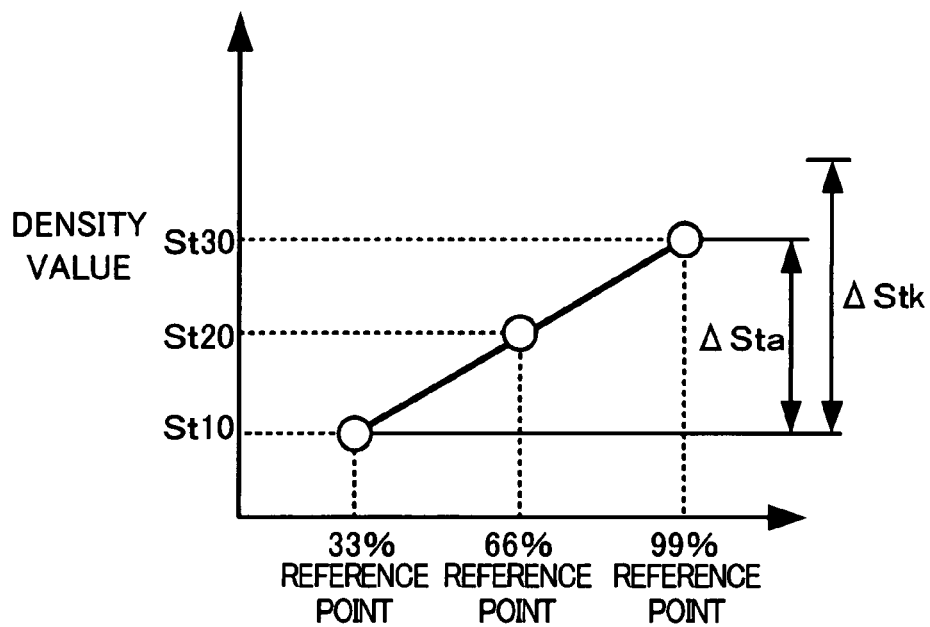
FIG. 15A is an explanatory diagram of the case that an image is not determined to be a backlight image.
Figure 15B:
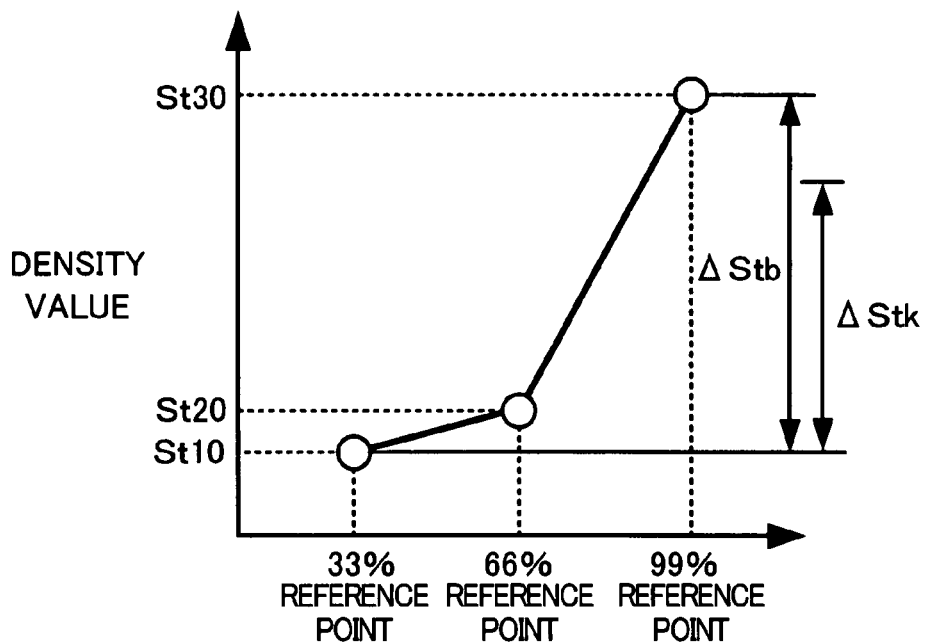
FIG. 15B is an explanatory diagram of the case that an image is determined to be a backlight image.

FIG. 15A and FIG. 15B illustrate the method for determining whether an image is a backlight image that is performed by the scanner driver. FIG. 15A illustrates the case that the scanner driver determines that the image to be determined is not a backlight image. FIG. 15B illustrates the case that the scanner driver determines that the image to be determined is a backlight image.

If the image read in with the image reading device 10 is not a backlight image, the distribution of pixels over the density values given by the histograms for the three colors red (R), green (G) and blue (G) is substantially uniform. Therefore, if the image read in with the image reading device 10 is not a backlight image, the value St10 for the "33% reference point", the value St20 for the "66% reference point", and the value St30 for the "99% reference point" increase successively at a small rate of increase with a smooth angle of inclination, as shown in FIG. 15A. It should be noted that the value St20 for the "66% reference point" is the value obtained by converting the maximum value St2 of the small region Ry2 of the histograms for the three colors red (R), green (G) and blue (B) into the actual luminance value using the above-noted equation (7). For this reason, the difference ΔSta between the value St10 for the "33% reference point" and the value St30 for the "99% reference point" is a value that is sufficiently smaller than the predetermined threshold value ΔStk.

On the other hand, if the image read in with the image reading device 10 is a backlight image, there is a bias (i.e. one-sidedness) in the distribution of pixels over the density values given by the histograms for the three colors red (R), green (G) and blue (G). Therefore, if the image read in with the image reading device 10 is a backlight image, the value St10 for the "33% reference point", the value St20 for the "66% reference point", and the value St30 for the "99% reference point" are in an unbalanced relation, as shown in FIG. 15B. Thus, the value St10 for the "33% reference point" will be too small or the value St30 for the "99% reference point" will be too large. Therefore, the angle of inclination from the value St10 for the "33% reference point" to the value St30 for the "99% reference point" becomes too steep, and the rate of increase becomes too large. For this reason, the difference ΔSta between the value St10 for the "33% reference point" and the value St30 for the "99% reference point" is a value that is larger than the predetermined threshold value ΔStk.

With this method, it is possible to determine more accurately whether an image is a backlight image, by determining with the scanner driver whether an image to be determined, that is, an image read in with the image reading device 10 is a backlight image. More specifically, it is possible to determine smoothly whether an image is a backlight image not only for ordinary backlight images, but also for backlight images in which the color balance, such as intermediate tones, is destroyed, or backlight images with a sunset or sunrise in the background.

(1) Other Application Examples

In the above-explained determining method, the regions given by the histograms for the three colors red (R), green (G) and blue (B) were each partitioned into four small regions Ry1, Ry2, Ry3 and Ry4, but it is not necessarily required to partition them into four small regions Ry1, Ry2, Ry3 and Ry4. That is to say, it is sufficient if the regions given by the histograms for the three colors red (R), green (G) and blue (B) are partitioned into at least three small regions, and they may also be partitioned into three small regions or five or more small regions.

Moreover, in the above-noted determining method, the four small regions Ry1, Ry2, Ry3 and Ry4 obtained by dividing the regions given by the histograms for the three colors red (R), green (G) and blue (B) included three small regions Ry1, Ry2 and Ry3 of substantially equal area and substantially equal pixel number, but it is not necessarily required to provide such small regions that have substantially the same area and pixel number. Moreover, there is no limitation to the case that three small regions are provided that have substantially the same area or pixel number, and there may also be two or four or more of such small regions.

Moreover, with the above-described determining method, among the small regions Ry1, Ry2, Ry3 and Ry4 obtained by partitioning the regions given by the histograms for the three colors red (R), green (G) and blue (B), the small region Ry1 was selected as the first small region and the small region Ry3 was selected as the second small region, but there is no limitation to carrying out the selection in this manner. That is to say, if the regions are partitioned by another method, it is also possible to select the first small region and the second small region by another approach. Moreover, the number of small regions selected as the first small region and the second small region may also be two or greater.

Moreover, in the above-described determining method, the maximum value St1 of the small region Ry1 and the maximum value St3 of the small region Ry3 was obtained for each color as the attribute information obtained from the first small region and the second small region, but there is no limitation to such attribute information as the attribute information obtained from the first small region and the second small region. That is to say, it is sufficient if the attribute information obtained from the first and second small regions is information relating to the quality or characteristic of the first and second small regions, for example it may be any of a variety of information, such as an average value of the density values of the pixels in the first and the second small regions, a minimum value of the density values of the pixels in the first and second small regions, a density value corresponding to a border line between neighboring small regions, or the size of the area of the first and second small regions. It is preferable that the attribute information obtained from the first and second small regions is information that is valuable for determining accurately whether an image is a backlight image.

Moreover, in the above-described determining method, the actual luminance values St10 and St30 were determined individually for each color from the maximum values St1 and St3 for each color that are obtained as attribute information from the first and second small regions, and the difference ΔSt between these luminance values St10 and St30 was compared with a predetermined threshold value ΔStk to determine whether an image is a backlight image, but the determination does not necessarily have to be carried out in this manner. That is to say, as long as the determination whether an image is a backlight image is carried out based on the attribute information belonging to the first small region of each of the various colors and the attribute information of the second small region of each of the various colors, this determination may be carried out by any method. It should be noted that it is preferable that the method for determining whether an image is a backlight image is a method that is suitable for accurately determining a backlight image.

(1) Method for Enhancing a Backlight Image

After the scanner driver has determined in this manner whether an image to be determined, that is, an image read in with the image reading device 10 is a backlight image, it may carry out a process of backlight enhancement on the backlight image, if it has been determined that the image is a backlight image.

The process of backlight enhancement that is carried out here may be an enhancement process based on a backlight enhancement method already known in the art. More specifically, it is possible to carry out an enhancement process of increasing the density values of those of the pixels constituting the image that are located in the shade due to the backlight, that is, those pixels where the density values are very small. Thus, the image determined to be a backlight image is subjected to an enhancement process by which the effect of the backlight is improved. With the above-described determining method, if an image is a backlight image, then it is accurately determined to be a backlight image, so that it is possible to ensure that only backlight images are subjected to the backlight enhancement process.

It should be noted that the scanner driver, here, corresponds to a "backlight enhancement processing section".

(1) Overview

In the first embodiment as described above, histograms for the three colors red (R), green (G) and blue (B) are generated based on the data of the pixels constituting an image read in with the image reading device 10, and the regions given by these histograms are each partitioned into four small regions Ry1, Ry2, Ry3 and Ry4. For each of the various colors, a small region Ry1 is selected from the four small regions Ry1, Ry2, Ry3 and Ry4 as a first small region, and a small region Ry3 is selected as a second small region. Attribute information is obtained for the small regions Ry1 and Ry3, respectively, and based on this attribute information, it is determined whether an image to be determined (here, an image read in with the image reading device 10) is a backlight image, so that this determination can be made accurately.

Moreover, among the four small regions Ry1, Ry2, Ry3 and Ry4 obtained by partitioning the regions given by the histograms of the colors red (R), green (G) and blue (B), three small regions Ry1, Ry2 and Ry3 are provided that have substantially the same area and pixel number, and by selecting the first small region and the second small region from these three small regions Ry1, Ry2 and Ry3, it is possible to accurately determine whether an image to be determined (here, the image read in with the image reading device 10) is a backlight image.

Furthermore, the small region Ry1 selected as the first small region is the small region with the smallest density values, and the small region Ry3 selected as the second small region is the region with the largest density values, so that it is possible to accurately determine whether an image to be determined is a backlight image.

Furthermore, by obtaining, for each color, the maximum value St1 of the small region Ry1 and the maximum value St3 of the small region Ry3 as the attribute information of the small region Ry1 selected as the first small region and the small region Ry3 selected as the second small region, it is possible to accurately determine whether an image to be determined (here, the image read in with the image reading device 10) is a backlight image.

Also, the determination whether an image is a backlight image may be made based on the luminance values St10 and St3 obtained by converting the maximum value St1 of the small region Ry1 and the maximum value St3 of the small region Ry3 for each of the various colors into the actual luminance values St10 and St30, so that the determination can be made more accurately. Furthermore, by determining the difference ΔSt between the obtained luminance values St10 and St30 and comparing this difference ΔSt with a predetermined threshold value ΔStk to determine whether an image to be determined is a backlight image, it is possible to make a more simple determination.

(1) Application to Printing Apparatus

Figure 16:
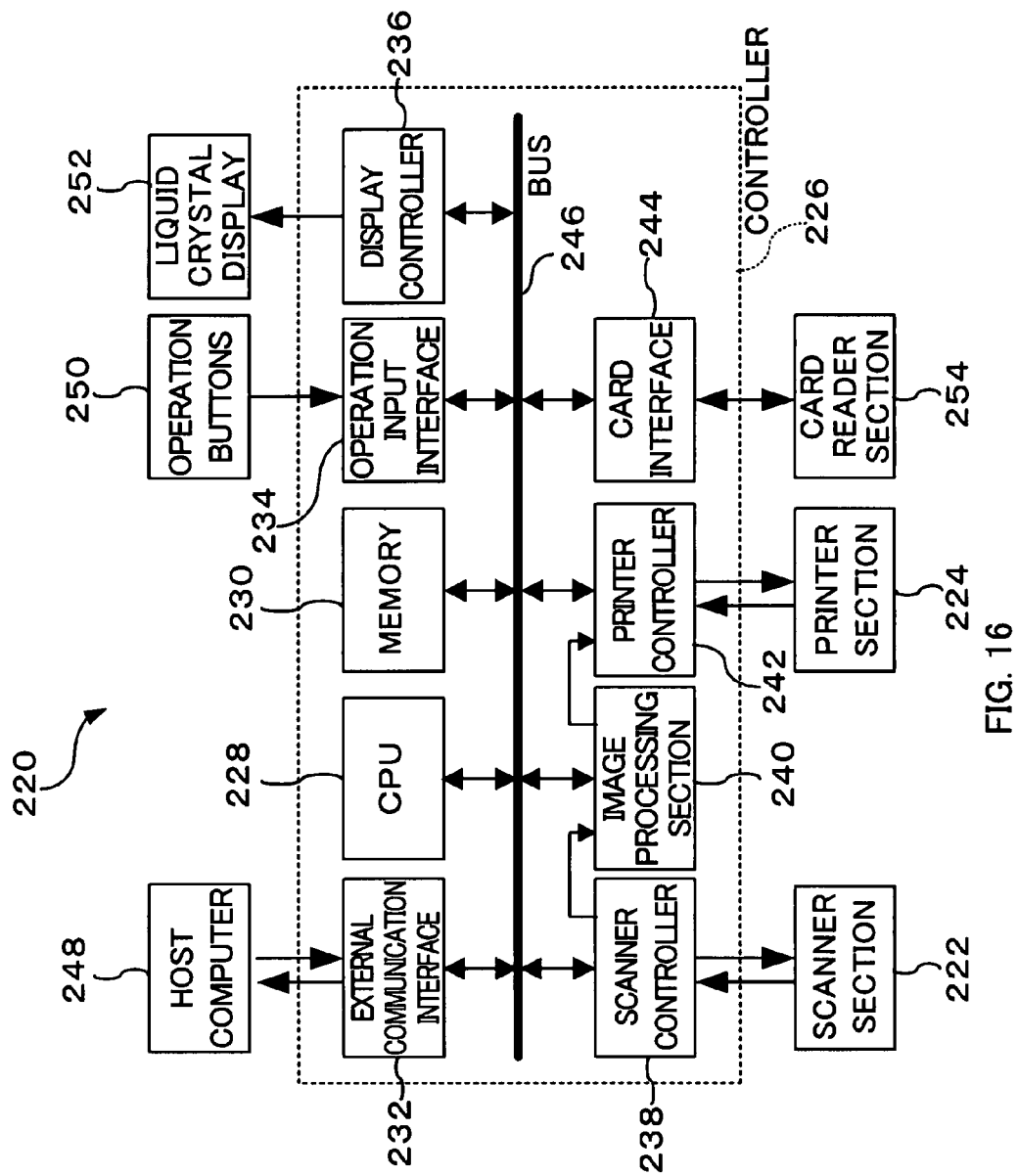
FIG. 16 is an explanatory diagram showing an embodiment of a printing apparatus.

Such an image reading device 10 can also be mounted to a printing apparatus. FIG. 16 illustrates a configuration example of a printing apparatus 220 provided with such an image reading device 10. This printing apparatus 220 is a multifunctional apparatus provided with a scanner function for generating image data by reading in an image from an original document, a printer function for printing print data sent from a host computer 248 on various types of media, such as print paper or the like, and a local copying function for copying by printing on a medium an image read in from an original document. This printing apparatus 220 is provided with a scanner section 222 (including a scanner controller 238, here referred to as "image reading device 10") that reads in an image from an original document, and a printer section 224 for printing on a medium S, such as print paper or the like.

Furthermore, as shown in FIG. 16, the controller 226 of the printing apparatus 220 includes a CPU 228, a memory 230, an external communication interface 232, an operation input interface 234, a display controller 236, a scanner controller 238, an image processing section 240, a printer controller 242, a card interface 244, and a bus 246 connecting these to each other.

The CPU 228 performs the overall control of the printing apparatus 220. The memory 230 stores a program carried out by the CPU 228 and data used by the program. The external communication interface 232 communicates by wire or wirelessly with the host computer 248. The operation input interface 234 receives the operation input from the user via operation buttons 250 or the like. The display controller 236 controls the display section, which may be a liquid crystal display 252 or the like.

On the other hand, the scanner controller 238 controls the scanner section 222 and carries out the read-in operation of reading in an image from the original document. The image processing section 240 has the function of converting the data of an image that is output from the scanner section 222 into data for carrying out the printing process with the printer section 224, in order to print with the printer section 224 the image read in from the original document with the scanner section 222. The printer controller 242 controls the printer section 224. Moreover, the card interface 244 performs a process such as reading in image data stored in various types of memory cards set in a card reader section 254 from those memory cards.

Also, during the scanner function, the printing apparatus 220 outputs the data of the image read in from the original document with the scanner section 222 to the host computer 248. Moreover, during the printer function, the printing apparatus 220 performs printing on various types of media with the printer section 224, based on the print data sent from the host computer 248. And during the local copying function, the printing apparatus 220 makes copies by printing with the printer section 224 the image read in from the original document with the scanner section 222 on various types of media.

(1) Other Embodiments

In the foregoing, an embodiment of an image reading system according to the invention was described as an example. However, the foregoing embodiment is for the purpose of elucidating the invention and is not to be interpreted as limiting the invention. The invention can of course be altered and improved without departing from the gist thereof and includes functional equivalents. In particular, the embodiments mentioned below are also included in the scope of invention.

(1) Regarding the Image to be Determined

In the above-described first embodiment, the "image to be determined" was explained by taking as an example an image read in with the image reading device 10, but here the "image to be determined" may be any image. For example, more specifically, it may also be an image taken with a digital camera or the like. Furthermore, "the image to be determined" may be an image of any type, as long as it is an image, and it may be for example an image expressed by any type of format, such as JPEG format, bitmap format or YUV format.

(1) Regarding the Density Values

In the above-described first embodiment, the "density values" were explained to be density values expressed by 256 tones, that is, density values that can assume the values "0" to "255" for example, but the "density values" are not limited to such density values. That is to say, the "density values" may be any density values, as long as they are data expressing the darkness/brightness of the individual pixels constituting an image. It should be noted that these "density values" also include density values of the luminance expressed by the YUV format, for example.

(1) Regarding the Histograms

In the above-described first embodiment, histogram data of the three colors red (R), green (G) and blue (B) was generated as the "histogram data", but this "histogram data" is not necessarily limited to the case that histogram data of these three colors red (R), green (G) and blue (B) is generated. That is to say, it is also possible that histogram data of at least two or more different colors is generated as the "histogram data" or that histogram data of a single color, for example black is generated as the "histogram data".

(1) Regarding the Histogram Generation Section

In the above-described first embodiment, the scanner driver generated, as the "histogram data generation section", the histogram data based on the data of the pixels constituting the image to be determined, that is, the image read in with the image reading device 10, but the "histogram data generation section" is not necessarily limited to such a scanner driver. That is to say, the "histogram data generation section" may be a "histogram data generation section" of any type, as long as it generates histogram data based on the data of the pixels constituting the image to be determined.

(1) Regarding the Attribute Information Obtaining Section

In the above-described first embodiment, the scanner driver was explained to partition, as an "attribute information obtaining section", the regions given by the histograms of the colors red (R), green (G) and blue (B) into at least three small regions according to the magnitudes of their density values, to select from these at least three small regions a first small region and a second small region, and to obtain the respective attribute information from the small region Ry1 selected as the first small region and the small region Ry3 selected as the second small region, but the "attribute information obtaining section" does not necessarily have to be such a scanner driver. That is to say, the "attribute information obtaining section" may be an "attribute information obtaining section" of any type, as long as it obtains the attribute information respectively from the first small region and the second small region by partitioning the regions given by the histograms into at least three small regions according to the magnitude of their density values, selecting from these at least three small regions for each color at least one small region as a first small region, selecting from the remaining small regions a second small region whose density values are larger than those of the first small region and that is not adjacent to the first small region.

(1) Regarding the Determination Section

In the above-described first embodiment, the scanner driver determined, as the "determination section", whether the image to be determined (here, the image read in with the image reading device 10) is a backlight image, based on the attribute information obtained respectively from the small region Ry1 selected as the first small region and the small region Ry3 selected as the second small region, but this "determination section" is not necessarily limited to such a scanner driver. That is to say, the "determination section" may be a "determination section" of any type, as long as it determines whether an image is a backlight image based on the attribute information obtained respectively from the first small region and the second small region.

(1) Regarding the Backlight Image Determining Apparatus

In the above-described first embodiment, the "backlight image determining apparatus" was explained by taking as an example an apparatus determining whether an image read in with the image reading device 10 is a backlight image, but this "backlight image determining apparatus" is not limited to an apparatus determining whether an image read in with the image reading device 10 is a backlight image. That is to say, the "backlight image determining apparatus" may be any type of apparatus, as long as it is an apparatus that determines whether an image is a backlight image, regardless of the type of image.

(1) Regarding the Backlight Image Determination Program

In the above-described first embodiment, the scanner driver carried out a "backlight image determination program" on a computer 20 that is connected communicably by wire or wirelessly with the image reading device 10, but the "backlight image determination program" is not limited to such a scanner driver. That is to say, this "backlight image determination program" may be any program, as long as it is a program that determines whether an image to be determined is a backlight image.

(1) Regarding the Backlight Image Enhancement Apparatus

In the above-described first embodiment, the "backlight image enhancement apparatus" was explained by taking as an example a backlight image enhancement apparatus determining whether the image read in with the image reading device 10 is a backlight image and performing a backlight enhancement process based on the result of this determination, but the "backlight image enhancement apparatus" is not limited to such an apparatus determining whether the image read in with the image reading device 10 is a backlight image and performing a backlight enhancement process based on the result of this determination. That is to say, the "backlight image enhancement apparatus" may be any type of apparatus, as long as it is an apparatus that performs a backlight enhancement in accordance with the result of the determination of whether various kinds of images are backlight images, regardless of the type of image.

(1) Regarding the Image Reading Device

In the above-described first embodiment, the "image reading device" was explained by taking as an example an image reading device with an image sensor 50 for reading in images, which is provided on a carriage 40 that moves relatively to the original document 15 set on a platen 12, but the "image reading device" is not necessarily limited to this type of "image reading device". That is to say, the "image reading device" may be any type of apparatus, as long as it is an apparatus reading in images from an original document. In other words, the "image reading device" may also be an image reading device that reads in an image from an original document 15 as the original document 15 moves relatively to an image sensor 50 reading in the image.

(1) Regarding the Printing Apparatus

In the above-described first embodiment, the "printing apparatus" was explained by taking as an example the case of a "multifunctional apparatus" provided with an image reading section (scanner section 222) generating image data by reading in an image from an original document 15, and a printing section (printer section 224) printing the image on a medium, but this "printing apparatus" does not necessarily have to be provided with an image reading section (scanner section 222 (includes also the scanner controller 238 and the image processing section 240)). That is to say, it is sufficient if the "printing apparatus" is provided at least with a printing section for printing an image on a medium.

Second Embodiment (2) Backlight Image Enhancement Process

In the second embodiment, if the "backlight enhancement checkbox 130E" in the main dialog box 100 of the user interface illustrated in FIG. 5 has been checked by the user, then the scanner driver performs a backlight enhancement process on the image read in with the image reading device 10. It should be noted that here, the image that the scanner driver subjects to a backlight enhancement process is an image that has been adjusted (enhanced) automatically or by the user through the above-described histogram adjustment, density adjustment or image adjustment. In the second embodiment, the scanner driver performs a backlight enhancement process on the image read in with the image reading device 10, regardless of whether the image read in with the image reading device 10 is a backlight image. The computer 20 executing the scanner driver that subjects the image read in with the image reading device 10 to a backlight enhancement process corresponds to a "backlight image enhancement apparatus".

Figure 17:
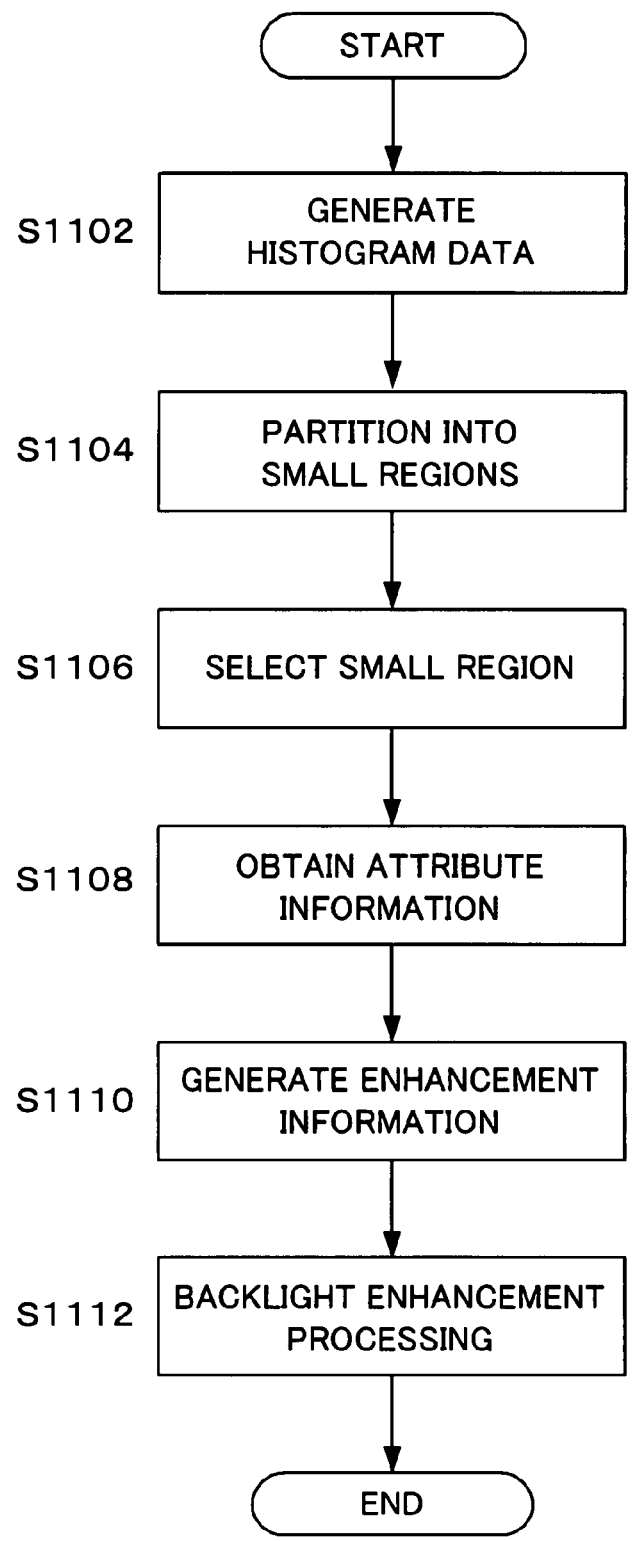
FIG. 17 is a flowchart illustrating a backlight image enhancement method.

FIG. 17 illustrates the backlight image enhancement method that is carried out here. In this enhancement method, the scanner driver first generates histogram data, based on the data of the image read in with the image reading device 10 (S1102). It should be noted that the scanner driver, accordingly, corresponds to a "histogram data generation section". The histogram that is generated here is a graph that represents the distribution of the number of pixels with respect to density values of the pixels constituting the image read in with the image reading device 10. The horizontal axis of the histogram marks the density values of the pixels and the vertical axis of the histogram marks the number of pixels. The histogram is made of rectangular bar graphs or the like, each representing the number of pixels of a given density value on the horizontal axis of the graph. The bar graphs formed in this manner are connected to each other in the horizontal direction, thus forming a graph overall having a region with a certain shape.

After the scanner driver has generated the data of the histogram in this manner, it then partitions the region given by the histogram into at least two small regions, according to the magnitude of the density values of the pixels, based on the data of the generated histogram (S1104) The number of small regions into which the region is partitioned can also be three, and can, of course, also be four or greater. Moreover, the areas of the partitioned small regions can be set such that they are substantially equal to each other, but they can also be set such that they are not substantially equal to each other. It is also possible to set some of the partitioned two or more small regions such that their area is substantially the same. Moreover, it is also possible to set the numbers of the pixels in the partitioned small regions such that they are substantially equal to each other, but they can also be set such that they are not substantially equal to each other. It is also possible to set some of the partitioned two or more small regions such that their pixel number is substantially the same.

After the scanner driver has partitioned the region given by the histogram into two or more small regions in this manner, it then selects from these partitioned two or more small regions at least one small region (S1106). Here, the scanner driver may also select two small regions, and it may also select three or more small regions. Needless to say, the scanner driver may also select all small regions. It should be noted that it is preferable that the small region selected by the scanner driver is a small region from which it is possible to retrieve the information necessary for the scanner driver to perform a backlight enhancement process on the image read in with the image reading device 10.

After selecting at least one small region from the two or more small regions obtained by partitioning the regions given by the histograms, the scanner driver then obtains attribute information from the selected small region (S1108). It should be noted that the scanner driver here corresponds to an "attribute information obtaining section".

Here, the attribute information obtained by the scanner driver is information regarding the quality or characteristics of the small region selected by the scanner driver. Examples of attribute information obtained by the scanner driver are various attribute information such as an average value of the density values of the pixels in the small region selected by the scanner driver, a maximum value or a minimum value of the density values of the pixels in the small region selected by the scanner driver, a density value corresponding to a border line between the small region selected by the scanner driver and a neighboring small region, and the size of the area of the small region selected by the scanner driver. The scanner driver obtains at least one type of attribute information from these types of attribute information. That is to say, the scanner driver may obtain one type of attribute information, or it may obtain a plurality of types of attribute information from these types of attribute information.

The scanner driver may obtain the attribute information individually for the small region selected from the at least two small regions obtained by partitioning the regions given by the histograms, or it may obtain attribute information relating to two or more of the selected small regions. Thus, the scanner driver obtains the information necessary for performing the backlight enhancement process on the image read in with the image reading device 10.

After obtaining the attribute information for the small region selected from the two or more small regions obtained by partitioning the regions given by the histograms in this manner, the scanner driver then generates enhancement information for subjecting the image to be enhanced to the backlight enhancement process, based on the obtained attribute information (S1110). It should be noted that the scanner driver here corresponds to an "enhancement information obtaining section". This enhancement information is the information that serves as a basis for subjecting the image read in with the image reading device 10 to the backlight enhancement process with the scanner driver. The scanner driver subjects the image read in with the image reading device 10 to the backlight enhancement process based on this enhancement information. That is to say, this enhancement information serves as the setting data for the backlight enhancement process to which the scanner driver subjects the image read in with the image reading device 10.

Here, the scanner driver generates the enhancement information in accordance with the backlight enhancement process to which the image read in with the image reading device 10 is subjected. More specifically, if the backlight enhancement process carried out by the scanner driver is for example the above-noted "density enhancement", then it generates, as the enhancement information, setting information for setting suitable points for adjusting the tone curve in the "density enhancement".

There are several methods for generating the enhancement information based on the attribute information obtained by the scanner driver. More specifically, to generate the enhancement information with the scanner driver, there is for example the method of obtaining information relating to the luminance from the selected small region to generate the enhancement information based on this information relating to the luminance. If information relating to the luminance is obtained from the selected small region, a more suitable backlight enhancement process can be performed. As a method for obtaining this information relating to luminance, it is possible to simply obtain the density values for each of the colors red (R), green (G) and blue (B).

Then, after the scanner driver has generated the enhancement information for carrying out the backlight enhancement process, it then performs the backlight enhancement process based on the generated enhancement information (S1112). It should be noted that the scanner driver here corresponds to a "backlight enhancement processing section". Here, it is possible to employ a variety of enhancement processes as the backlight enhancement process performed by the scanner driver, such as the above-mentioned "density enhancement". As for the backlight enhancement process that is carried out, it is possible to perform it on an image that already has been subjected to various types of adjustments (enhancements), such as histogram adjustment, density enhancement or image adjustment, or to perform it directly on the image read in with the image reading device 10. Moreover, it is also possible to carry out the backlight enhancement process by changing the parameters of the various adjustments (enhancements) that are already performed on the image read in with the image reading device 10.

Thus, the scanner driver subjects the image read in with the image reading device 10 to a backlight enhancement process. After this, the process is terminated.

It should be noted that the scanner driver, accordingly, corresponds to a "backlight image enhancement program".

(2) Actual Enhancement of Backlight Image (2) Histogram Generation

Figure 18:
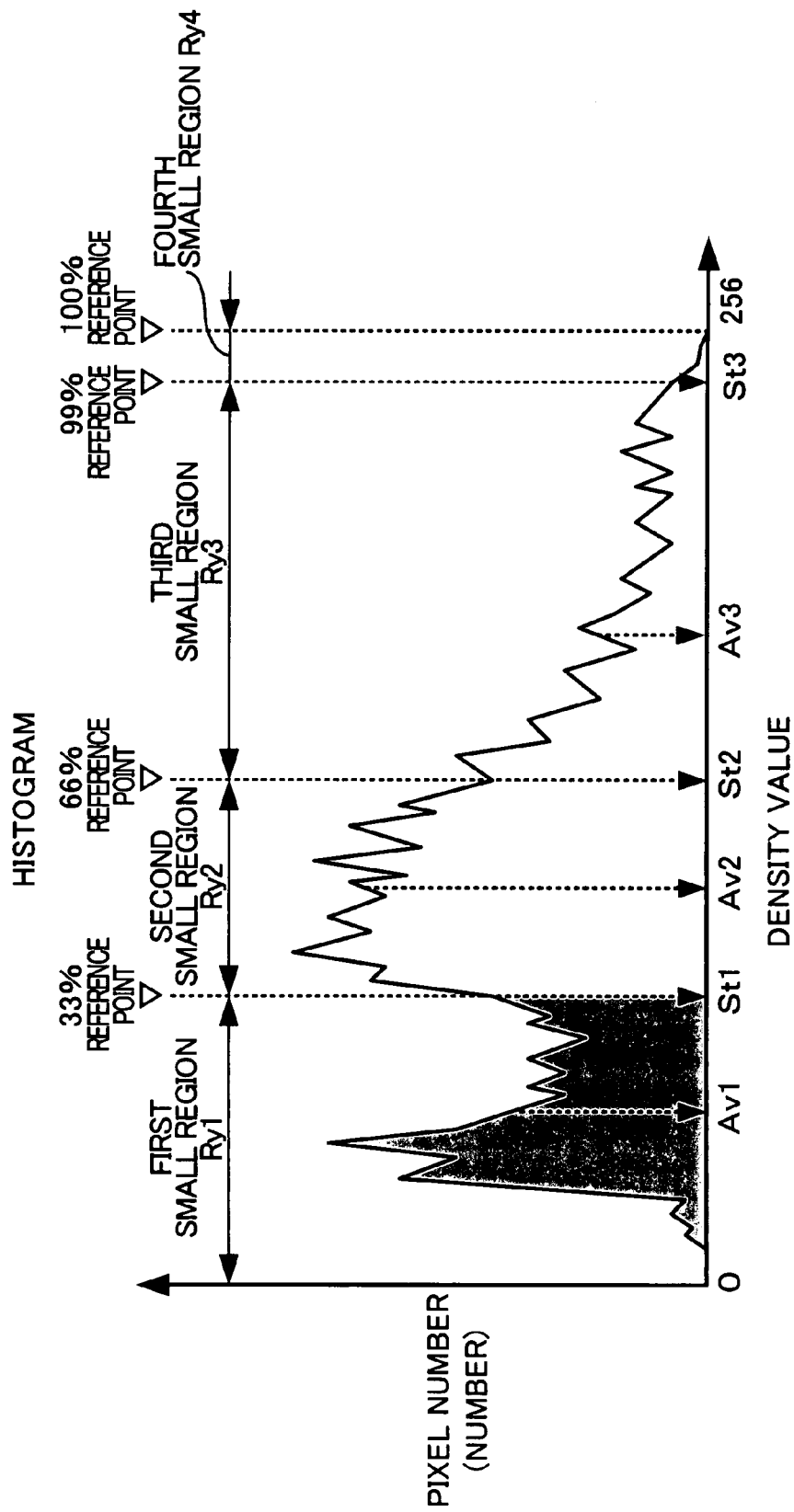
FIG. 18 is an explanatory diagram showing an example of a histogram.

FIG. 18 illustrates an example of a histogram generated by the scanner driver. In this histogram, the density values of the pixels are marked by the horizontal axis and the number of pixels are marked by the vertical axis. Moreover, in this histogram, rectangular bar graphs representing the number of pixels are formed for each of the density values on the horizontal axis of the graph. These bar graphs are connected with each other in the horizontal direction, and form a graph overall having a region of a certain shape. It is possible to ascertain the distribution of the pixels for each density value from this histogram.

In the second embodiment, the data of the pixels constituting the image read in with the image reading device 10 is given as data of density values of the three colors red (R), green (G) and blue (B). Therefore, in the second embodiment, the histogram is generated for each of these colors red (R), green (G) and blue (B). That is to say, three histograms, namely a histogram generated based on the density values of red (R) of the pixels constituting the image, a histogram generated based on the density values of green (G) of the pixels constituting the image, and a histogram generated based on the density values of blue (B) of the pixels constituting the image, are generated. The scanner driver performs the backlight enhancement process on the image read in with the image reading device 10, based on the data of the histograms for the three colors red (R), green (G) and blue (B) generated in this manner.

(2) Partitioning into Small Regions

After generating the data of the histograms for the three colors red (R), green (G) and blue (B) generated in this manner, the scanner driver carries out the process of partitioning the regions given by the histograms of the respective colors into two or more small regions, based on the data of the histograms for these three colors. Here, the scanner driver partitions the regions given by the histograms of the respective colors according to the magnitude of their density values. Thus, the two or more small regions are partitioned by border lines set in correspondence to density values along the direction of the vertical axis of the histograms of the respective colors, and are arranged next to each other along the direction of the horizontal axis of the histograms of the respective colors, as shown for example in FIG. 18. This is explained by taking as an example the case that the regions given by the histograms for the three colors are partitioned into four small regions Ry1, Ry2, Ry3 and Ry4, respectively.

In the second embodiment, the scanner driver partitions each of the regions given by the histograms for the three colors red (R), green (G) and blue (B) into four small regions Ry1, Ry2, Ry3 and Ry4, as shown in FIG. 18. Here, the small region Ry1 is referred to as "first small region". The small region Ry2 is referred to as "second small region". The small region Ry3 is referred to as "third small region". The small region Ry4 is referred to as "fourth small region". Of these four partitioned small regions, that is, of the first to fourth small regions Ry1, Ry2, Ry3 and Ry4, the first to third small regions Ry1, Ry2 and Ry3 are set such that their area is substantially the same. That is to say, these first to third small regions Ry1, Ry2 and Ry3 represent substantially the same pixel number.

Here, the area of each of these first to third small regions Ry1, Ry2 and Ry3 covers about 33% of the total number of pixels constituting the image. That it to say, the first small region Ry1 is positioned on the side of the smallest density values, so that it is formed with the pixels from 0 to 33%, in order from the pixels with small density values, of the pixels constituting the image to be determined. The second small region Ry2 is positioned next the first small region Ry1 on the side with the second smallest density values, so that it is made of the pixels from 34 to 66%, in order from the pixels following the pixels included in the first small region Ry1, of the pixels constituting the image to be determined. The third small region Ry3 is positioned next the second small region Ry2 on the side with the third smallest density values, so that it is made of the pixels from 67 to 99%, in order from the pixels following the pixels included in the second small region Ry2, of the pixels constituting the image to be determined.

On the other hand, the fourth small region Ry4 is set such that the area (pixel number) that it takes up differs from that of the first to third small regions Ry1, Ry2 and Ry3. Here, the fourth small region Ry4 is positioned on the side with the fourth smallest density values, next to the third small region Ry3, and on the side with the largest density values.

(2) Selecting the Small Regions

After the regions given by the histograms for the three colors red (R), green (G) and blue (B) each have been partitioned into four small regions, that is, the first to fourth small regions Ry1, Ry2, Ry3 and Ry4, the scanner driver then selects at least one small region from these four small regions, that is, the first to fourth small regions Ry1, Ry2, Ry3 and Ry4, in order to obtain attribute information. In the second embodiment, three small regions (the first to third small regions) Ry1, Ry2 and Ry3 are selected from among the first to fourth small regions Ry1, Ry2, Ry3 and Ry4. Here, the three small regions (first to third small regions) Ry1, Ry2 and Ry3 are selected for each of the colors. That is to say, the first to third small regions Ry1, Ry2 and Ry3 are selected respectively from each of the histograms for the colors red (R), green (G) and blue (B).

(2) Obtaining the Attribute Information

After three small regions, namely the first to third small regions Ry1, Ry2 and Ry3 have been selected for each of the colors from the first to fourth small regions Ry1, Ry2, Ry3 and Ry4 in order to obtain the attribute information, the scanner driver then obtains the attribute information respectively from the selected first to third small regions Ry1, Ry2 and Ry3. Here, the scanner driver obtains the attribute information for the selected first to third small regions Ry1, Ry2 and Ry3 with regard to each of the colors. It should be noted that the attribute information is information relating to the quality or characteristics of the selected first to third small regions Ry1, Ry2 and Ry3. More specifically, it may be an average value of the density values of the pixels in the selected first to third small regions Ry1, Ry2 and Ry3, a maximum value or a minimum value of the density values of the pixels in the selected first to third small regions Ry1, Ry2 and Ry3, a density value corresponding to a border line to a small region adjacent to the selected first to third small regions Ry1, Ry2 and Ry3, or the size of the area of the selected first to third small regions Ry1, Ry2 and Ry3.

In the second embodiment, the average values AV1, AV2 and AV3 of the density values of the pixels in the first to third small regions Ry1, Ry2 and Ry3 are obtained for each color as the attribute information for the selected first to third small regions Ry1, Ry2 and Ry3. It should be noted that the average value of the density values of the pixels in the first small region Ry1 is referred to as "AV1". The average value of the density values of the pixels in the second small region Ry2 is referred to as "AV2". The average value of the density values of the pixels in the third small region Ry3 is referred to as "AV3". These average values AV1, AV2 and AV3 can be determined by dividing the sum of the density values of the pixels in the respective small region by the number of pixels in that small region.

Here, the average values of the density values of the pixels in the first to third small regions Ry1, Ry2 and Ry3 of the histogram for red (R) are referred to as "AVr1", "AVr2" and "AVr3". The average values of the density values of the pixels in the first to third small regions Ry1, Ry2 and Ry3 of the histogram for green (G) are referred to as "AVg1", "AVg2" and "AVg3". The average values of the density values of the pixels in the first to third small regions Ry1, Ry2 and Ry3 of the histogram for blue (B) are referred to as "AVb1", "AVb2" and "AVb3".

(2) Generation of Enhancement Information

After the scanner driver has partitioned each of the regions given by the histograms for the three colors red (R), green (G) and blue (B) into four small regions, namely into the first to fourth small regions Ry1, Ry2, Ry3 and Ry4, selected three small regions, namely the first to third small regions Ry1, Ry2 and Ry3 therefrom, and obtained the average values AVr1, AVr2, AVr3, AVg1, AVg2, AVg3, AVb1, AVb2 and AVb3 of the density values of the pixels in the first to third small regions Ry1, Ry2 and Ry3 as the attribute information for the first to third small regions Ry1, Ry2 and Ry3, the scanner driver then generates enhancement information for performing a backlight enhancement process on the image read in with the image reading device 10, based on the obtained average values AVr1, AVr2, AVr3, AVg1, AVg2, AVg3, AVb1, AVb2 and AVb3 for each of the colors of the first to third small regions Ry1, Ry2 and Ry3. The following is an explanation of a method for generating the enhancement information in accordance with the second embodiment.

(1) Obtaining the Information Regarding Luminance

In the second embodiment, the scanner driver obtains, for the first to third small regions Ry1, Ry2 and Ry3, the average values Yav1, Yav2 and Yav3 of the luminance of the pixels in the respective regions Ry1, Ry2 and Ry3, based on the average values AVr1, AVr2, AVr3, AVg1, AVg2, AVg3, AVb1, AVb2 and AVb3 of the density values for each of the colors of the pixels in the first to third small regions Ry1, Ry2 and Ry3 obtained from the three histograms for red (R), green (G) and blue (B). Here, the scanner driver obtains the average values Yav1, Yav2 and Yav3 of the luminance of the pixels in the first to third small regions Ry1, Ry2 and Ry3 using the following Equations (7) to (9), for example.

$$Yav1 = \tfrac{1}{5} \times AVr1 + \tfrac{3}{5} \times AVg1 + \tfrac{1}{5} \times AVb1 \tag{7}$$

$$Yav2 = \tfrac{1}{5} \times AVr2 + \tfrac{3}{5} \times AVg2 + \tfrac{1}{5} \times AVb2 \tag{8}$$

$$Yav3 = \tfrac{1}{5} \times AVr3 + \tfrac{3}{5} \times AVg3 + \tfrac{1}{5} \times AVb3 \tag{9}$$

It should be noted that these Equations (7) to (9) are given for the case that the ratio among the colors red (R), green (G) and blue (B) is "1:3:1", but other ratios than this are also possible.

The scanner driver obtains the average values Yav1, Yav2 and Yav3 of the luminance of the pixels in the first to third small regions Ry1, Ry2 and Ry3 using these Equations (7) to (9).

Then, the scanner driver determines the average value Yav0 of the overall luminance of the image read in with the image reading device 10 from the average values Yav1, Yav2 and Yav3 of the luminance of the pixels in the first to third small regions Ry1, Ry2 and Ry3 obtained in this manner. In the second embodiment, the first to third small regions Ry1, Ry2 and Ry3 take up 99% of the overall image, so that the average value of the average values Yav1, Yav2 and Yav3 of the luminance corresponding to the respective first to third small regions Ry1, Ry2 and Ry3 is taken as the average value Yav0 of the overall luminance of the image. Consequently, in the second embodiment, the average value Yav0 of the overall luminance of the image read in with the image reading device 10 can be determined by the following Equation (10), for example.

$$Yav0 = (Yav1 + Yav2 + Yav3)/3 \tag{10}$$

Thus, the scanner driver obtains the average value Yav0 of the overall luminance of the image read in with the image reading device 10.

(2) Obtaining the Target Value

After the scanner driver has thus obtained the average values Yav1, Yav2 and Yav3 of the luminance of the pixels in the first to third small regions Ry1, Ry2 and Ry3 and obtained the average value Yav0 of the overall luminance of the image read in with the image reading device 10, it obtains target values. These target values are values that are obtained in order to perform the backlight enhancement process on the image read in with the image reading device 10, and are the values serving as a target for determining the extent of the backlight enhancement process. In the second embodiment, two target values Ym1 and Ym2 are obtained as target values. One target value Ym1 is obtained with respect to the first small region Ry1 and represents the target value for the average value of the luminance of the pixels in the first small region Ry1. The other target value Ym2 is obtained with respect to the second small region Ry2 and represents the target value for the average value of the luminance of the pixels in the second small region Ry2. In addition to this, also a target value Ym3 corresponding to the third small region Ry3 is obtained. The details concerning this target value Ym3 corresponding to the third small region Ry3 are explained further below.

Figure 19:
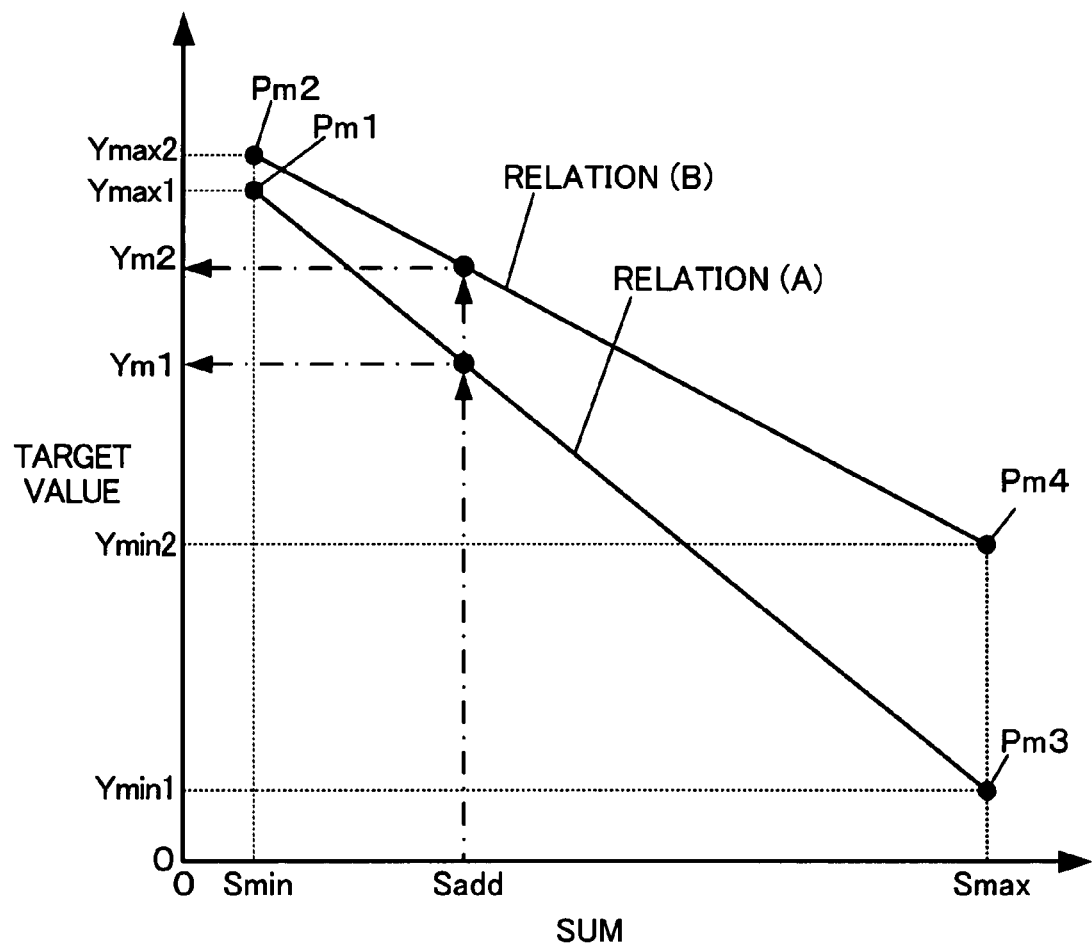
FIG. 19 is an explanatory diagram of an example of a target value obtaining method.

Next, a method for obtaining these two target values Ym1 and Ym2 is explained. FIG. 19 illustrates an example of a method for obtaining the two target values Ym1 and Ym2.

In the second embodiment, the scanner driver obtains these two target values Ym1 and Ym2 based on the average value Yav1 of the luminance of the pixels in the first small region Ry1 and the average value Yav0 of the overall luminance of the image. More specifically, the scanner driver adds the average value Yav1 of the luminance of the pixels in the first small region Ry1 and the average value Yav0 of the overall luminance of the image, and obtains the two target values Ym1 and Ym2 based on the sum Sadd obtained through this. To obtain the two target values Ym1 and Ym2 from the sum Sadd, the two relations (A) and (B) shown in FIG. 19 are used.

The two relations (A) and (B) shown in this figure are expressed in the form of a graph in which the horizontal axis represents the sum and the vertical axis represents the target value. The relation (A) is for obtaining the target value Ym1 corresponding to the first small region Ry1. The relation (B) is for obtaining the target value Ym2 corresponding to the second small region Ry2.

Let us assume that the scanner driver has obtained the sum Sadd by adding the average value Yav1 of the luminance of the pixels in the first small region Ry1 and the average value Yav0 of the overall luminance of the image. Then, the scanner driver obtains the target value Ym1 corresponding to this sum Sadd from the relation (A), based on this sum Sadd. Moreover, the scanner driver obtains the target value Ym2 corresponding to this sum Sadd from the relation (B), based on this sum Sadd. Thus, the scanner driver can obtain, in a simple manner, the two target values, namely the target value Ym1 for the average value of the luminance of the pixels in the first small region Ry1 and the target value Ym2 for the average value of the luminance of the pixels in the second small region Ry2, from the sum Sadd obtained by adding the average value Yav1 of the luminance of the pixels in the first small region Ry1 and the average value Yav0 of the overall luminance of the image.

The following is an explanation of the reason why the scanner driver obtains the two target values, namely the target value Ym1 for the average value of the luminance of the pixels in the first small region Ry1 and the target value Ym2 for the average value of the luminance of the pixels in the second small region Ry2, from the sum Sadd obtained by adding the average value Yav1 of the luminance of the pixels in the first small region Ry1 and the average value Yav0 of the overall luminance of the image. The first small region Ry1 for which the average value Yav1 is obtained is the small region in which density values are smallest among the four small regions obtained by partitioning the histograms generated for the various colors, that is, among the first to fourth small regions. Therefore, the magnitude of the average value Yav1 obtained from the first small region Ry1 changes considerably with respect to the extent of backlight of the image. However, it is not possible to judge whether the image is a backlight image based on the average value Yav1 obtained from the first small region Ry1 alone. This is because also if the overall image is dark, the average value Yav1 obtained from the first small region Ry1 is small. In this case, it is necessary to increase the luminance of the overall image. This is because a sufficient enhancement effect is not attained by merely increasing only the luminance of a portion of the pixels, as in the case of a backlight image.

Accordingly, the average value Yav0 of the overall luminance of the image should also be considered, so that the sum Sadd is obtained by adding the average value Yav0 of the overall luminance of the image to the average value Yav1 of the luminance of the pixels in the first small region Ry1. This sum Sadd is a very suitable value for examining the state of backlighting of the image. That is to say, if this sum Sadd is very small, then not only is the average value Yav1 of the luminance of the pixels in the first small region Ry1 small, but also the average value Yav0 of the overall luminance of the image is small, and it can be judged that the overall image is dark. Thus, it is possible to perform an enhancement to increase the luminance of the overall image.

On the other hand, if the sum Sadd is not so small, then the average value Yav0 of the overall luminance of the image is not small, and the average value Yav1 of the luminance of the pixels in the first small region Ry1 is small, so that it is possible to judge that the image is a backlight image. Thus, it is possible to perform an enhancement to increase the luminance of a portion of the pixels, instead of the luminance of the overall image.

The above-described two relations (A) and (B) are each set such that the two target values Ym1 and Ym2 are established in accordance with the magnitude of this sum Sadd. That is to say, the two relations (A) and (B) are set such that if the sum Sadd is very small, that is, if the luminance of the overall image is low and the image is judged to be dark, then the target value Ym1 of the average values of the luminance of the pixels in the first small region Ry1 and the target value Ym2 of the average value of the luminance of the pixels in the second small region Ry2 both take on very large values, in order to perform an enhancement to increase the luminance of the overall image. Moreover, if the sum Sadd is not so small, that is, if the image is judged to be a backlight image, then the two relations (A) and (B) are set such that the target value Ym1 of the average value of the luminance of the pixels in the first small region Ry1 and the target value Ym2 of the average value of the luminance of the pixels in the second small region Ry2 both do not take on so large values. Thus, in the second embodiment, it is possible to carry out a suitable enhancement, even if the image read in with the image reading device 10 is not a backlight image, but is a dark image whose overall luminance is low.

The two relations (A) and (B) can be set for example as follows. Letting "Smin" be the minimum value that the sum Sadd can take on and "Smax" be the maximum value that the sum Sadd can take on, the maximum target value and the minimum target value corresponding to this minimum value "Smin" and maximum value "Smax" are set. Here, the maximum target value corresponding to the relation (A) is "Ymax1" and its minimum target value is "Ymin1". The maximum target value corresponding to the relation (B) is "Ymax2" and its minimum target value is "Ymin2". It should be noted that the minimum value "Smin" and the maximum value "Smax" of the sum Sadd, the maximum target value "Ymax1" and the minimum target value "Ymin1" of the relation (A) and the maximum target value "Ymax2" and the minimum target value "Ymin2" of the relation (B) can be suitably set heuristically.

Thus, the relation (A) can be set for example simply as a straight line connecting a point Pm1 given by the minimum value "Smin" of the sum Sadd and the maximum target value "Ymax1" of the relation (A) and a point Pm3 given by the maximum value "Smax" of the sum Sadd and the minimum target value "Ymin1" of the relation (A), as shown in FIG. 19. Moreover, the relation (B) can be set for example simply as a straight line connecting a point Pm2 given by the minimum value "Smin" of the sum Sadd and the maximum target value "Ymax2" of the relation (B) and a point Pm4 given by the maximum value "Smax" of the sum Sadd and the minimum target value "Ymin2" of the relation (B), as shown in the same figure.

Here, the minimum target value "Ymin1" of the relation (A) and the minimum target value "Ymin2" of the relation (B), which correspond to the maximum value "Smax" of the sum Sadd, are both set to very small values. Thus, if the sum Sadd is too large, it is possible to set the target value Ym1 for the average value of the luminance of the pixels in the first small region Ry1 and the target value Ym2 for the average value of the luminance of the pixels in the second small region Ry2 to a value that is sufficiently smaller than a standard value. Accordingly, it is possible to perform an enhancement on the image even if the luminance of the overall image is high, that is, if the overall image is bright. That is to say, in the second embodiment, it is possible to subject the image to a suitable backlight enhancement process, without determining whether the image is a backlight image, that is, regardless of whether the image is a backlight image.

Thus, the scanner driver can obtain, in a simple manner, the target value Ym1 for the average value of the luminance of the pixels in the first small region Ry1 and the target value Ym2 for the average value of the luminance of the pixels in the second small region Ry2, from the relations (A) and (B), based on the average value Yav1 of the luminance of the pixels in the first small region Ry1 and the average value Yav0 of the overall luminance of the image.

It should be noted that in the second embodiment, a straight line, that is, a linear function was used for the relations (A) and (B), in order to obtain the two target values Ym1 and Ym2 in a simple manner based on the sum Sadd obtained by adding the average value Yav1 of the luminance of the pixels in the first small region Ry1 and the average value Yav0 of the overall luminance of the image, but it is not necessarily required to use such a linear function for the relations (A) and (B) used here. That is to say, it is also possible to use nonlinear functions for the relations (A) and (B).

Moreover, in the second embodiment, the target values Ym1 and Ym2 are obtained based on the sum Sadd obtained by adding the average value Yav1 of the luminance of the pixels in the first small region Ry1 and the average value Yav0 of the overall luminance of the image, but it is not necessarily required to determine this sum Sadd to obtain the target values Ym1 and Ym2. That is to say, it is also possible to obtain the target values based on only the average value Yav1 of the luminance of the pixels in the first small region Ry1, and it is also possible to obtain the target values based on the average value Yav2 of the luminance of the pixels in the second small region Ry2.

Moreover, in the second embodiment, the two target values Ym1 and Ym2 were obtained based on the sum Sadd, but it is not necessarily required to obtain two target values Ym1 and Ym2 in this manner, and the number of target values may also be one or three or greater.

(3) Generation of Enhancement Information

The scanner driver generates the enhancement information based on the two target values Ym1 and Ym2 obtained in this manner. This enhancement information is information with which the scanner driver subjects the image read in with the image reading device 10 to the backlight enhancement process. In the second embodiment, the scanner driver performs the above-noted "density enhancement" as the backlight enhancement process. Accordingly, in the second embodiment, the scanner driver generates the setting information for the "density enhancement" as the enhancement information. The following is a detailed explanation of a method for generating the setting information for the "density enhancement".

Figure 20:
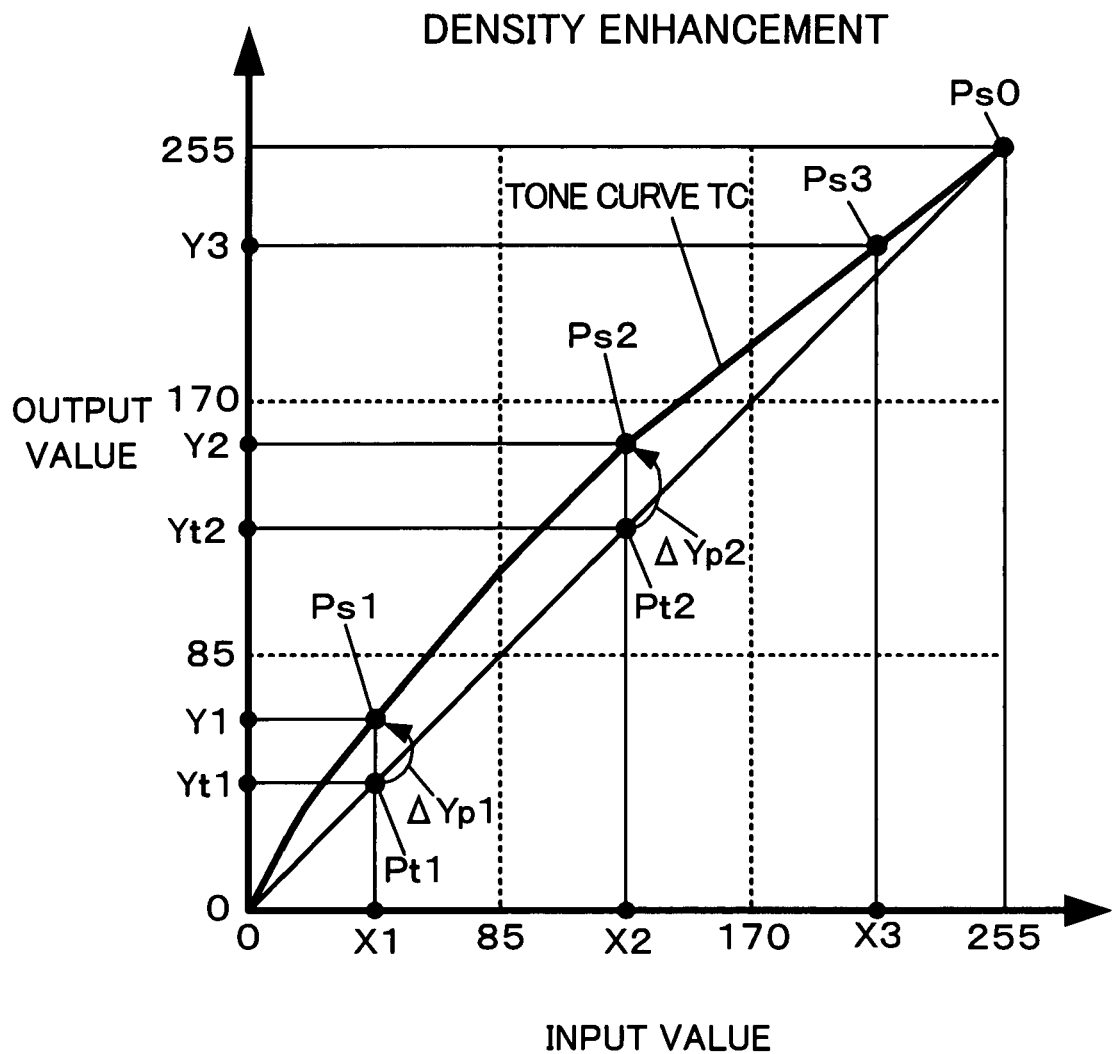
FIG. 20 is an explanatory diagram of an example of an enhancement information generation method.

FIG. 20 illustrates a method for generating the setting information for the "density enhancement" as the enhancement information. Here, the scanner driver performs the backlight enhancement process on the image read in with the image reading device 10 by adjusting the tone curve Tc of the "density enhancement".

It should be noted that in the second embodiment, the tone curve Tc corresponding to all RGB colors (red, green and blue), as illustrated in FIG. 8, is adjusted as the tone curve Tc of the "density enhancement".

Therefore, as the enhancement information, the scanner driver sets three points Ps1, Ps2 and Ps3 as suitable points on the tone curve Tc, based on the two target values Ym1 and Ym2, as shown in FIG. 20. Then, the scanner driver adjusts the tone curve Tc such that it passes through these three points Ps1, Ps2 and Ps3. It should be noted that in the second embodiment, the point Ps1 is set in correspondence with the first small region Ry1. Moreover, the point Ps2 is set in correspondence with the second small region Ry2. And the point Ps3 is set in correspondence with the third small region Ry3. In the second embodiment, the input value of the point Ps1 is "X1" and its output value is "Y1". Moreover, the input value of the point Ps2 is "X2" and its output value is "Y2". Moreover, the input value of the point Ps3 is "X3" and its output value is "Y3".

Here, the input values "X1, "X2" and "X3" of the three points Ps1, Ps2 and Ps3 may be set to any value that the input values can take on, that is, in the second embodiment, to suitable values within the range 0 to 255. However, in order to form a tone curve Tc with superior balance, it is preferable to set them as follows. Namely, in order to arrange the three points Ps1, Ps2 and Ps3 evenly and with superior balance, the input values "X1", "X2 and "X3" are arranged within a range of values that the input values can take on, that is, within partitions obtained by dividing the range 0 to 255 into three partitions. That is to say, the input value "X1" is set within the range 0 to 84. Further, the input value "X2" is set within the range 85 to 169. Further, the input value "X3" is set within the range 170 to 255.

Furthermore, it is preferable that the input values "X1", "X2" and "X3" are set to be positioned substantially at the center of these partitions. More specifically, in the second embodiment, the input value "X1" of the point Ps1 is set to "X2". Further, the input value "42" of the point Ps2 is set to "127". Further, the input value "X3" of the point Ps3 is set to "212".

On the other hand, in the second embodiment, the output values "Y1", "Y2" and "Y3" of the three points Ps1, Ps2 and Ps3 are set as follows. That is to say, the output value "Y1" of the point Ps1 and the output value "Y2" of the point Ps2 are set based on the two target values Ym1 and Ym2. On the other hand, the output value "Y3" of the point Ps3 is set based on the point Ps2 and the point Ps0. Here, the point Ps0 is the point whose input value is set to "255" and whose output value is set to "255". The point Ps3 is set such that it is positioned substantially directly on the straight line set to connect the point Ps2 and the point Ps0. That is to say, when "X3" is obtained as the input value of the point Ps3, the point corresponding to this input value "X3" on the straight line connecting the point Ps2 and the point Ps0 can be found and set as the point Ps3. The output value "Y3" of the point Ps3 can be determined from the straight line connecting the point Ps2 and the point Ps0, as the output value corresponding to the input value "X3".

The following is an explanation of a way to determine the output values "Y1" and "Y2" of the points Ps1 and Ps2. First, a way to determine the output value "Y1" of the point Ps1 is explained. The point Ps1 is set in accordance with the first small region Ry1. The output value "Y1" of the point Ps1 is set such that the average value Yav1 of the luminance of the pixels in the first small region Ry1 of the enhanced histograms becomes the target value "Ym1". More specifically, this is achieved as follows. Namely, "Yt1" is the output value that is obtained if the input value "X1" is not subjected to a "density enhancement". That is to say, the output value "Yt1" is the same value as the input value "X1". Note that, in FIG. 20, the point for the case that the input value "X1" is not subjected to a "density enhancement" is marked as "Pt1". The difference ΔYp1 between this output value "Yt1" and the output value "Y1" of the point Ps1 is determined. This difference ΔYp1 can be determined as follows.

Figure 21A:
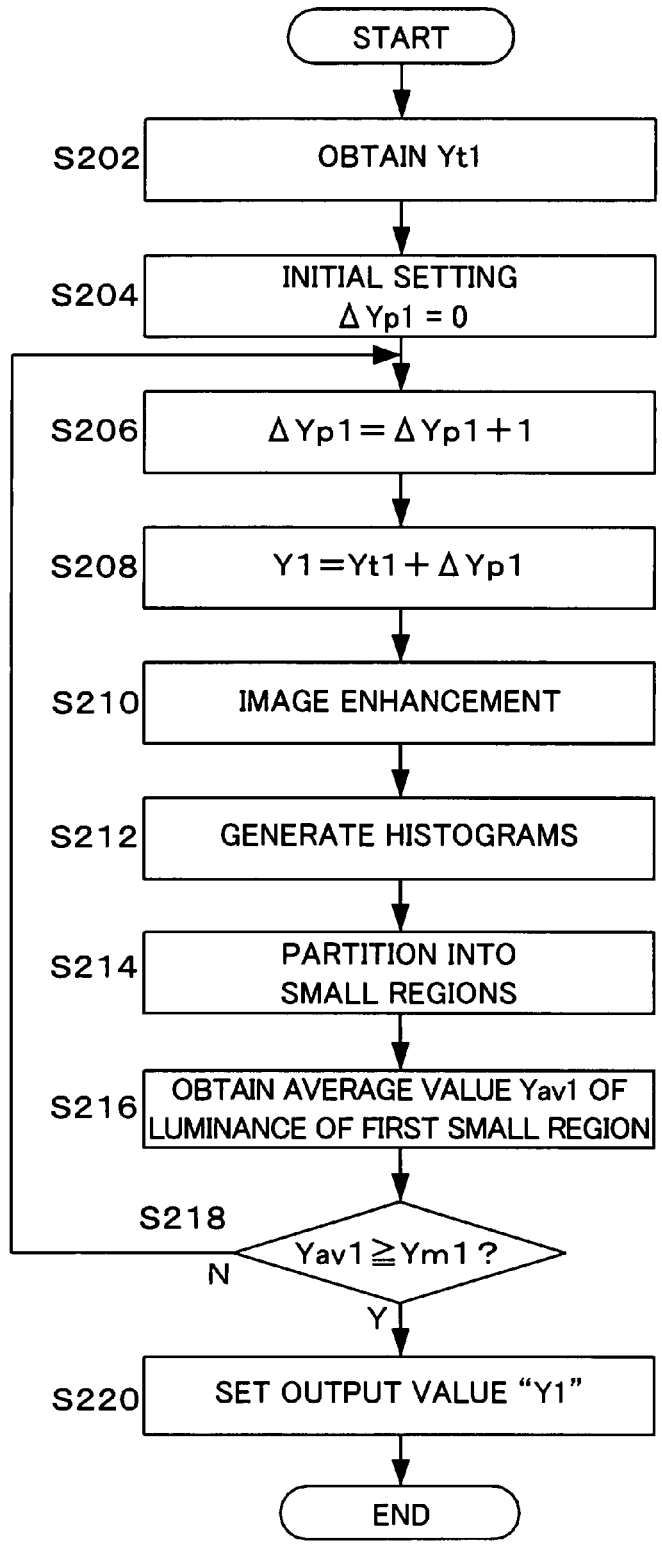
FIG. 21A is an explanatory diagram of an example of a method for setting a point Ps1.

FIG. 21A illustrates a method for determining the difference ΔYp1 according to the second embodiment. In the second embodiment, this difference ΔYp1 is determined by the scanner driver. As shown in this figure, the scanner driver first obtains the output value "Yt1" corresponding to the input value "X1" (S202). It should be noted that here, this output value "Yt1" is the same value as the input value "X1". Next, the scanner driver sets the difference ΔYp1 to an initial value, here to "0" (S204). Then, the scanner driver sets the value obtained by adding "1" to the difference ΔYp1 as the new ΔYp1 (S206). That is to say, if ΔYp1 is "42", then the new ΔYp1 is obtained by adding "1" and will be "43".

Next, the scanner driver sets the value obtained by adding ΔYp1 to the previously obtained output value "Yt1" as the output value "Y1" of the point Ps1 (S208). Then, the data of the enhanced image for the case that the "density enhancement" is performed based on the tone curve Tc set with this point Ps1 is obtained (S210). It should be noted that at this time, the performance of other various adjustments (enhancements), such as a "histogram adjustment" or an "image adjustment" may also be reflected in addition to the "density enhancement", as illustrated in FIG. 11.

After this enhancement has been carried out, the scanner driver generates histograms based on the data of the image obtained through this enhancement (S212). Note that, here, the scanner driver produces histograms for the three colors red (R), green (G) and blue (B). Then, the scanner driver partitions the histograms produced in this way into small regions (S214). That is to say, as explained above, here the scanner driver partitions the regions given by the histograms into four small regions, that is, the first to fourth small regions Ry1, Ry2, Ry3 and Ry4.

Then, the scanner driver obtains attribute information relating to the first small region Ry1 from the four regions Ry1, Ry2, Ry3 and Ry4 obtained by this partitioning. It should be noted that, here the scanner driver obtains the average values of the density values AVr1, AVg1 and AVb1 of the colors red (R), green (G) and blue (B) as the attribute information relating to the first small region Ry1. Then, the scanner driver determines the average value Yav1 of the luminance of the pixels in the first small region Ry1, based on the obtained average values AVr1, AVg1 and AVb1 of the density values of the various colors (S216). Here, the scanner driver determines the average value Yav1 from Equation (7), for example.

After this, the scanner driver compares the determined average value Yav1 and the previously obtained target value Ym1 (S218). Here, the scanner driver checks whether the determined average value Yav1 is equal to or greater than the target value Ym1. Then, if the determined average value Yav1 is not equal to or greater than the target value Ym1, the scanner driver returns to Step S206, and again obtains a new ΔYp1 by adding "1" only to the difference ΔYp1 (S206). Then, after the output value "Y1" of the point Ps1 is obtained again (S208) and the enhancement of the image is performed based on this (S210), the histograms are generated (S212), partitioned into small regions (S214), and the average value Yav1 of the luminance of the pixels in the first small region Ry1 is determined (S216). After this, the determined average value Yav1 and the target value Ym1 are compared, and it is again checked whether the determined average value Yav1 has reached the target value Ym1 (S218). The scanner driver repeats this process (S206-S218) until the determined average value Yav1 reaches the target value Ym1. That is to say, the difference ΔYp1 is increased by successively adding "1", until the determined average value Yav1 reaches the target value Ym1.

Then, when the determined average value Yav1 has reached the target value Ym1, the scanner driver sets the output value "Y1" of the point Ps1 based on the thus obtained difference ΔYp1 (S220). That is to say here, the scanner driver sets the value obtained by adding the difference ΔYp1 to the output value "Yt1" as the output value "Y1" of the point Ps1.

Thus, the scanner driver sets the output value "Y1" of the point Ps1 such that the average value Yav1 of the luminance of the pixels in the first small region Ry1 of the enhanced histograms becomes the target value Ym1. It should be noted that if the output value "Y1" of the point Ps1 is set to a value that is smaller than the output value "Yt1", then the scanner driver may check in Step S218 whether the average value Yav1 is lower than the target value Ym1.

On the other hand, the output value "Y2" of the point Ps2 is set in a similar manner as in the case of the output value "Y1" of the point Ps1. That is to say, the point Ps2 is set in correspondence with the second small region Ry2. As in the case of the point Ps1, the output value "Y2" of the point Ps2 is set such that the average value Yav2 of the luminance of the pixels in the second small region Ry2 of the enhanced histograms becomes the target value Ym2. That is to say, when "Yt2" is the output value obtained in the case that no "density enhancement" is performed on the input value "X2", the difference ΔYp2 of the output value "Y2" of the point Ps2 to this output value "Yt2" is determined. In FIG. 20, the point for the case that the input value "X2" is not subjected to a "density enhancement" is marked as "Pt2".

Figure 21B:
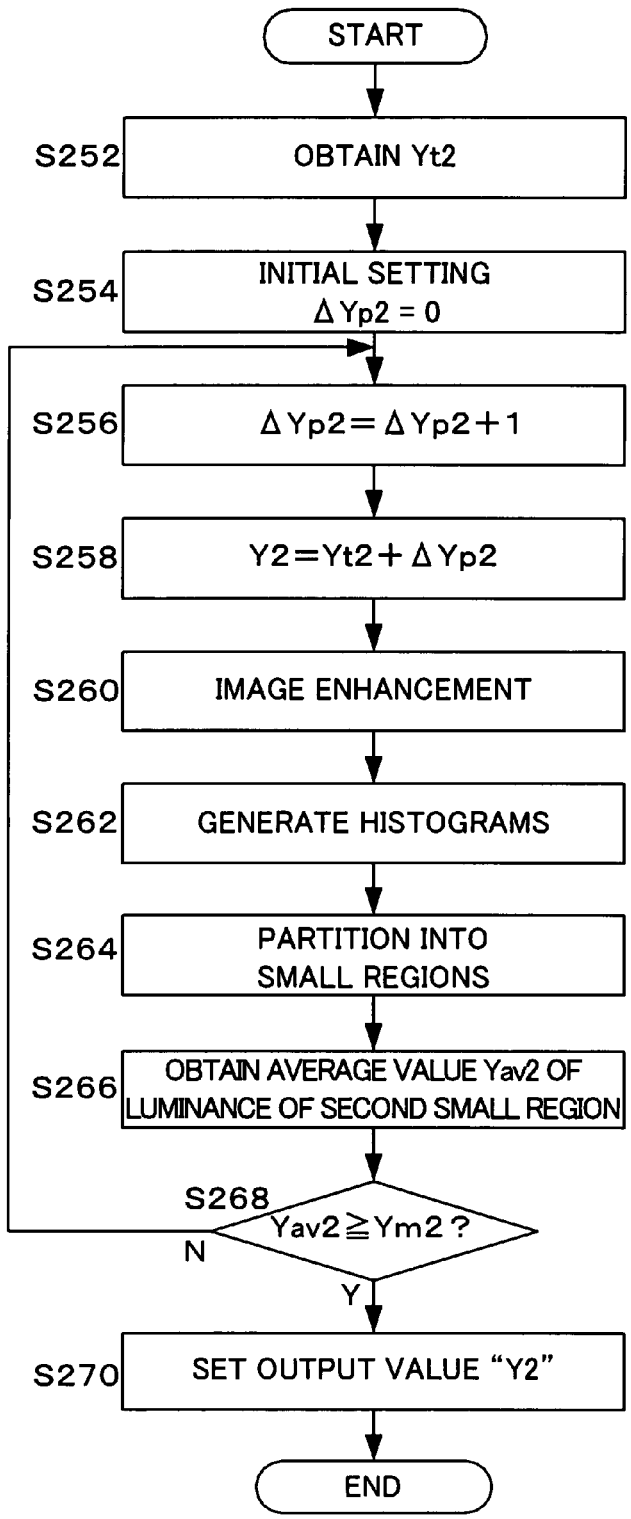
FIG. 21B is an explanatory diagram of an example of a method for setting a point Ps2.

FIG. 21B illustrates a method for determining the difference ΔYp1 according to the second embodiment. It should be noted that as in the case of the point Ps1, also the difference ΔYp2 is determined by the scanner driver. As shown in the figure, the scanner driver first obtains the output value "Yt2" corresponding to the input value "X2" (S252). It should be noted that here, this output value "Yt2" is the same value as the input value "X2". Next, the scanner driver sets the difference ΔYp2 to an initial value, here to "0" (S254). Then, the scanner driver sets the value obtained by adding "1" to the difference ΔYp2 as the new ΔYp2 (S256).

Next, the scanner driver sets the value obtained by adding ΔYp2 to the previously obtained output value "Yt2" as the output value "Y2" of the point Ps2 (S258). Then, the data of the enhanced image for the case that the "density enhancement" is performed based on the tone curve Tc set with this point Ps2 is obtained (S260). It should be noted that at this time, the performance of other various adjustments (enhancements), such as a "histogram adjustment" or an "image adjustment" may also be reflected in addition to the "density enhancement", as illustrated in FIG. 11. Here, the scanner driver may or may not reflect the settings for the point Ps1.

After this enhancement has been carried out, the scanner driver generates histograms based on the data of the image obtained through this enhancement (S262). Note that, here, the scanner driver produces histograms for the three colors red (R), green (G) and blue (B). Next, the scanner driver partitions the produced histograms into four small regions Ry1, Ry2, Ry3 and Ry4 (S264).

Then, the scanner driver obtains attribute information relating to the second small region Ry2 from the four regions Ry1, Ry2, Ry3 and Ry4 obtained by this partitioning. It should be noted that the scanner driver obtains the average values AVr2, AVg2 and AVb2 of the density values of each of the colors red (R), green (G) and blue (B) as the attribute information relating to the second small region Ry2. Then, the scanner driver determines the average value Yav2 of the luminance of the pixels in the second small region Ry2, based on the obtained average values AVr2, AVg2 and AVb2 of the density values of the obtained various colors (S266). Here, the scanner driver determines the average value Yav2 from Equation (8), for example.

After this, the scanner driver compares the determined average value Yav2 and the previously obtained target value Ym2 (S268). Here, if the determined average value Yav2 has not reached the target value Ym2, the scanner driver returns to Step S256, and again obtains the new ΔYp1 by adding "1" (S256), obtains the output value "Y2" of the point Ps2 (S258), and performs an enhancement of the image based on this (S260). Then, the scanner driver generates histograms of the enhanced image (S262), partitions them into four small regions (S264), and again obtains the average value Yav2 (S266). After this, the obtained average value Yav2 and the target value Ym2 are compared, and it is again checked whether the determined average value Yav2 has reached the target value Ym2 (S268). The scanner driver repeats this process (S256-S268) until the determined average value Yav2 reaches the target value Ym2. That is to say, the difference ΔYp2 is increased by successively adding "1", until the determined average value Yav2 reaches the target value Ym2.

Then, when the determined average value Yav2 has reached the target value Ym2, the scanner driver sets the output value "Y2" of the point Ps2 based on the thus obtained difference ΔYp2 (S270). That is to say here, the scanner driver sets the value obtained by adding the difference ΔYp2 to the output value "Yt2" as the output value "Y2" of the point Ps2.

Thus, the scanner driver sets the output value "Y2" of the point Ps2 such that the average value Yav2 of the luminance of the pixels in the second small region Ry2 of the enhanced histograms becomes the target value Ym2. It should be noted that if the output value "Y2" of the point Ps2 is set to a value that is smaller than the output value "Yt2", then the scanner driver may check in Step S268 whether the average value Yav2 has become equal to or lower than the target value Ym2.

Note that, as explained above, the output value "Y3" of the point Ps3 can be determined from the straight line connecting the point Ps2 and the point Ps0, as the output value corresponding to the input value "X3".

(4) Alternative Method for Setting the Input Values X1, X2 and X3

As an alternative method for setting the input values "X1", "X2" and "X3" of the above-noted three points Ps1, Ps2 and Ps3, there is also the following method. Namely, for example, it is also possible to set them while giving consideration to the average values Yav1, Yav2 and Yav3 of the luminance of the pixels in the first to third small regions Ry1, Ry2 and Ry3. That is to say, the input values "X1", "X2" and "X3" of the three points Ps1, Ps2 and Ps3 may reflect the average values Yav1, Yav2 and Yav3 of the luminance of the pixels in the first to third small regions Ry1, Ry2 and Ry3. More specifically, the following setting method is possible.

Figure 22A:
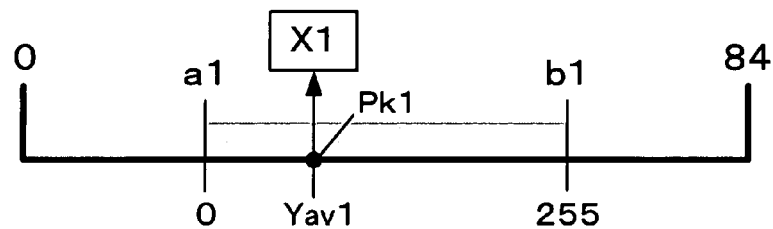
FIG. 22A illustrates another method for setting the input value "X1" of the point Ps1.
Figure 22B:
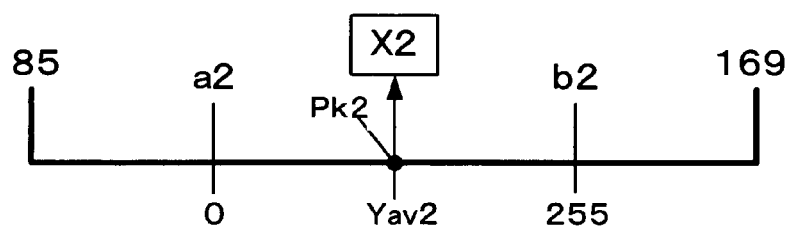
FIG. 22B illustrates another method for setting the input value "X2" of the point Ps2.
Figure 22C:
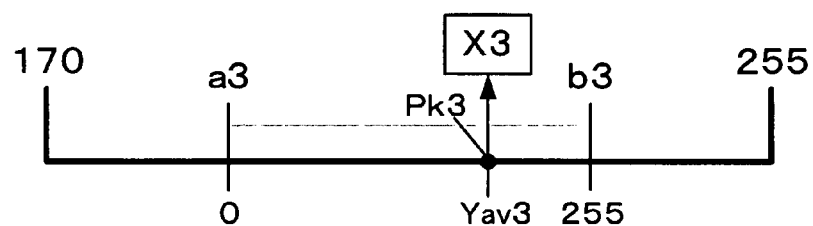
FIG. 22C illustrates another method for setting the input value "X3" of the point Ps3.

FIGS. 22A to 22C illustrate an example of the case that the three input values "X1", "X2" and "X3" are set reflecting the average values Yav1, Yav2 and Yav3 of the luminance of the pixels in the first to third small regions Ry1, Ry2 and Ry3. FIG. 22A illustrates a method for setting the input value "X1" of the point Ps1. FIG. 22B illustrates a method for setting the input value "X2" of the point Ps2. FIG. 22C illustrates a method for setting the input value "X3" of the point Ps3.

To set the input value "X1" of the point Ps1, a predetermined range "a1" to "b1" is set within the range "0" to "84" within which the input value "X1" is set, as shown in FIG. 22A. This predetermined range "a1" to "b1" is set substantially in the middle of the range "0" to "84". "a1" and "b1" are respectively set to suitable values within the range "0" to "84". The predetermined range "a1" to "b1" set in this manner is divided into 256 equal portions, to which the values "0" to "255" are assigned, and the point Pk1 corresponding to the average value Yav1 of the luminance of the pixels in the first small region Ry1 is specified. Then, the value of the range "0" to "84" corresponding to this point Pk1 is determined. The determined value is set as the input value "X1" of the point Ps1.

To set the input value "X2" of the point Ps2, a predetermined range "a2" to "b2" is set within the range "85" to "169" within which the input value "X2" is set, as shown in FIG. 22B. This predetermined range "a2" to "b2" is set substantially in the middle of the range "85" to "169". "a2" and "b2" are respectively set to suitable values within the range "85" to "169". The predetermined range "a2" to "b2" set in this manner is divided into 256 equal portions, to which the values "0" to "255" are assigned, and the point Pk2 corresponding to the average value Yav2 of the luminance of the pixels in the second small region Ry2 is specified. Then, the value of the range "85" to "169" corresponding to this point Pk2 is determined. The determined value is set as the input value "X2" of the point Ps2.

To set the input value "X3" of the point Ps3, a predetermined range "a3" to "b3" is set within the range "170" to "255" within which the input value "X3" is set, as shown in FIG. 22C. This predetermined range "a3" to "b3" is set substantially in the middle of the range "170" to "255". "a3" and "b3" are respectively set to suitable values within the range "170" to "255". The predetermined range "a3" to "b3" set in this manner is divided into 256 equal portions, to which the values "0" to "255" are assigned, and the point Pk3 corresponding to the average value Yav3 of the luminance of the pixels in the third small region Ry3 is specified. Then, the value of the range "170" to "255" corresponding to this point Pk3 is determined. The determined value is set as the input value "X3" of the point Ps3.

The following is the reason why the predetermined ranges "a1" to "b1", "a2" to "b2" and "a3" to "b3" are set when setting the input values "X1", "X2" and "X3" of the three points Ps1, Ps2 and Ps3, while reflecting the average values Yav1, Yav2 and Yav3 of the luminance of the pixels in the first to third small regions Ry1, Ry2 and Ry3. If the average values Yav1, Yav2 and Yav3 of the luminance of the pixels in the first to third small regions Ry1, Ry2 and Ry3 are set unchanged as the input values "X1", "X2" and "X3", then the range of values that the input values "X1", "X2" and "X3" can take on is broadened, and therefore there is the risk that the adjusted tone curve Tc is affected considerably.

That is, for example, let us assume that the average value Yav1 of the luminance of the pixels in the first small region Ry1 is very small. If the average value Yav1 is set unchanged as the input value "X1" of the point Ps1, and the position of the point Ps1 is set within the tone curve Tc in FIG. 20, then the position of the point Ps1 moves to the left in the figure and approaches the vertical axis, so that the rise of the tone curve Tc becomes very steep. Moreover, if the average value Yav1 of the luminance of the pixels in the first small region Ry1 is very large, then the position of the point Ps1 moves to the right in the figure and approaches the point Ps2, so that the shape of the tone curve Tc becomes warped. This is also the same for the points Ps2 and Ps3.

Accordingly, in order to ensure that the positions of the points Ps1, Ps2 and Ps3 do not become too close to each other, the values establishing the predetermined ranges, that is, "a1", "b1", "a2", "b2", "a3" and "b3" are each set to suitable values, so that the shape of the tone curve Tc will not become warped.

Thus, the scanner driver generates information for setting the three points Ps1, Ps2 and Ps3 for adjusting the tone curve Tc for the "density enhancement" as the enhancement information, based on the obtained two target values Ym1 and Ym2.

It should be noted that in the second embodiment, three points Ps1, Ps2 and PS3 are set as the enhancement information, but it is not necessarily required to set three points Ps1, Ps2 and Ps3 as the enhancement information. That is to say, the number of points that are set as enhancement information may also be one or two, and it may also be four or greater. The number of points that are set may be set as suitable in accordance with the number of small regions that are obtained by partitioning the regions given by the histograms for the three colors red (R), green (G) and blue (B), but it may also be set as suitable in accordance with the number of the small regions selected in order to obtain the attribute information.

Moreover, the three points Ps1, Ps2 and Ps3 that are set as attribute information do not have to be arranged within the partitions obtained by partitioning the values that the input values can take on, that is in the second embodiment, the values "0" to "255", into three ranges.

Moreover, in the second embodiment, the setting information of the three points Ps1, Ps2 and Ps3 for adjusting the tone curve Tc in the "density enhancement" is generated as the enhancement information through the execution of the "density enhancement" as the backlight enhancement process, but it is not necessarily required to generate such setting information as the enhancement information. That is to say, it is sufficient if information suitable for the processing carried out as the backlight enhancement process is generated as the enhancement information.

(2) Backlight Image Enhancement Process

Then, the scanner driver performs a backlight enhancement process on the image read in with the image reading device 10, based on the information relating to the three points Ps1, Ps2 and Ps3 for adjusting the tone curve Tc for the "density enhancement", which have been generated as the enhancement information in this manner. It should be noted that in the second embodiment, the scanner driver corresponds to a "backlight enhancement processing section". More specifically, in the "density enhancement" in the adjustment procedure explained in FIG. 11, the density values for each color of the data of the pixels constituting the image read in with the image reading device 10 are converted, based on the tone curve Tc adjusted with the information relating to the three points Ps1, Ps2 and Ps3 generated as the enhancement information. Thus, the scanner driver subjects the image read in with the image reading device 10 to the backlight enhancement process.

It should be noted that the image subjected to this backlight enhancement process may be an image that already has been subjected to a histogram adjustment or an image adjustment ((3) but not a saturation adjustment) in accordance with the adjustment procedure shown in FIG. 11. The scanner driver performs the backlight enhancement process through a "density enhancement" on the image that already has been subjected to such a histogram adjustment or an image adjustment ((3) but not a saturation adjustment).

(2) Other Application Examples

In the above-explained determining method, regions given by histograms for the three colors red (R), green (G) and blue (B) were partitioned respectively into four small regions, namely the first to fourth small regions Ry1, Ry2, Ry3 and Ry4, but it is not necessarily required to partition them into four small regions Ry1, Ry2, Ry3 and Ry4. That is to say, it is sufficient if the regions given by the histograms for the three colors red (R), green (G) and blue (B) are partitioned into at least two small regions, and they may also be partitioned into three small regions or partitioned into five or more small regions.

Moreover, in the above-noted determining method, the four small regions Ry1, Ry2, Ry3 and Ry4 obtained by dividing the regions given by the histograms for the three colors red (R), green (G) and blue (B) included three small regions Ry1, Ry2 and Ry3 of substantially equal area and substantially equal pixel number, but it is not necessarily required to provide such small regions that have substantially the same area and pixel number. Moreover, there is no limitation to the case that three small areas are provided that have substantially the same area or pixel number, and there may also be two or four or more of such small areas.

Moreover, with the above-described determining method, among the first to fourth small regions Ry1, Ry2, Ry3 and Ry4 obtained by partitioning the regions given by the histograms for the three colors red (R), green (G) and blue (B), the first to third small regions Ry1, Ry2 and Ry3 were selected from the first to fourth small regions Ry1, Ry2, Ry3 and Ry4, but there is no limitation to carrying out the selection in this manner. That is to say, it is sufficient if at least one small region is selected from among the at least two small regions obtained by partitioning the regions given by the histograms for the three colors red (R), green (G) and blue (B), and it is also sufficient if one of the first to third small regions Ry1, Ry2 and Ry3 is selected. Moreover, if the small regions are partitioned by a method other than the above-described method, then also the small regions may be selected by another approach.

Moreover, in the above-described determining method, the average values AVr1, AVr2, AVr3, AVg1, AVg2, AVg3, AVb1, AVb2 and AVb3 of the density values of the pixels in the first to third small regions Ry1, Ry2 and Ry3 for each of the various colors were obtained as the attribute information from the selected small regions, that is, the first to third small regions Ry1, Ry2 and Ry3, but it is not necessarily required to obtain such attribute information. That is to say, the attribute information obtained from the selected small regions may be any attribute information, and may also be, for example, the maximum value or the minimum value of the density values of the pixels in the selected first to third small regions Ry1, Ry2 and Ry3, or the size of the area of the selected first to third small regions Ry1, Ry2 and Ry3. It should be noted that it is preferable that the attribute information obtained from the selected small regions is information that is useful in carrying out the backlight enhancement process.

Moreover, in the above-described determining method, the information relating to luminance is obtained based on the average values AVr1, AVr2, AVr3, AVg1, AVg2, AVg3, AVb1, AVb2 and AVb3 of the density values of the pixels in the first to third small regions Ry1, Ry2 and Ry3 for each of the colors, respectively obtained as attribute information from the selected first to third small regions Ry1, Ry2 and Ry3, and the target values are obtained based on information relating to this luminance, to generate the enhancement information based on the target values, but the enhancement information for carrying out the backlight enhancement process does not necessarily have to be generated by this method. That is to say, it is also possible to generate the enhancement information by another method, based on attribute information obtained from the selected first to third small regions Ry1, Ry2 and Ry3.

Moreover, in the above-described determining method, the backlight enhancement process is carried out by adjusting the tone curve Tc for the "density enhancement", but it is not necessarily required to carry out the backlight enhancement process through this method. That is to say, it is possible to carry out any backlight enhancement process, as long as it is a backlight enhancement process with which a backlight image can be subjected to an enhancement process.

(2) Overview

As described above, in accordance with the second embodiment, histograms for the three colors red (R), green (G) and blue (B) are generated based on the data of the pixels constituting the image read in with the image reading device 10. The regions given by these histograms are each partitioned into four small regions, namely the first to fourth small regions Ry1, Ry2, Ry3 and Ry4. Three small regions, namely the first to third small regions Ry1, Ry2 and Ry3 are selected for each color from the four small regions Ry1, Ry2, Ry3 and Ry4. Attribute information is respectively obtained from the first to third small regions Ry1, Ry2 and Ry3. Based on this attribute information, enhancement information for carrying out a backlight enhancement process is generated. The image read in with the image reading device 10 is subjected to a backlight enhancement process based on this enhancement information. Accordingly, the image read in with the image reading device 10 can be subjected to a suitable backlight enhancement process.

Moreover, among the first to fourth small regions Ry1, Ry2, Ry3 and Ry4 obtained by partitioning the respective regions given by the histograms of the colors red (R), green (G) and blue (B), first to third small regions Ry1, Ry2 and Ry3 are provided that have substantially the same area and pixel number, and by obtaining the attribute information respectively from these first to third small regions Ry1, Ry2 and Ry3, it is possible to perform a more suitable backlight enhancement process on the image read in with the image reading device 10.

Moreover, by obtaining, as attribute information, the average values AVr1, AVr2, AVr3, AVg1, AVg2, AVg3, AVb1, AVb2 and AVb3 of the density values of the respective colors of the pixels in the selected first to third small regions Ry1, Ry2 and Ry3, it is possible to generate more suitable enhancement information and to perform a more suitable backlight enhancement process on the image read in with the image reading device 10.

Moreover, by obtaining the average values Yav1, Yav2 and Yav3 of the luminance of the pixels in the first to third small regions Ry1, Ry2 and Ry3 based on the average values AVr1, AVr2, AVr3, AVg1, AVg2, AVg3, AVb1, AVb2 and AVb3 of the density values of the respective colors of the pixels in the selected first to third small regions Ry1, Ry2 and Ry3, it is possible to generate more suitable enhancement information and to perform a more suitable backlight enhancement process on the image read in with the image reading device 10.

Furthermore, by obtaining the sum Sadd by adding the average value Yav1 of the luminance of the pixels in the obtained first small region Ry1 and the average value Yav0 of the overall luminance of the image, it is possible to generate more suitable enhancement information and to perform a more suitable backlight enhancement process on the image read in with the image reading device 10.

Moreover, by performing a "density enhancement" as the backlight enhancement process, it is possible to perform a simple backlight enhancement process on the image read in with the image reading device 10.

(2) Application to Printing Apparatus

Figure 23:
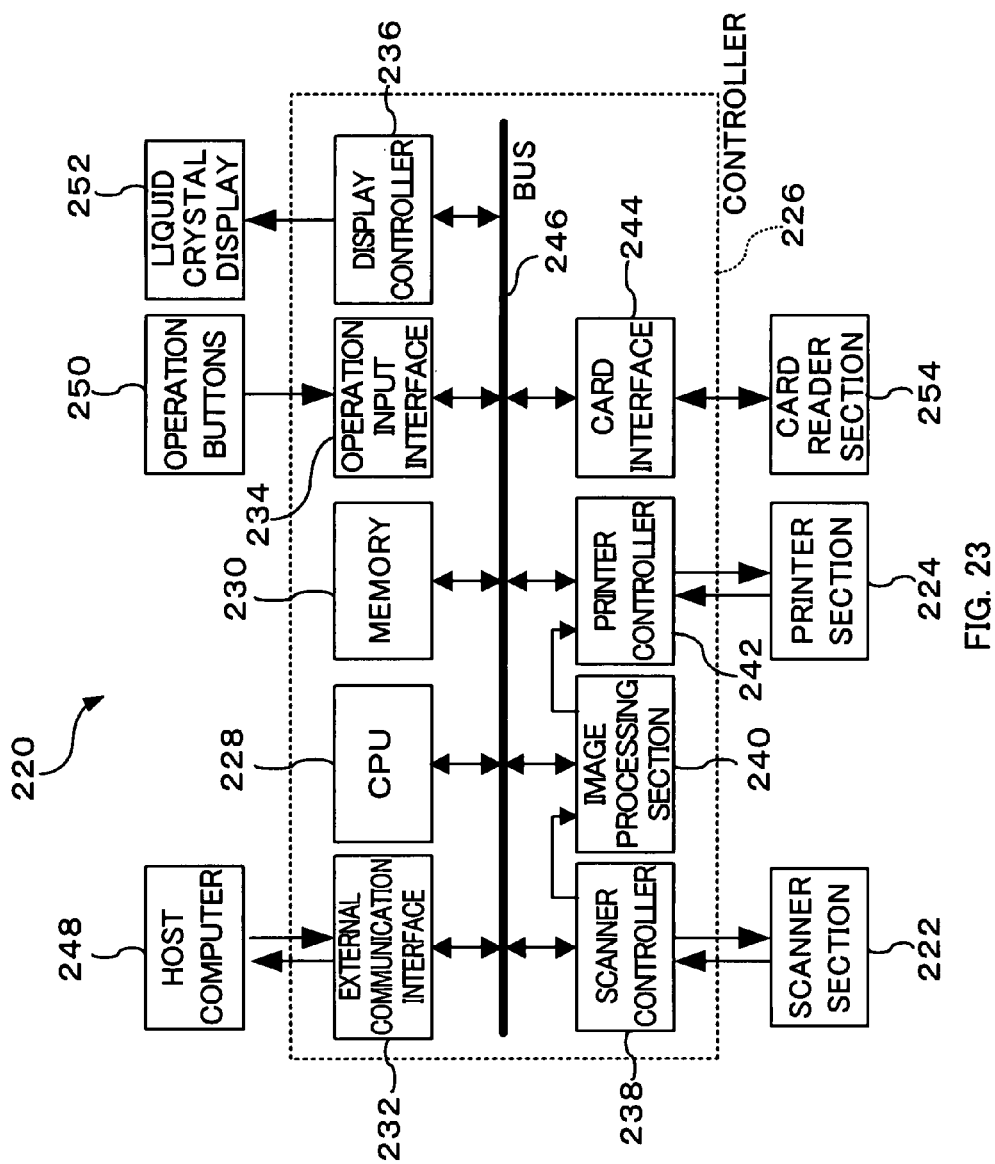
FIG. 23 is an explanatory diagram showing an embodiment of a printing apparatus.

Such an image reading device 10 can also be mounted to a printing apparatus. FIG. 23 illustrates a configuration example of a printing apparatus 220 provided with such an image reading device 10. This printing apparatus 220 is a multifunctional apparatus provided with a scanner function for generating image data by reading in an image from an original document, a printer function for printing print data sent from a host computer 248 on various types of media, such as print paper or the like, and a local copying function for copying by printing on a medium an image read in from an original document. This printing apparatus 220 is provided with a scanner section 222 (including a scanner controller 238, and corresponding to what is here referred to as "image reading device 10") that reads in an image from an original document, and a printer section 224 for printing on a medium S, such as print paper or the like.

Furthermore, as shown in the same figure, the controller 226 of the printing apparatus 220 includes a CPU 228, a memory 230, an external communication interface 232, an operation input interface 234, a display controller 236, a scanner controller 238, an image processing section 240, a printer controller 242, a card interface 244, and a bus 246 connecting these to each other.

The CPU 228 performs the overall control of the printing apparatus 220. The memory 230 stores a program carried out by the CPU 228 and data used for the program. The external communication interface 232 communicates by wire or wirelessly with the host computer 248. The operation input interface 234 receives the operation input from the user via operation buttons 250 or the like. The display controller 236 controls the display section, which may be a liquid crystal display 252 or the like.

On the other hand, the scanner controller 238 controls the scanner section 222 and carries out the read-in operation of reading in an image from the original document. The image processing section 240 has the function of converting the data of an image that is output from the scanner section 222 into data for carrying out the printing process with the printer section 224, in order to print with the printer section 224 the image read in from the original document with the scanner section 222. The printer controller 242 controls the printer section 224. Moreover, the card interface 244 performs a process such as reading in image data stored in various types of memory cards set in a card reader section 254 from those memory cards.

Moreover, during the scanner function, the printing apparatus 220 outputs the data of the image read in from the original document with the scanner section 222 to the host computer 248. Moreover, during the printer function, the printing apparatus 220 performs printing on various types of media with the printer section 224, based on the print data sent from the host computer 248. And during the local copying function, the printing apparatus 220 makes copies by printing with the printer section 224 the image read in from the original document with the scanner section 222 on various types of media.

(2) Other Embodiments

In the foregoing, an embodiment of an image reading system according to the invention was described as an example. However, the foregoing embodiment is for the purpose of elucidating the invention and is not to be interpreted as limiting the invention. The invention can of course be altered and improved without departing from the gist thereof and includes functional equivalents. In particular, the embodiments mentioned below are also included in the scope of invention.

(2) Regarding the Image

In the above-described second embodiment, the image to be subjected to backlight enhancement processing was explained by taking as an example an image read in with the image reading device 10, but here the "image" may be any image. More specifically, it may also be an image taken with a digital camera or the like, for example. Furthermore, the format of the image may be of any type, and it may be for example an image expressed by any type of format, such as JPEG format, bitmap format or YUV format.

(2) Regarding the Density Values

In the above-described second embodiment, the "density values" were explained to be density values expressed by 256 tones, that is, density values that can assume the values "0" to "255", but the "density values" are not limited to such density values. That is to say, the "density values" may be any density values, as long as they are data expressing the darkness/brightness of the individual pixels constituting an image. It should be noted that these "density values" also include density values of the luminance expressed by the YUV format, for example.

(2) Regarding the Histograms

In the above-described second embodiment, histogram data of the three colors red (R), green (G) and blue (B) was generated as the "histogram data", but this "histogram data" is not necessarily limited to the case that histogram data of these three colors red (R), green (G) and blue (B) is generated. That is to say, it is also possible that histogram data of two or more different colors is generated as the "histogram data" or that histogram data of a single color, for example black is generated as the "histogram data".

(2) Regarding the Histogram Data Generation Section

In the above-described second embodiment, the scanner driver generated, as the "histogram data generation section", the histogram data based on the data of the pixels constituting the image to be determined, that is, the image read in with the image reading device 10, but the "histogram data generation section" is not necessarily limited to such a scanner driver. That is to say, the "histogram data generation section" may be a "histogram data generation section" of any type, as long as it generates histogram data based on the data of the pixels constituting the image to be determined.

(2) Regarding the Attribute Information Obtaining Section

In the above-described second embodiment, the scanner driver partitioned, as an "attribute information obtaining section", the regions given by the histograms of the respective colors red (R), green (G) and blue (B) into at least two small regions according to the magnitudes of their density values, to select from these two or more small regions at least one small region, and to obtain the attribute information from this selected small region, but the "attribute information obtaining section" does not necessarily have to be such a scanner driver. That is to say, what is referred to here as "attribute information obtaining section" may be an "attribute information obtaining section" of any type, as long as it obtains the attribute information by an approach as described above.

(2) Regarding the Enhancement Information

In the above-described second embodiment, for the backlight enhancement process, setting information relating to suitable points for adjusting the toner curve Tc for the "density enhancement" were generated as the enhancement information, because "density enhancement" is executed, but there is no limitation to generating such setting information as the enhancement information. That is to say, any type of enhancement information may be generated, as long as it is enhancement information for carrying out a backlight enhancement process on the image.

(2) Regarding the Enhancement Information Generation Section

In the above-described second embodiment, the scanner driver generated, as the "enhancement information generation section", setting information relating to suitable points for adjusting the toner curve Tc for the "density enhancement" as the enhancement information, but the "enhancement information generation section" does not necessarily have to be such a scanner driver. That is to say, the "enhancement information generation section" may be any type of "enhancement information generation section", as long as it obtains the enhancement information for subjecting an image to a backlight enhancement process.

(2) Regarding the Backlight Enhancement Processing Section

In the above-described second embodiment, the scanner driver performs, as a "backlight enhancement processing section", a backlight enhancement process on the image read in with the image reading device, but this "backlight enhancement processing section" does not necessarily have to be such a scanner driver. That is to say, the "backlight enhancement processing section" may be any type of "backlight enhancement processing section", as long as it performs a backlight enhancement process on an image.

(2) Regarding the Image Reading Device

In the above-described second embodiment, the "image reading device" was explained by taking as an example an image reading device provided with an image sensor 50 for reading in images, which is provided on a carriage 40 that moves relatively to the original document 15 set on a platen 12, but the "image reading device" is not necessarily limited to this type of "image reading device". That is to say, the "image reading device" may be any type of apparatus, as long as it is an apparatus reading in images from an original document. In other words, the "image reading device" may also include an image reading device that reads in an image from an original document 15 as the original document 15 moves relatively to an image sensor 50 reading in the image.

(2) Regarding the Printing Apparatus

In the above-described second embodiment, the "printing apparatus" was explained by taking as an example the case of a "multifunctional apparatus" provided with an image reading section (scanner section 222) generating image data by reading in an image from an original document 15, and a printing section (printer section 224) printing the image on a medium, but this "printing apparatus" does not necessarily have to be provided with an image reading section (scanner section 222 (includes also the scanner controller 238 and the image processing section 240)). That is to say, it is sufficient if the "printing apparatus" is provided at least with a printing section for printing an image on a medium.

What is claimed is:

1. A non-transitory computer readable medium storing thereon a program for backlight image determining, the program comprising:
a histogram data generation section that, based on data of pixels constituting an image to be determined, generates data of histograms for respective colors, the histograms representing a distribution of the number of pixels in respect to density values of the respective colors of those pixels;
an attribute information obtaining section that obtains, for each color, attribute information relating to a first small region and a second small region by partitioning regions given by the histograms for the respective colors into at least three small regions according to the magnitude of the density values, based on the data of the histograms for the respective colors generated by the histogram data generation section, selecting for each color at least one small region from the at least three small regions as the first small region, and selecting, from the at least three small regions, for each color at least one small region whose density values are larger than those of the first small region and which is not adjacent to the first small region, as the second small region; and
a determination section that determines whether the image to be determined is a backlight image, based on the attribute information relating to the first small region for each color and the attribute information relating to the second small region for each color, which is obtained with the attribute information obtaining section.

2. A medium according to claim 1,
wherein the at least three small regions include at least two small regions that have at least one of the same pixel number and the same area, and
the first small region is the small region with the smallest density values among the at least two small regions.

3. A medium according to claim 1,
wherein the at least three small regions include at least two small regions that have at least one of the same pixel number and the same area, and
the second small region is the small region with the largest density values among the at least two small regions.

4. A medium according to claim 1,
wherein the attribute information obtaining section obtains a maximum value of the density values of the first small region or the second small region as the attribute information of the first small region or the second small region.

5. A medium according to claim 1,
wherein the determination section determines whether the image to be determined is a backlight image based on a result of a comparison between the attribute information relating to the first small region for each color and the attribute information relating to the second small region for each color.

6. A medium according to claim 5,
wherein the determination section determines whether the image to be determined is a backlight image by comparing a value that is obtained based on a value obtained for each color as the attribute information relating to the first small region for each color and a value that is obtained based on a value obtained for each color as the attribute information relating to the second small region for each color.

7. A medium according to claim 6,
wherein the determination section determines whether the image to be determined is a backlight image based on a difference between a value that is obtained based on a value obtained for each color as the attribute information relating to the first small region for each color and a value that is obtained based on a value obtained for each color as the attribute information relating to the second small region for each color.

8. A medium according to claim 7,
wherein the determination section determines whether the image to be determined is a backlight image by comparing the difference with a predetermined threshold value.

9. A backlight image determining method comprising:
using a processor to perform the steps of:
generating, based on data of pixels constituting an image to be determined, data of histograms for respective colors, the histograms representing a distribution of the number of pixels in respect to density values of the respective colors of those pixels;
partitioning regions given by the histograms for the respective colors into at least three small regions according to the magnitude of the density values, based on the data of the histograms for the respective colors generated by the histogram data generation section;
selecting for each color at least one small region from the at least three small regions as a first small region, and selecting, from the at least three small regions, for each color at least one small region whose density values are larger than those of the first small region and which is not adjacent to the first small region, as a second small region;
obtaining, for each color, attribute information relating to the first small region and the second small region; and
determining whether an image to be determined is a backlight image, based on the attribute information relating to the first small region obtained for each color and the attribute information relating to the second small region obtained for each color.

10. A non-transitory computer readable medium storing thereon a program for backlight image enhancement, the program comprising:
a histogram data generation section that, based on data of pixels constituting an image, generates data of histograms for respective colors, the histograms representing a distribution of the number of pixels in respect to density values for the respective colors of those pixels;
an attribute information obtaining section that obtains, for each color, attribute information for a relevant small region by partitioning, based on the histogram data for the respective colors generated with the histogram data generation section, the regions given by the histograms for the respective colors into at least two small regions according to the magnitude of the density values and selecting at least one small region from the at least two small regions;
an enhancement information generation section that generates enhancement information for performing a backlight enhancement process on the image based on the attribute information for each color obtained with the attribute information obtaining section; and
a backlight enhancement processing section that performs a backlight enhancement process on the image, based on the enhancement information generated with the enhancement information generation section.

11. A medium according to claim 10,
wherein the at least two small regions include at least two small regions that have at least one of the same pixel number and the same area, and
the attribute information obtaining section obtains the attribute information respectively from the at least two small regions having at least one of the same pixel number and the same area.

12. A medium according to claim 10,
wherein the attribute information obtaining section obtains, for each color, an average value of the density values for the at least one small region as the attribute information.

13. A medium according to claim 12,
wherein the enhancement information generation section obtains information relating to the luminance of the at least one small region based on an average value of the density values of each color obtained with the attribute information obtaining section, and generates the enhancement information based on information relating to this luminance.

14. A medium apparatus according to claim 13,
wherein the enhancement information generation section obtains an average value of the luminance of the individual pixels for the at least one small region as the information relating to the luminance.

15. A medium according to claim 14,
wherein the enhancement information generation section generates the enhancement information based on a value obtained by adding at least one of the average values of the luminance obtained respectively for the at least one small region to the average value of the overall luminance of the image.

16. A medium according to claim 10,
wherein the backlight enhancement processing section converts the density values of the respective pixels constituting the image when performing the backlight enhancement process based on the enhancement information.

17. A medium according to claim 16,
wherein the enhancement information generation section generates, as the enhancement information, information relating to a correspondence relationship between the density values prior to conversion with the backlight enhancement processing section and the density values after conversion with the backlight enhancement processing section.

18. A method for backlight image enhancement, comprising:
using a processor to perform the steps of:
generating, based on data of pixels constituting an image, data of histograms for respective colors, the histograms representing a distribution of the number of pixels in respect to density values of the respective colors of those pixels;
partitioning regions given by the histograms for the various colors into at least two small regions according to the magnitude of the density values, based on the data of the histograms for each color generated with the histogram data generation section;
obtaining, for each color, attribute information for that small region by selecting at least one small region from the at least two small regions;
generating enhancement information for performing a backlight enhancement process on the image based on the obtained attribute information for each color; and
performing a backlight enhancement process on the image, based on the generated enhancement information.

19. A backlight image determining apparatus comprising:
a memory that stores a program; and
a processor that executes the program;
wherein the program comprises:
a histogram data generation section that, based on data of pixels constituting an image to be determined, generates data of histograms for respective colors, the histograms representing a distribution of the number of pixels in respect to density values of the respective colors of those pixels;
an attribute information obtaining section that obtains, for each color, attribute information relating to a first small region and a second small region by partitioning regions given by the histograms for the respective colors into at least three small regions according to the magnitude of the density values, based on the data of the histograms for the respective colors generated by the histogram data generation section, selecting for each color at least one small region from the at least three small regions as the first small region, and selecting, from the at least three small regions, for each color at least one small region whose density values are larger than those of the first small region and which is not adjacent to the first small region, as the second small region; and a determination section that determines whether the image to be determined is a backlight image, based on the attribute information relating to the first small region for each color and the attribute information relating to the second small region for each color, which is obtained with the attribute information obtaining section.

20. A backlight image enhancement apparatus comprising:

a memory that stores a program; and a processor that executes the program;

wherein the program comprises:

a histogram data generation section that, based on data of pixels constituting an image, generates data of histograms for respective colors, the histograms representing a distribution of the number of pixels in respect to density values for the respective colors of those pixels;

an attribute information obtaining section that obtains, for each color, attribute information for a relevant small region by partitioning, based on the histogram data for the respective colors generated with the histogram data generation section, the regions given by the histograms for the respective colors into at least two small regions according to the magnitude of the density values and selecting at least one small region from the at least two small regions;

an enhancement information generation section that generates enhancement information for performing a backlight enhancement process on the image based on the attribute information for each color obtained with the attribute information obtaining section; and a backlight enhancement processing section that performs a backlight enhancement process on the image, based on the enhancement information generated with the enhancement information generation section.

* * * * *